(12) United States Patent
Fujimoto et al.

(10) Patent No.: US 11,565,772 B2
(45) Date of Patent: Jan. 31, 2023

(54) BICYCLE DERAILLEUR, BICYCLE GEAR STRUCTURE, BICYCLE MOTOR UNIT, AND FRONT DERAILLEUR

(71) Applicant: SHIMANO INC., Sakai (JP)

(72) Inventors: Naoki Fujimoto, Sakai (JP); Takeshi Ueda, Sakai (JP)

(73) Assignee: SHIMANO INC., Sakai (JP)

( * ) Notice: Subject to any disclaimer, the term of this patent is extended or adjusted under 35 U.S.C. 154(b) by 217 days.

(21) Appl. No.: 16/916,117

(22) Filed: Jun. 30, 2020

(65) Prior Publication Data

US 2021/0403125 A1   Dec. 30, 2021

(51) Int. Cl.
| | |
|---|---|
| *B62M 9/1342* | (2010.01) |
| *B62M 9/135* | (2010.01) |
| *B62M 9/136* | (2010.01) |
| *B62M 9/132* | (2010.01) |

(52) U.S. Cl.
CPC .......... *B62M 9/1342* (2013.01); *B62M 9/132* (2013.01); *B62M 9/135* (2013.01); *B62M 9/136* (2013.01)

(58) Field of Classification Search
CPC ...... B62M 25/08; B62M 9/132; B62M 9/122; B62M 9/1342; B62M 9/1242
USPC .......................................................... 474/82
See application file for complete search history.

(56) References Cited

U.S. PATENT DOCUMENTS

| | | | | |
|---|---|---|---|---|
| 2,797,588 A | * | 7/1957 | Wargo | G01P 1/04 74/368 |
| 4,487,378 A | * | 12/1984 | Kobayashi | A47K 10/32 242/613.2 |
| 4,522,570 A | * | 6/1985 | Schartz | F04B 43/1292 417/477.1 |
| 4,675,952 A | * | 6/1987 | Nagano | B62M 9/135 74/489 |
| 4,736,929 A | * | 4/1988 | McMorris | B66D 1/22 254/323 |
| 4,954,859 A | * | 9/1990 | Kitazawa | G03B 17/425 396/397 |
| 5,056,186 A | * | 10/1991 | Jiam-Fa | A47L 7/02 15/328 |
| 6,979,009 B2 | | 12/2005 | Ichida et al. | |
| 7,331,890 B2 | * | 2/2008 | Ichida | B62M 9/132 474/80 |

(Continued)

FOREIGN PATENT DOCUMENTS

| | | |
|---|---|---|
| CN | 1663875 | 9/2005 |
| CN | 1706715 | 12/2005 |

(Continued)

OTHER PUBLICATIONS

Office Action with Form PTO-892 Notice of References Cited issued by the United States Patent and Trademark Office for the co-pending U.S. Appl. No. 16/916,119, filed Aug. 4, 2022.

(Continued)

*Primary Examiner* — Henry Y Liu

(74) *Attorney, Agent, or Firm* — Mori & Ward, LLP

(57) ABSTRACT

A bicycle derailleur comprises a base member, a linkage structure, and a motor unit. The linkage structure includes a first link pin rotatably mounted to the base member about a first pivot axis. The motor unit is configured to apply rotational force to the first link pin to rotate the first link pin relative to the base member about the first pivot axis.

36 Claims, 43 Drawing Sheets

(56) References Cited

U.S. PATENT DOCUMENTS

| | | | |
|---|---|---|---|
| 7,341,532 B2* | 3/2008 | Ichida | B62M 9/132 474/70 |
| 7,442,136 B2* | 10/2008 | Ichida | B62M 9/132 474/82 |
| 7,503,863 B2* | 3/2009 | Ichida | B62M 9/132 474/70 |
| 7,704,173 B2 | 4/2010 | Ichida et al. | |
| 7,892,122 B2* | 2/2011 | Fukuda | B62M 9/122 474/82 |
| 7,914,407 B2* | 3/2011 | Fukushima | B62M 9/1344 474/82 |
| 7,942,768 B2* | 5/2011 | Takamoto | B62M 9/122 474/82 |
| 8,066,597 B2* | 11/2011 | Sakaue | B62M 9/122 474/82 |
| 8,070,698 B2* | 12/2011 | Wu | A61H 7/007 601/87 |
| 8,241,158 B2* | 8/2012 | Ishikawa | B62M 9/132 474/82 |
| 8,864,611 B2* | 10/2014 | Kuwayama | B62M 9/135 474/82 |
| 8,888,620 B2 | 11/2014 | Emura et al. | |
| 8,974,331 B2* | 3/2015 | Yamaguchi | F16H 9/06 474/82 |
| 8,979,683 B2 | 3/2015 | Katsura et al. | |
| 9,085,340 B1* | 7/2015 | Sala | B62M 9/132 |
| 9,156,524 B2* | 10/2015 | Emura | B62M 9/1242 |
| 9,156,525 B2 | 10/2015 | Emura et al. | |
| 9,248,885 B2* | 2/2016 | Emura | B62M 9/1342 |
| 9,334,017 B2* | 5/2016 | Sala | B62M 9/122 |
| 9,381,974 B2* | 7/2016 | Katsura | B62M 9/132 |
| 9,499,232 B2 | 11/2016 | Emura et al. | |
| 9,555,857 B2* | 1/2017 | Kuwayama | B62M 9/135 |
| 9,573,652 B2 | 2/2017 | Kuwayama et al. | |
| 9,573,653 B2* | 2/2017 | Pasqua | B62M 9/126 |
| 9,676,446 B2 | 6/2017 | Pasqua et al. | |
| 9,726,283 B2 | 8/2017 | Emura et al. | |
| 9,776,685 B2 | 10/2017 | Tachibana et al. | |
| 9,809,276 B2* | 11/2017 | Katsura | B62M 9/132 |
| 9,873,482 B2 | 1/2018 | Nishino | |
| 9,890,838 B2 | 2/2018 | Shipman et al. | |
| 10,106,224 B2 | 10/2018 | Düweling et al. | |
| 10,259,531 B2 | 4/2019 | Keong | |
| 10,370,060 B2 | 8/2019 | Komatsu et al. | |
| 10,696,358 B2* | 6/2020 | Bernardele | B62M 9/132 |
| 11,192,607 B2* | 12/2021 | Fujimoto | B62M 9/1342 |
| 2002/0061797 A1* | 5/2002 | Valle | F16H 61/32 474/70 |
| 2003/0027674 A1* | 2/2003 | Valle | B62M 9/132 474/70 |
| 2003/0108384 A1* | 6/2003 | Huang | B21K 1/30 403/383 |
| 2003/0207732 A1* | 11/2003 | Fukuda | B62M 9/122 474/82 |
| 2004/0102269 A1* | 5/2004 | Fukuda | B62M 25/08 474/70 |
| 2005/0012320 A1* | 1/2005 | Tobata | B60R 22/46 280/806 |
| 2005/0062832 A1* | 3/2005 | Mitamura | F16H 1/16 271/264 |
| 2005/0187050 A1* | 8/2005 | Fukuda | B62M 25/08 474/82 |
| 2005/0189158 A1* | 9/2005 | Ichida | B62M 25/08 180/260 |
| 2005/0192137 A1* | 9/2005 | Ichida | B62M 9/132 474/70 |
| 2005/0192139 A1* | 9/2005 | Ichida | B62M 25/08 474/70 |
| 2005/0197222 A1 | 9/2005 | Tatsumi | |
| 2005/0205323 A1* | 9/2005 | Ichida | B62M 9/132 474/80 |
| 2005/0239587 A1* | 10/2005 | Ichida | B62M 9/122 474/82 |
| 2005/0272541 A1* | 12/2005 | Valle | B62M 9/136 474/82 |
| 2006/0100045 A1* | 5/2006 | Fukuda | B62M 25/08 474/70 |
| 2006/0183584 A1* | 8/2006 | Fukuda | B62M 25/08 474/70 |
| 2006/0189421 A1* | 8/2006 | Ichida | B62M 9/132 474/82 |
| 2006/0189422 A1* | 8/2006 | Ichida | B62M 25/08 474/82 |
| 2007/0037645 A1* | 2/2007 | Ishikawa | B62M 25/08 474/70 |
| 2007/0133802 A1* | 6/2007 | Yuan | E05B 49/00 380/264 |
| 2007/0184925 A1* | 8/2007 | Ichida | B62M 25/08 474/80 |
| 2007/0191159 A1* | 8/2007 | Fukuda | B62M 9/1242 474/70 |
| 2008/0227572 A1* | 9/2008 | Sakaue | B62M 9/122 474/82 |
| 2009/0210118 A1* | 8/2009 | Takamoto | B62M 25/08 701/49 |
| 2009/0240858 A1* | 9/2009 | Takebayashi | H04L 12/403 710/110 |
| 2009/0270777 A1* | 10/2009 | Wu | A61H 7/007 601/87 |
| 2011/0224037 A1 | 9/2011 | Auer et al. | |
| 2012/0157250 A1* | 6/2012 | Jordan | B62M 9/134 29/428 |
| 2013/0072333 A1 | 3/2013 | Kuwayama et al. | |
| 2013/0192405 A1* | 8/2013 | Katsura | B62M 9/105 74/473.12 |
| 2014/0090946 A1* | 4/2014 | Caballero Tapia | F16D 7/024 192/70.11 |
| 2014/0114538 A1* | 4/2014 | Shipman | B62M 9/132 474/80 |
| 2014/0121047 A1* | 5/2014 | Katsura | B62M 9/132 74/405 |
| 2014/0155205 A1* | 6/2014 | Kuwayama | B62M 9/135 474/80 |
| 2014/0243128 A1* | 8/2014 | Pasqua | B62M 9/132 474/80 |
| 2014/0287856 A1* | 9/2014 | Kuwayama | B62M 9/132 474/80 |
| 2014/0378252 A1* | 12/2014 | Carrasco Vergara | B62L 3/023 474/82 |
| 2015/0099599 A1* | 4/2015 | Lazzarin | B62M 9/1342 474/80 |
| 2015/0126314 A1* | 5/2015 | Pasqua | B62M 9/1344 474/82 |
| 2015/0353166 A1* | 12/2015 | Kuwayama | B62M 9/135 474/82 |
| 2017/0247082 A1* | 8/2017 | Katsura | B62M 9/132 |
| 2017/0334519 A1* | 11/2017 | Sala | B62M 25/08 |
| 2017/0341708 A1* | 11/2017 | Bernardele | B62M 9/132 |
| 2019/0023351 A1* | 1/2019 | Tsai | B62M 9/122 |
| 2020/0298934 A1* | 9/2020 | Wu | B62M 9/132 |
| 2020/0298935 A1* | 9/2020 | Wu | B62M 9/138 |

FOREIGN PATENT DOCUMENTS

| | | |
|---|---|---|
| CN | 1260090 C | 6/2006 |
| CN | 1821013 A | 8/2006 |
| CN | 100482530 C | 4/2009 |
| CN | 1821014 B | 9/2010 |
| CN | 101016075 B | 3/2013 |
| CN | 103770898 | 5/2014 |
| CN | 104271436 | 1/2015 |
| CN | 104843137 | 8/2015 |
| CN | 106184597 | 12/2016 |
| DE | 3515589 | 11/1985 |
| DE | 10 2013 017 194 | 4/2014 |
| DE | 10 2013 105 213 | 6/2014 |
| DE | 102014224350 | 7/2015 |
| DE | 202017106578 U1 | 1/2018 |
| DE | 10 2020 204 469 | 12/2020 |
| EP | 2772424 A1 | 9/2014 |

(56) References Cited

FOREIGN PATENT DOCUMENTS

| | | |
|---|---:|---:|
| EP | 2868566 A1 | 5/2015 |
| EP | 3085613 A1 | 10/2016 |
| EP | 3085613 B1 | 10/2016 |
| JP | 4282889 B2 | 4/2002 |
| JP | 4009429 B2 | 9/2002 |
| JP | 2005-239137 | 9/2005 |
| JP | 2005-343455 | 12/2005 |
| JP | 4541081 B2 | 3/2006 |
| JP | 5901722 B2 | 4/2015 |
| TW | M452134 U1 | 5/2013 |
| TW | 201520126 | 6/2015 |
| TW | I611979 B | 1/2018 |
| TW | M592416 U | 3/2020 |

OTHER PUBLICATIONS

Office Action with Form PTO-892 Notice of References Cited issued by the United States Patent and Trademark Office for the co-pending U.S. Appl. No. 16/916,120, filed Aug. 4, 2022.

\* cited by examiner

BICYCLE DERAILLEUR, BICYCLE GEAR STRUCTURE, BICYCLE MOTOR UNIT, AND FRONT DERAILLEUR

BACKGROUND OF THE INVENTION

Field of the Invention

The present invention relates to a bicycle derailleur, a bicycle gear structure, a bicycle motor unit, and a front derailleur.

Discussion of the Background

A bicycle includes a derailleur configured to move a chain relative to a plurality of sprockets.

SUMMARY OF THE INVENTION

In accordance with a first aspect of the present invention, a bicycle derailleur comprises a base member, a linkage structure, and a motor unit. The linkage structure includes a first link pin rotatably mounted to the base member about a first pivot axis. The motor unit is configured to apply rotational force to the first link pin to rotate the first link pin relative to the base member about the first pivot axis.

With the bicycle derailleur according to the first aspect, it is possible to utilize the first link pin to rotate another member relative to the base member about the first pivot axis and/or to support another member rotatably relative to the base member about the first pivot axis.

In accordance with a second aspect of the present invention, the bicycle derailleur according to the first aspect is configured so that the linkage structure includes a first link member coupled to the first link pin to be pivotable relative to the base member about the first pivot axis.

With the bicycle derailleur according to the first aspect, it is possible to utilize the first link pin to rotate the first link member relative to the base member about the first pivot axis and/or to support the first link member rotatably relative to the base member about the first pivot axis.

In accordance with a third aspect of the present invention, the bicycle derailleur according to the second aspect further comprises a chain guide pivotally coupled to the first link member to move relative to the base member in response to a pivotal movement of the first link member relative to the base member.

With the bicycle derailleur according to the third aspect, it is possible to reliably utilize the first link pin to move the chain guide relative to the base member and/or to reliably support the chain guide movably relative to the base member.

In accordance with a fourth aspect of the present invention, the bicycle derailleur according to any one of the first to third aspects is configured so that the motor unit includes an output structure coupled to the first link pin to be rotatable relative to the base member about the first pivot axis.

With the bicycle derailleur according to the fourth aspect, it is possible to rotate the first link pin about the first pivot axis along with the output structure.

In accordance with a fifth aspect of the present invention, the bicycle derailleur according to the fourth aspect is configured so that at least one of the first link pin and the output structure includes a first coupling part. The first link member includes a second coupling part. The first coupling part is engaged with the second coupling part to transmit the rotational force from the at least one of the first link pin and the output structure to the first link member.

With the bicycle derailleur according to the fifth aspect, it is possible to transmit the rotational force from the at least one of the first link pin and the output structure to the first link member through the first coupling part and the second coupling part.

In accordance with a sixth aspect of the present invention, the bicycle derailleur according to the fifth aspect is configured so that the first coupling part has a first profile other than a perfect circle as viewed along the first pivot axis. The second coupling part has a second profile other than a perfect circle as viewed along the first pivot axis.

With the bicycle derailleur according to the sixth aspect, it is possible to reliably transmit the rotational force from the at least one of the first link pin and the output structure to the first link member through the first coupling part and the second coupling part.

In accordance with a seventh aspect of the present invention, the bicycle derailleur according to the sixth aspect is configured so that the first profile of the first coupling part has a polygonal shape. The second profile of the second coupling part has a polygonal shape.

With the bicycle derailleur according to the seventh aspect, it is possible to more reliably transmit the rotational force from the at least one of the first link pin and the output structure to the first link member through the first coupling part and the second coupling part.

In accordance with an eighth aspect of the present invention, the bicycle derailleur according to the fifth aspect is configured so that the first coupling part includes at least one first flat surface. The second coupling part includes at least one second flat surface. The at least one first flat surface is contactable with the at least one second flat surface to transmit the rotational force from the at least one of the first link pin and the output structure to the first link member in a state where the first coupling part is engaged with the second coupling part.

With the bicycle derailleur according to the eighth aspect, it is possible to reliably transmit the rotational force from the at least one of the first link pin and the output structure to the first link member through the first coupling part and the second coupling part.

In accordance with a ninth aspect of the present invention, the bicycle derailleur according to any one of the first to fifth aspect is configured so that the output structure includes an engagement body and a geared portion. The engagement body includes a first engagement hole. The geared portion is provided on the engagement body. The first link pin includes a first engagement part. The first engagement part is provided in the first engagement hole to transmit the rotational force from the output structure to the first link pin.

With the bicycle derailleur according to the ninth aspect, it is possible to transmit the rotational force from the output structure to the first link pin through the first engagement part and the first engagement hole.

In accordance with a tenth aspect of the present invention, the bicycle derailleur according to the ninth aspect is configured so that the first engagement part has an outer profile other than a perfect circle as viewed along the first pivot axis. The first engagement hole has an inner profile other than a perfect circle as viewed along the first pivot axis.

With the bicycle derailleur according to the tenth aspect, it is possible to reliably transmit the rotational force from the output structure to the first link pin through the first engagement part and the first engagement hole.

In accordance with an eleventh aspect of the present invention, the bicycle derailleur according to the ninth aspect is configured so that the first engagement part frictionally engages with the first engagement hole.

With the bicycle derailleur according to the eleventh aspect, it is possible to reliably transmit the rotational force from the output structure to the first link pin through the first engagement part and the first engagement hole.

In accordance with a twelfth aspect of the present invention, the bicycle derailleur according to the tenth aspect is configured so that the outer profile of the first engagement part has a polygonal shape. The inner profile of the first engagement hole has a polygonal shape.

With the bicycle derailleur according to the twelfth aspect, it is possible to more reliably transmit the rotational force from the output structure to the first link pin through the first engagement part and the first engagement hole.

In accordance with a thirteenth aspect of the present invention, the bicycle derailleur according to the ninth aspect is configured so that the first engagement part includes at least one outer flat surface. The first engagement hole includes at least one inner flat surface. The at least one outer flat surface is contactable with the at least one inner flat surface to transmit the rotational force from the output gear to the first link pin in a state where the first engagement part is provided in the first engagement hole.

With the bicycle derailleur according to the thirteenth aspect, it is possible to reliably transmit the rotational force from the output structure to the first link pin through the first engagement part and the first engagement hole.

In accordance with a fourteenth aspect of the present invention, the bicycle derailleur according to the ninth aspect is configured so that the engagement body includes a tubular part and a sleeve which is a separate member from the tubular part. The sleeve includes the first engagement hole and a second engagement part. The tubular part includes a second engagement hole. The second engagement part is provided in the second engagement hole to transmit the rotational force from the tubular part to the sleeve.

With the bicycle derailleur according to the fourteenth aspect, it is possible to transmit the rotational force from the tubular part to the sleeve through the second engagement part and the second engagement hole.

In accordance with a fifteenth aspect of the present invention, the bicycle derailleur according to the fourteenth aspect is configured so that the second engagement part has an additional outer profile other than a perfect circle as viewed along the first pivot axis. The second engagement hole has an additional inner profile other than a perfect circle as viewed along the first pivot axis.

With the bicycle derailleur according to the fifteenth aspect, it is possible to reliably transmit the rotational force from the tubular part to the sleeve through the second engagement part and the second engagement hole.

In accordance with a sixteenth aspect of the present invention, the bicycle derailleur according to the fifteenth aspect is configured so that the additional outer profile of the second engagement part has a polygonal shape. The additional inner profile of the second engagement hole has a polygonal shape.

With the bicycle derailleur according to the sixteenth aspect, it is possible to more reliably transmit the rotational force from the tubular part to the sleeve through the second engagement part and the second engagement hole.

In accordance with a seventeenth aspect of the present invention, the bicycle derailleur according to the fourteenth aspect is configured so that the second engagement part includes at least one additional outer flat surface. The second engagement hole includes at least one additional inner flat surface. The at least one additional outer flat surface is contactable with the at least one additional inner flat surface to transmit the rotational force from the tubular part to the sleeve.

With the bicycle derailleur according to the seventeenth aspect, it is possible to reliably transmit the rotational force from the tubular part to the sleeve through the second engagement part and the second engagement hole.

In accordance with an eighteenth aspect of the present invention, the bicycle derailleur according to the fourteenth aspect is configured so that the second engagement part frictionally engages with the second engagement hole.

With the bicycle derailleur according to the eighteenth aspect, it is possible to reliably transmit the rotational force from the tubular part to the sleeve through the second engagement part and the second engagement hole.

In accordance with a nineteenth aspect of the present invention, the bicycle derailleur according to any one of the first to eighteenth aspects is configured so that the base member includes a first support hole and a second support hole spaced apart from the first support hole along the first pivot axis. The first link pin includes a first end and a second end. The first end is provided in the first support hole. The second end is provided in the second support hole.

With the bicycle derailleur according to the nineteenth aspect, it is possible to support the first link pin rotatably relative to the base member with the first support hole and the second support hole.

In accordance with a twentieth aspect of the present invention, the bicycle derailleur according to any one of the first to nineteenth aspects is configured so that the linkage structure comprises a second link member, a second link pin, a third link pin, and a fourth link pin. The second link pin is configured to pivotally couple the second link member to the base member about a second pivot axis. The third link pin is configured to pivotally couple the first link member to the chain guide about a third pivot axis. The fourth link pin is configured to pivotally couple the second link member to the chain guide about a fourth pivot axis.

With the bicycle derailleur according to the twentieth aspect, it is possible to movably couple the chain guide to the base member through the linkage structure.

In accordance with a twenty-first aspect of the present invention, a bicycle gear structure comprises a torque diode, a first transmitting gear, and a first additional transmitting gear. The torque diode comprises an outer casing, a first shaft, and a second shaft. The first shaft is rotatably mounted to the outer casing about a first rotational axis. The second shaft is rotatably mounted to the outer casing about a second rotational axis. The first transmitting gear is attached to the first shaft. The first additional transmitting gear is meshed with the first transmitting gear and rotatably mounted to the outer casing about a third rotational axis offset from the first rotational axis and the second rotational axis.

With the bicycle gear structure according to the twenty-first aspect, it is possible to rotatably support the first additional transmitting gear meshing with the first transmitting gear using the outer casing of the torque diode. Thus, it is possible to simplify the construction of the bicycle gear structure.

In accordance with a twenty-second aspect of the present invention, the bicycle derailleur according to the twenty-first aspect further comprises a support pin. The outer casing includes a gear support hole. The first additional transmitting gear is attached to the support pin. The support pin is rotatably provided in the gear support hole.

With the bicycle gear structure according to the twenty-second aspect, it is possible to rotatably support the first additional transmitting gear with a simple structure such as the support pin and the gear support hole.

In accordance with a twenty-third aspect of the present invention, the bicycle derailleur according to the twenty-second aspect is configured so that the outer casing includes an outer casing body and a gear support part extending radially outwardly from the outer casing body with respect to the first rotational axis. The gear support part includes the gear support hole.

With the bicycle gear structure according to the twenty-third aspect, it is possible to rotatably support the first additional transmitting gear with a simple structure such as the outer casing body and the gear support part.

In accordance with a twenty-fourth aspect of the present invention, the bicycle derailleur according to the twenty-third aspect is configured so that the outer casing includes a securing part configured to be secured to another member. The securing part extends radially outwardly from the outer casing body with respect to the first rotational axis and includes a securing hole.

With the bicycle gear structure according to the twenty-fourth aspect, it is possible to secure the torque diode to another member using the securing part.

In accordance with a twenty-fifth aspect of the present invention, the bicycle derailleur according to any one of the twenty-first to twenty-fourth aspects further comprises a second transmitting gear attached to the second shaft.

With the bicycle gear structure according to the twenty-fifth aspect, it is possible to couple the second shaft to another gear through the second transmitting gear.

In accordance with a twenty-sixth aspect of the present invention, the bicycle derailleur according to any one of the twenty-first to twenty-fifth aspects is configured so that an outer diameter of the first transmitting gear is larger than an outer diameter of the first additional transmitting gear.

With the bicycle gear structure according to the twenty-sixth aspect, it is possible to support the first transmitting gear and the first additional transmitting gear having different outer diameters using the torque diode.

In accordance with a twenty-seventh aspect of the present invention, the bicycle derailleur according to any one of the twenty-first to twenty-sixth aspects is configured so that the first rotational axis is coincident with the second rotational axis.

With the bicycle gear structure according to the twenty-seventh aspect, it is possible to arrange coaxially the first shaft and the second shaft.

In accordance with a twenty-eighth aspect of the present invention, a bicycle motor unit comprises a motor and the bicycle gear structure according to one of the twenty-first to twenty-seventh aspects. The motor is configured to generate rotational force. The bicycle gear structure is configured to transmit the rotational force.

With the bicycle motor unit according to the twenty-eighth aspect, the torque diode of the bicycle gear structure restricts torque from being transmitted to the motor. Thus, it is possible to protect the motor.

In accordance with a twenty-ninth aspect of the present invention, a bicycle derailleur comprises a base member, a chain guide, a linkage structure, and the bicycle motor unit according to the twenty-eighth aspect. The chain guide is movable relative to the base member. The linkage structure is configured to movably couple the chain guide to the base member. The bicycle motor unit is configured to apply rotational force to at least one of the chain guide and the linkage structure to move the chain guide relative to the base member.

With the bicycle derailleur according to the twenty-ninth aspect, it is possible to move the chain guide relative to the base member using the bicycle motor unit while protecting the motor from torque transmitted from the chain guide.

In accordance with a thirtieth aspect of the present invention, a front derailleur comprises a base member, a chain guide, a linkage structure, and a motor unit. The chain guide is movable relative to the base member. The linkage structure is configured to movably couple the chain guide to the base member. The motor unit is configured to apply rotational force to at least one of the chain guide and the linkage structure to move the chain guide relative to the base member. The motor unit comprises a motor and a gear structure. The motor is configured to generate the rotational force. The gear structure includes a plurality of spur gears configured to transmit the rotational force to the at least one of the chain guide and the linkage structure. The motor unit is free of gears other than the plurality of spur gears on a rotational-force transmission path provided from the motor to the at least one of the chain guide and the linkage structure.

With the front derailleur according to the thirtieth aspect, it is possible to simplify the construction of the gear structure.

In accordance with a thirty-first aspect of the present invention, the bicycle derailleur according to the thirtieth aspect is configured so that the gear structure has a reduction ratio equal to or lower than 1400.

With the bicycle derailleur according to the thirty-first aspect, it is possible to make the bicycle derailleur compact while ensuring necessary rotational force to move the chain guide relative to the base member.

In accordance with a thirty-second aspect of the present invention, a bicycle derailleur comprises a base member, a chain guide, a linkage structure, and a motor unit. The chain guide is movable relative to the base member. The linkage structure is configured to movably couple the chain guide to the base member. The motor unit is configured to apply rotational force to at least one of the chain guide and the linkage structure to move the chain guide relative to the base member. The motor unit comprises a motor and a gear structure. The gear structure includes a plurality of spur gears configured to transmit the rotational force to the at least one of the chain guide and the linkage structure. The gear structure has a reduction ratio equal to or lower than 1400.

With the bicycle derailleur according to the thirty-second aspect, it is possible to make the bicycle derailleur compact while ensuring necessary rotational force to move the chain guide relative to the base member.

In accordance with a thirty-third aspect of the present invention, the bicycle derailleur according to the thirty-second aspect is configured so that the motor unit is free of gears other than the plurality of spur gears on a rotational-force transmission path provided from the motor to the at least one of the chain guide and the linkage structure.

With the bicycle derailleur according to the thirty-third aspect, it is possible to simplify the construction of the gear structure.

In accordance with a thirty-fourth aspect of the present invention, the bicycle derailleur according to any one of the thirtieth to thirty-third aspects is configured so that the motor includes an output shaft. The plurality of spur gears includes an input gear and an output gear. The input gear is secured to the output shaft. The output gear is coupled to the at least one of the chain guide and the linkage structure. The reduction ratio is defined from the input gear to the output gear.

With the front derailleur according to the thirty-fourth aspect, it is possible to make a size of the motor smaller and/or to move the chain guide relative to the base member with larger power.

In accordance with a thirty-fifth aspect of the present invention, the bicycle derailleur according to the thirty-fourth aspect is configured so that the output gear includes a sector gear.

With the front derailleur according to the thirty-fifth aspect, it is possible to make the output gear smaller.

In accordance with a thirty-sixth aspect of the present invention, the bicycle derailleur according to any one of the thirty-second to thirty-fifth aspects further comprises a rotation sensor configured to sense a rotational position of one of the plurality of spur gears.

With the bicycle derailleur according to the thirty-sixth aspect, it is possible to obtain a position of the chain guide using the rotational position sensed by the rotation sensor.

In accordance with a thirty-seventh aspect of the present invention, the bicycle derailleur according to the thirty-sixth aspect is configured so that the plurality of spur gears includes a sensor gear. The rotation sensor is configured to sense the rotational position of the sensor gear.

With the bicycle derailleur according to the thirty-seventh aspect, it is possible to reliably obtain the position of the chain guide using the rotational position sensed by the rotation sensor.

In accordance with a thirty-eighth aspect of the present invention, a front derailleur comprises a base member, a chain guide, a linkage structure, and a motor unit. The chain guide is movable relative to the base member. The linkage structure is configured to movably couple the chain guide to the base member. The motor unit is configured to apply rotational force to at least one of the chain guide and the linkage structure to move the chain guide relative to the base member. The motor unit comprises a motor, a gear structure, and a gear support structure. The motor is configured to generate the rotational force. The gear structure includes a plurality of gears configured to transmit the rotational force to the at least one of the chain guide and the linkage structure. The gear support structure is configured to rotatably support the plurality of gears. The plurality of gears comprises a first gear, a second gear, a third gear, a first pin, a second pin, and a third pin. The first gear is rotatable relative to the gear support structure about a first gear axis. The second gear is rotatable relative to the gear support structure about a second gear axis. The third gear is rotatable relative to the gear support structure about a third gear axis. The first pin is configured to rotatably support the first gear about the first gear axis. The first pin includes a first pin end and a first opposite pin end. The second pin is configured to rotatably support the second gear about the second gear axis. The second pin includes a second pin end and a second opposite pin end. The third pin is configured to rotatably support the third gear about the third gear axis. The third pin includes a third pin end and a third opposite pin end. The gear support structure comprises a first support, a second support, a third support, and a fourth support. The first support is configured to support the first pin end and the second pin end. The second support is configured to support the second opposite pin end and the third pin end. The second support is a separate member from the first support.

The third support is configured to support the third opposite pin end. The fourth support is configured to support the first opposite pin end.

With the front derailleur according to the thirty-eighth aspect, it is possible to improve flexibility of design of the motor unit.

In accordance with a thirty-ninth aspect of the present invention, the bicycle derailleur according to the thirty-eighth aspect is configured so that the plurality of gears comprises a first additional gear rotatable relative to the gear support structure about the first gear axis. The first pin is configured to rotatably support the first gear and the first additional gear about the first gear axis.

With the front derailleur according to the thirty-ninth aspect, it is possible to support the first gear and the first additional gear with the first pin. Thus, it is possible to simplify the construction of the motor unit.

In accordance with a fortieth aspect of the present invention, the bicycle derailleur according to the thirty-eighth or thirty-ninth aspect is configured so that the plurality of gears comprises a second additional gear rotatable relative to the gear support structure about the second gear axis. The second pin is configured to rotatably support the second gear and the second additional gear about the second gear axis.

With the front derailleur according to the fortieth aspect, it is possible to support the second gear and the second additional gear with the second pin. Thus, it is possible to simplify the construction of the motor unit.

In accordance with a forty-first aspect of the present invention, the bicycle derailleur according to any one of the thirty-eighth to fortieth aspects is configured so that the gear structure includes a torque diode. The torque diode includes an outer casing, a first shaft, and a second shaft. The first shaft is rotatably mounted to the outer casing about a first rotational axis. The second shaft is rotatably mounted to the outer casing about a second rotational axis. The outer casing of the torque diode includes at least one of the first support, the second support, the third support, and the fourth support.

With the front derailleur according to the forty-first aspect, it is possible to utilize the outer casing of the torque diode as a support configured to rotatably support one of the plurality of gears. Thus, it is possible to simplify the construction of the motor unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
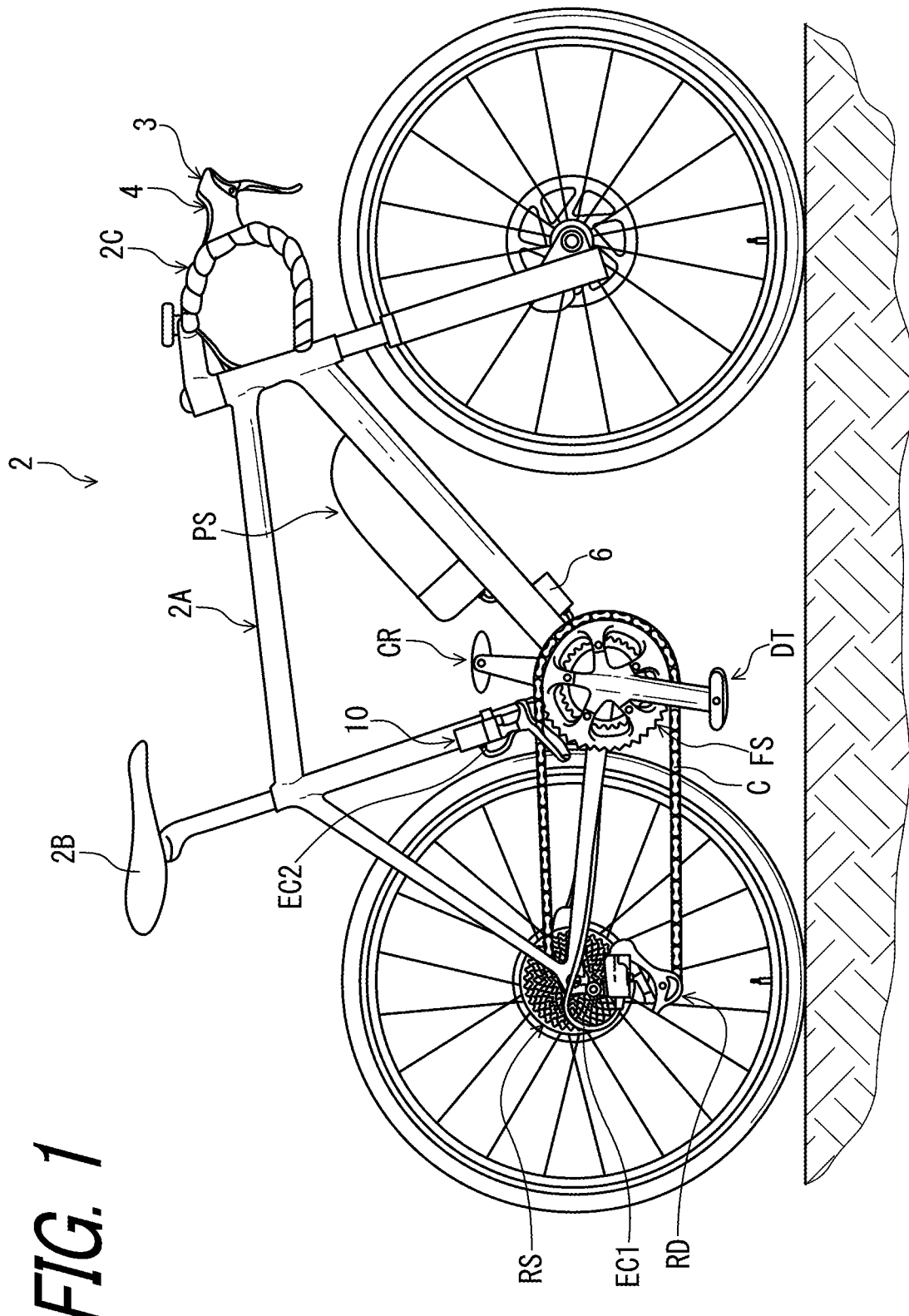
FIG. 1 is a side elevational view of a bicycle including a bicycle derailleur in accordance with a first embodiment.

The embodiment(s) will now be described with reference to the accompanying drawings, wherein like reference numerals designate corresponding or identical elements throughout the various drawings.

First Embodiment

As seen in FIG. 1, a bicycle 2 includes a bicycle derailleur 10 in accordance with a first embodiment. The bicycle 2 further includes a vehicle body 2A, a saddle 2B, a handlebar 2C, an operating device 3, an operating device 4, a drive train DT, and an electric power source PS. The operating devices 3 and 4 are configured to be mounted to the handlebar 2C. The drive train DT includes a crank CR, a front sprocket assembly FS, a rear sprocket assembly RS, a chain C, and a bicycle derailleur RD. The front sprocket assembly FS is secured to the crank CR. The rear sprocket assembly RS is rotatably mounted to the vehicle body 2A. The chain C is engaged with the front sprocket assembly FS and the rear sprocket assembly RS. The bicycle derailleur RD is mounted to the vehicle body 2A and is configured to shift the chain C relative to a plurality of sprockets of the rear sprocket assembly RS to change a gear position. The bicycle derailleur 10 is configured to shift the chain C relative to a plurality of sprockets of the front sprocket assembly FS. The electric power source PS is configured to be mounted to the vehicle body 2A. In the first embodiment, the electric power source PS is configured to be mounted on a down tube of the vehicle body 2A. However, the electric power source PS can be configured to be mounted to other parts of the vehicle body 2A such as a seat tube. The electric power source PS can be configured to be directly mounted to other devices such as the bicycle derailleur 10 or RD.

The bicycle derailleur RD is configured to be operated using the operating device 3. The bicycle derailleur 10 is configured to be operated using the operating device 4. In the first embodiment, the bicycle derailleur RD is configured to be electrically connected to the operating devices 3 and 4 through a wireless communication channel. The bicycle derailleur RD is electrically connected to the power source PS through an electric cable EC1. The bicycle derailleur 10 is electrically connected to the power source PS through an electric cable EC2. The electric power supply PS is configured to supply electric power to the bicycle derailleurs 10 and RD through the electric cables EC1 and EC2. For example, the bicycle derailleurs 10 and RD and the electric power supply PS are configured to communicate with each other using a power line communication (PLC). However, the bicycle derailleurs 10 and RD and the electric power supply PS can be configured to communicate with each other using other communication method such as a wireless communication.

In the first embodiment, the bicycle derailleur RD is configured to wirelessly communicate with the operating devices 3 and 4. The bicycle derailleur RD is configured to receive control signals wirelessly transmitted from each of the operating devices 3 and 4. The bicycle derailleur 10 is configured to communicate with the bicycle derailleur RD through the electric power source PS and the electric cables EC1 and EC2. The bicycle derailleur RD is configured to transmit, through the electric power source PS and the electric cables EC1 and EC2 to the bicycle derailleur 10, control signals wirelessly transmitted from the operating device 4 to the bicycle derailleur RD.

However, the configuration of the bicycle 2 is not limited to the above configuration. For example, each of the bicycle derailleurs 10 and RD can be configured to be electrically connected to the electric power source PS through the electric cables EC1 and EC2 and an additional device such as a junction box 6. Each of the bicycle derailleur RD and the electric power source PS can be configured to be electrically connected to the bicycle derailleur 10 through the electric cables EC1 and EC2 if the bicycle derailleur 10 includes a plurality of connection ports. Each of the bicycle derailleur 10 and the electric power source PS can be configured to be electrically connected to the bicycle derailleur RD through the electric cables EC1 and EC2 if the bicycle derailleur RD includes a plurality of connection ports. The bicycle derailleur 10 can be configured to be electrically connected to the bicycle derailleur RD through the electric cable EC1 or EC2 if the electric power supply PS is directly mounted to one of the bicycle derailleurs 10 and RD. Furthermore, the bicycle derailleur RD can be connected to at least one of the operating devices 3 and 4 through an electric cable without wireless communication. In addition, the bicycle derailleur 10 can be configured to be electrically connected to at least one of the operating devices 3 and 4 through a wireless communication channel.

In the first embodiment, the bicycle derailleur 10 includes a front derailleur. Namely, the bicycle derailleur 10 can also be referred to as a front derailleur 10. However, structures of the bicycle derailleur 10 can be applied to a rear derailleur if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the bicycle 2 with facing the handlebar 2C. Accordingly, these terms, as utilized to describe the bicycle derailleur 10 or other components, should be interpreted relative to the bicycle 2 equipped with the bicycle derailleur 10 as used in an upright riding position on a horizontal surface.

Figure 2:
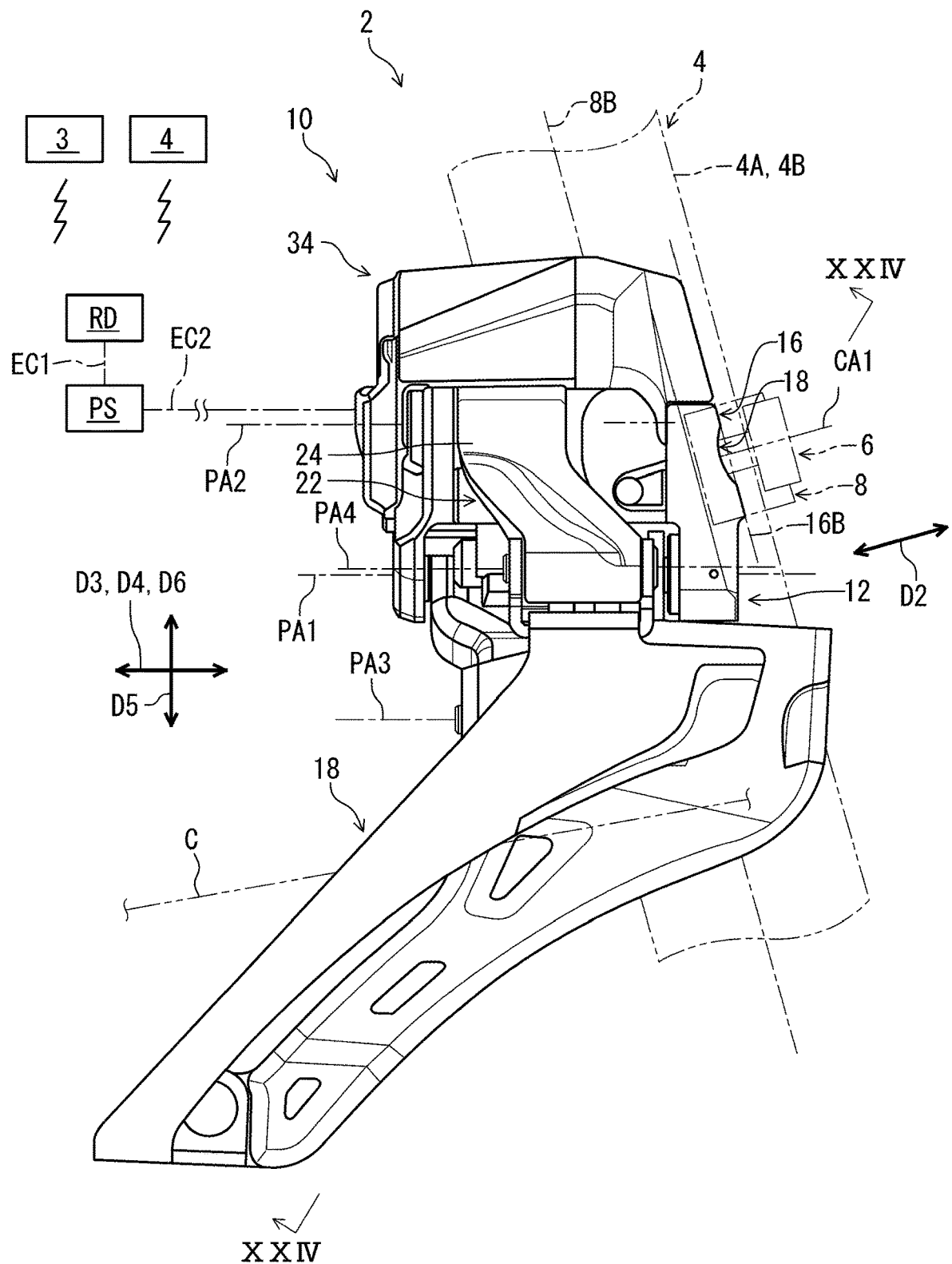
FIG. 2 is a side elevational view of the bicycle derailleur of the bicycle illustrated in FIG. 1.

As seen in FIG. 2, the bicycle derailleur 10 comprises a base member 12. The base member 12 is configured to be mounted to the bicycle frame 4. The base member 12 is configured to be mounted to a tubular portion 4A of the bicycle frame 4. The base member 12 is configured to be mounted to a seat tube 4B of the bicycle frame 4. However, the base member 12 can be configured to be mounted to other portions of the bicycle frame 4 if needed and/or desired.

Figure 3:
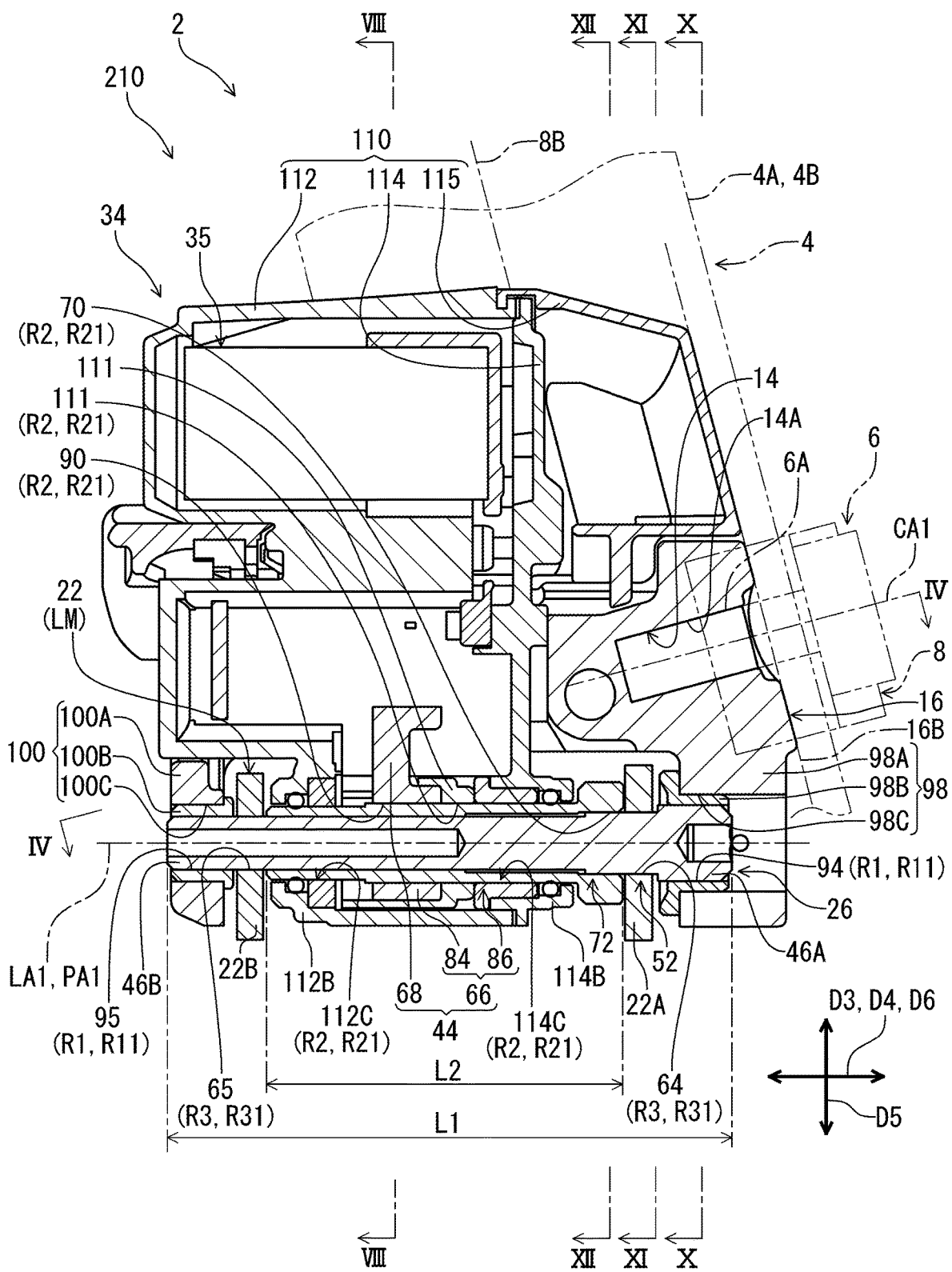
FIG. 3 is a cross-sectional view of the bicycle derailleur taken along line of FIG. 6.

As seen in FIG. 3, the base member 12 includes a mounting hole 14 through which a mounting fastener 6 is to extend in a mounting state where the base member 12 is mounted to the bicycle frame 4 with the mounting fastener 6. The mounting hole 14 has a center axis CA1. The mounting hole 14 extends along the center axis CAL The mounting fastener 6 extends along the center axis CAL In this embodiment, the mounting hole 14 includes a threaded hole 14A. The mounting fastener 6 includes an external thread 6A configured to be threadedly engaged with the threaded hole 14A of the mounting hole 14.

The base member 12 includes a mounting surface 16. The mounting hole 14 is provided on the mounting surface 16. The mounting surface 16 is configured to be contactable with one of the bicycle frame 4 and a clamp 8 configured to couple the base member 12 to the bicycle frame 4 in the mounting state where the base member 12 is mounted to the bicycle frame 4. In the first embodiment, the mounting surface 16 is configured to be contactable with the clamp 8 configured to couple the base member 12 to the bicycle frame 4 in the mounting state where the base member 12 is mounted to the bicycle frame 4. However, the mounting surface 16 can be configured to be contactable with the bicycle frame 4 or an adapters in the mounting state where the base member 12 is mounted to the bicycle frame 4 if needed and/or desired.

Figure 4:
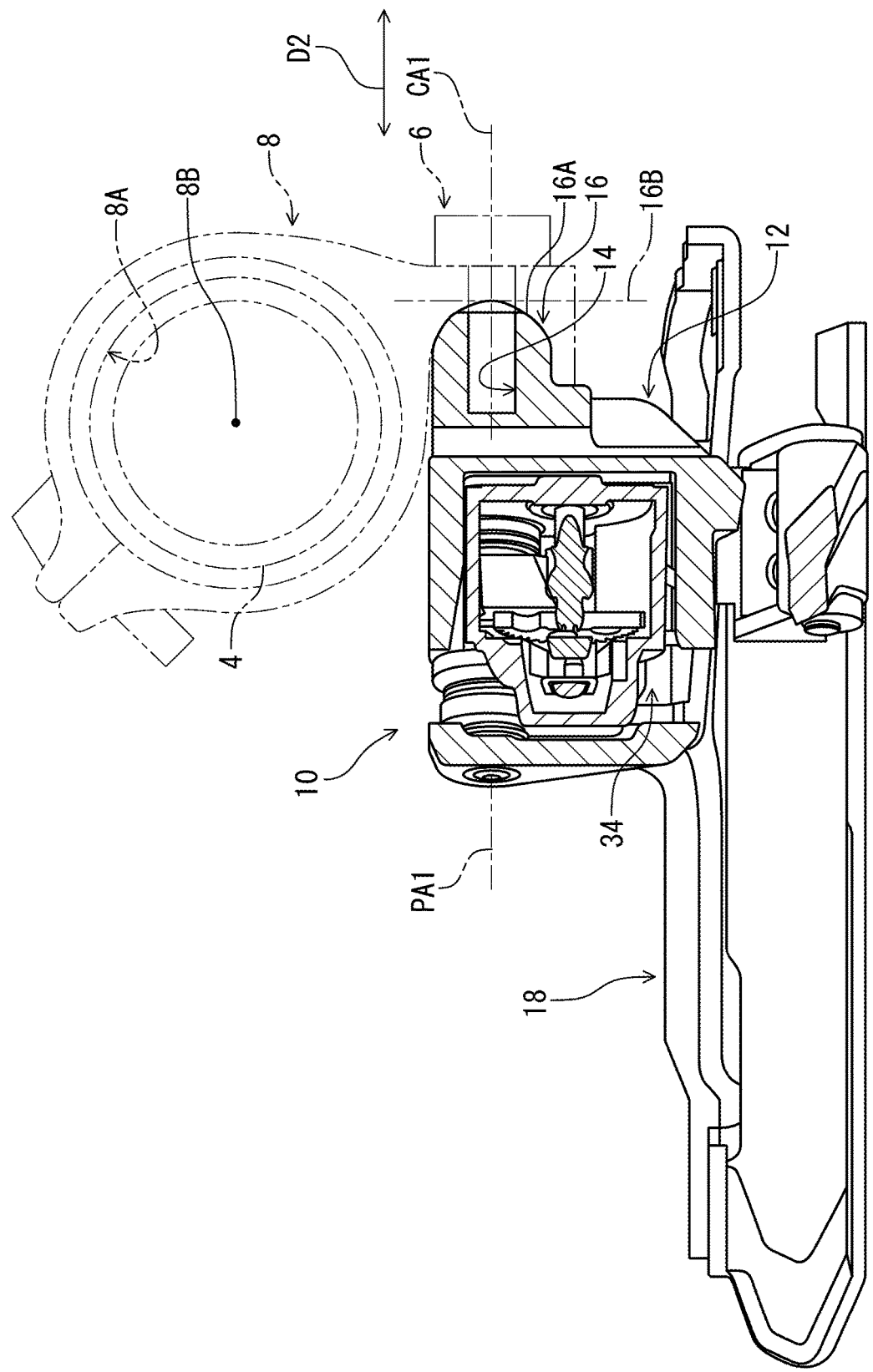
FIG. 4 is a cross-sectional view of the bicycle derailleur taken along line Iv-Iv of FIG. 3.

As seen in FIG. 4, the mounting surface 16 includes a curved surface 16A. The curved surface 16A is configured to be contactable with one of the bicycle frame 4 and the clamp 8 in the mounting state where the base member 12 is mounted to the bicycle frame 4. The mounting hole 14 is provided on the curved surface 16A. However, the mounting surface 16 can include another surface instead of or in addition to the curved surface 16A.

The clamp 8 includes a clamp opening 8A through which the bicycle frame 4 is to extend. The clamp opening 8A has a center axis 8B. The center axis CA1 of the mounting hole 14 is non-parallel to the center axis 8B of the clamp 8.

Figure 5:
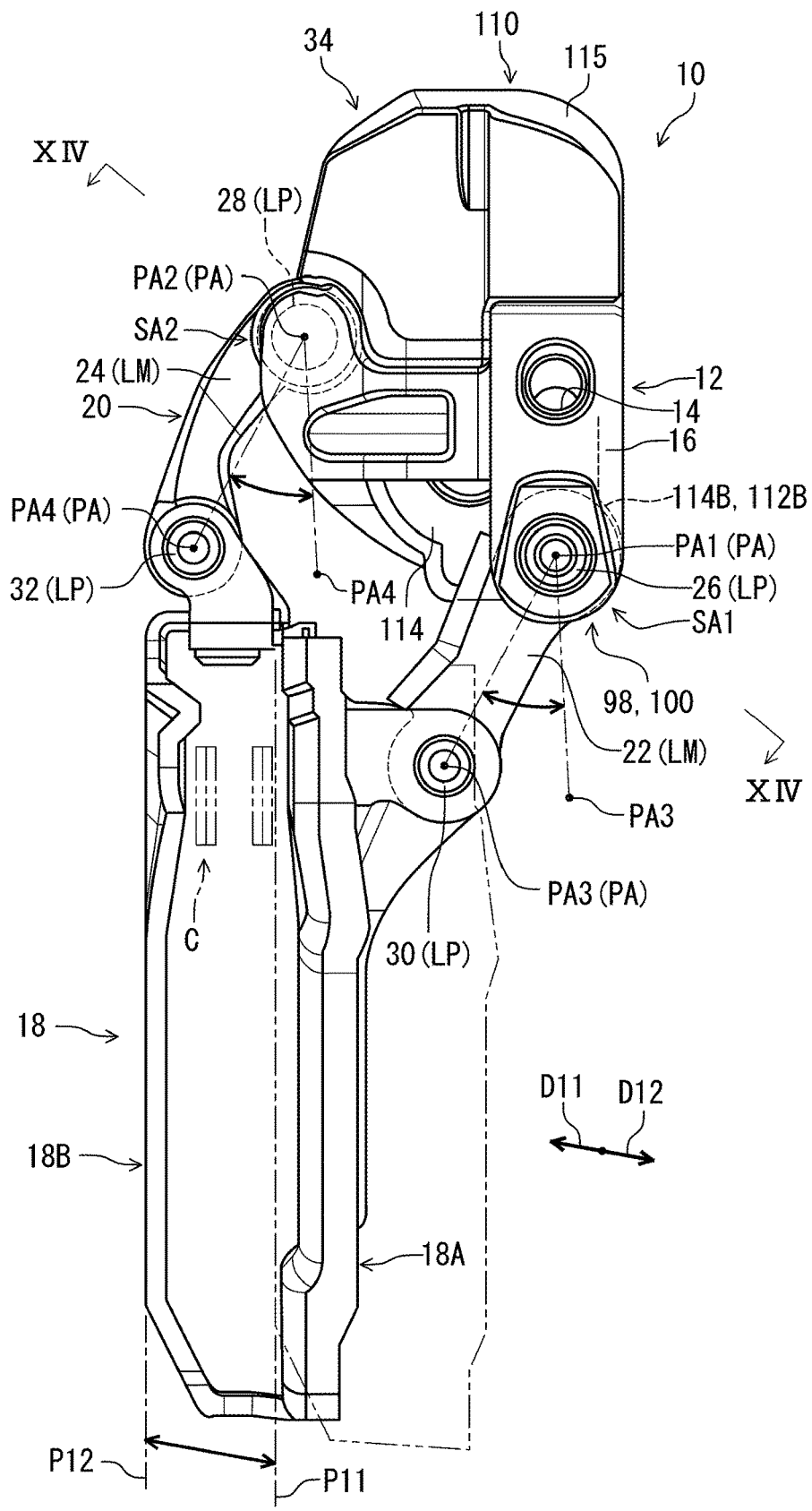
FIG. 5 is a front view of the bicycle derailleur illustrated in FIG. 2.

As seen in FIG. 5, the bicycle derailleur 10 comprises a chain guide 18. The chain guide 18 is movable relative to the base member 12. The chain guide 18 is movable relative to the base member 12 to guide a chain C. The chain guide 18 is contactable with the chain C. The chain guide 18 is movable relative to the base member 12 from a lower-gear position P11 to a higher-gear position P12 to move the chain C in an outward-shifting direction D11. The chain guide 18 is movable relative to the base member 12 from the higher-gear position P12 to the lower-gear position P11 to move the chain C in an inward-shifting direction D12 which is an opposite direction of the outward-shifting direction D11. The lower-gear position P11 is a position corresponding to a smaller sprocket of a sprocket assembly. The higher-gear position P12 is a position corresponding to a larger sprocket of the sprocket assembly. The chain guide 18 is configured to guide the chain C from the smaller sprocket to the larger sprocket in the outward-shifting direction D11. The chain guide 18 is configured to guide the chain C from the larger sprocket to the smaller sprocket in the inward-shifting direction D12.

The chain guide 18 comprises an inner guide member 18A and an outer guide member 18B. The inner guide member 18A is configured to guide the chain C in the outward-shifting direction D11. The outer guide member 18B is configured to guide the chain C in the inward-shifting direction D12. The outer guide member 18B is spaced apart from the inner guide member 18A in the outward-shifting direction D11. The outer guide member 18B is coupled to the inner guide member 18A.

Figure 6:
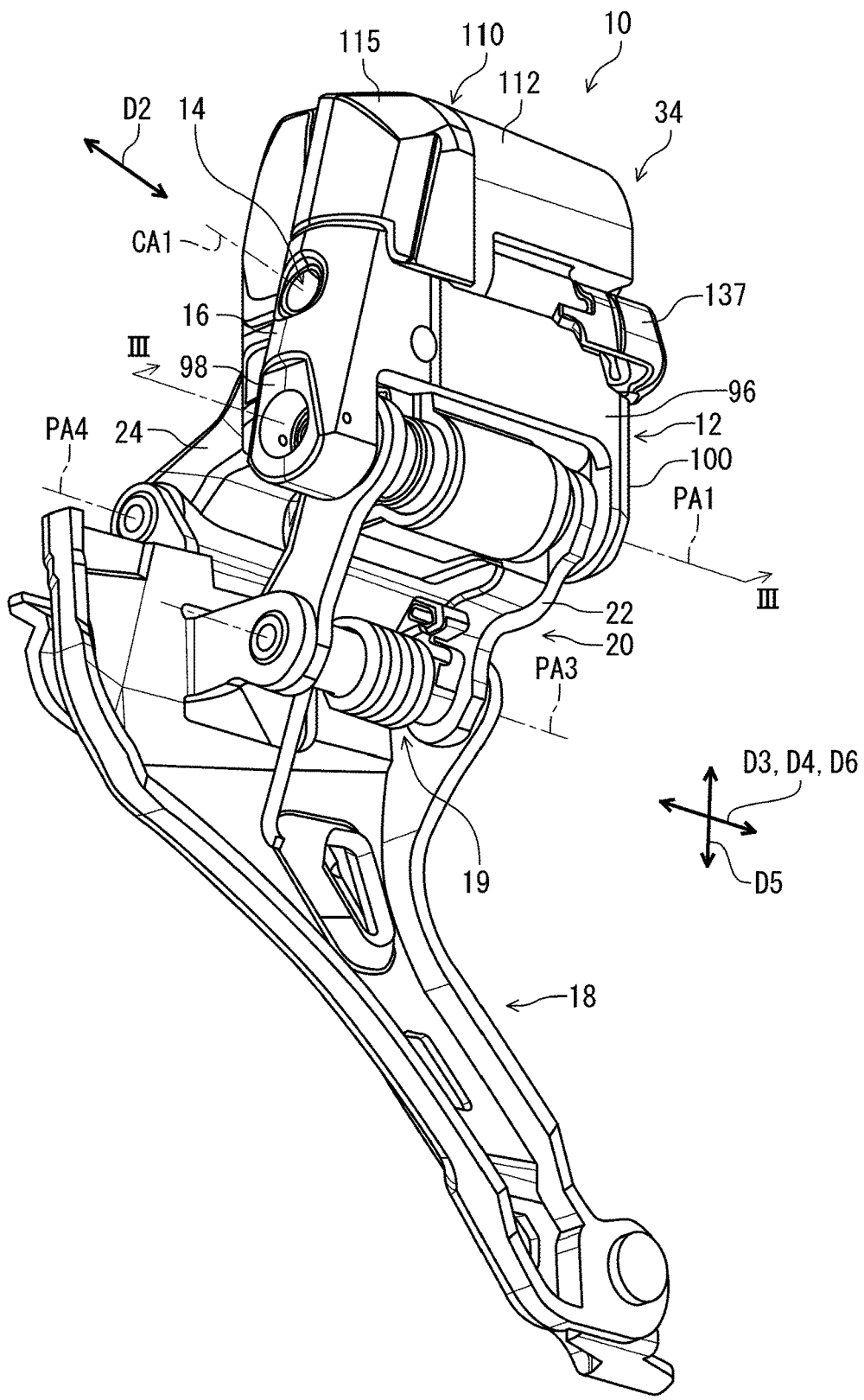
FIG. 6 is a perspective view of the bicycle derailleur illustrated in FIG. 2.

As seen in FIG. 6, the bicycle derailleur 10 comprises a biasing member 19. The biasing member 19 is configured to bias the chain guide 18 from one of the lower-gear position P11 (see, e.g., FIG. 5) and the higher-gear position P12 (see, e.g., FIG. 5) toward the other of the lower-gear position P11 and the higher-gear position P12. In the first embodiment, the biasing member 19 is configured to bias the chain guide 18 from the lower-gear position P11 toward the higher-gear position P12. However, the biasing member 19 can be configured to bias the chain guide 18 from the higher-gear position P12 toward the lower-gear position P11 if needed and/or desired.

Figure 7:
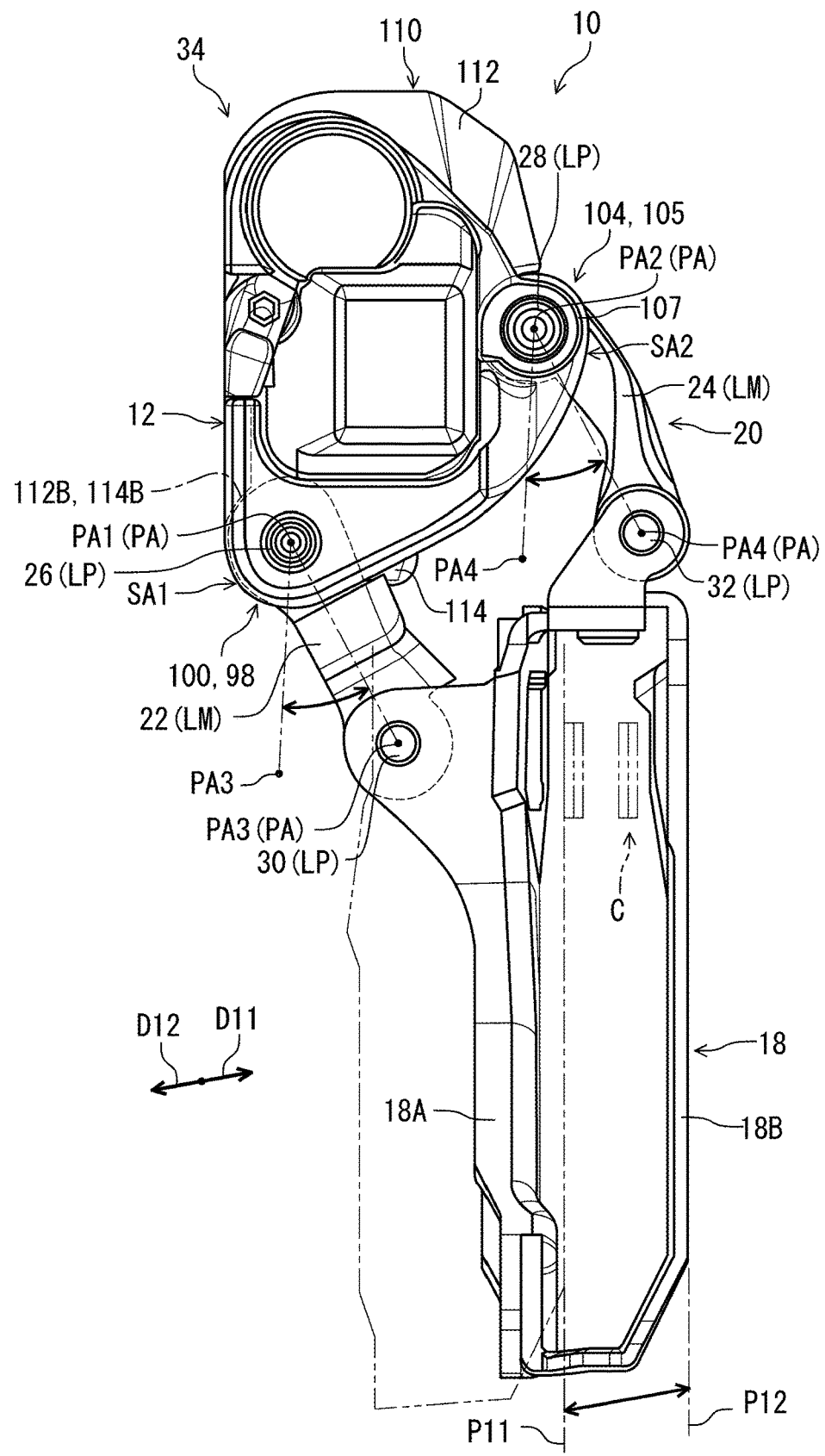
FIG. 7 is a rear view of the bicycle derailleur illustrated in FIG. 2.

As seen in FIG. 7, the bicycle derailleur 10 comprises a linkage structure 20. The linkage structure 20 is pivotally coupled to the base member 12. The linkage structure 20 is configured to movably couple the chain guide 18 to the base member 12. The linkage structure 20 comprises at least one link member LM and at least one link pin LP. The at least one link member LM is configured to movably couple the chain guide 18 to the base member 12. The at least one link pin LP is configured to pivotally couple the at least one link member LM to the base member 12 about at least one link pivot axis PA.

In the first embodiment, the at least one link member LM includes a first link member 22 and a second link member 24. The at least one link pivot axis PA includes a first pivot axis PA1, a second pivot axis PA2, a third pivot axis PA3, and a fourth pivot axis PA4. Namely, the linkage structure 20 comprises the first link member 22 and the second link member 24. The first link member 22 is pivotally coupled to the base member 12 about the first pivot axis PA1. The second link member 24 is pivotally coupled to the base member 12 about the second pivot axis PA2. The first link member 22 is pivotally coupled to the chain guide 18 about the third pivot axis PA3. The second link member 24 is pivotally coupled to the chain guide 18 about the fourth pivot axis PA4. The second link member 24 is spaced apart from the first link member 22 in the outward-shifting direction D11.

The first link member 22 can also be referred to as an inner link member 22. The second link member 24 can also be referred to as an outer link member 24. Namely, the linkage structure 20 comprises the inner link member 22 and the outer link member 24. The at least one link member LM includes the inner link member 22. The at least one link member LM includes the outer link member 24. The inner link member 22 is pivotally coupled to the base member 12 about the first pivot axis PA1. The outer link member 24 is pivotally coupled to the base member 12 about the second pivot axis PA2. The inner link member 22 is pivotally coupled to the chain guide 18 about the third pivot axis PA3. The outer link member 24 is pivotally coupled to the chain guide 18 about the fourth pivot axis PA4. The outer link member 24 is spaced apart from the inner link member 22 in the outward-shifting direction D11.

The at least one link pin LP includes a first link pin 26, a second link pin 28, a third link pin 30, and a fourth link pin 32. Namely, the linkage structure 20 comprises the first link pin 26, the second link pin 28, the third link pin 30, and the fourth link pin 32. The first link pin 26 is rotatably mounted to the base member 12 about the first pivot axis PA1. The first link pin 26 is configured to pivotally couple the first link member 22 to the base member 12 about the first pivot axis PA1. The second link pin 28 is configured to pivotally couple the second link member 24 to the base member 12 about the second pivot axis PA2. The third link pin 30 is configured to pivotally couple the first link member 22 to the chain guide 18 about the third pivot axis PA3. The fourth link pin 32 is configured to pivotally couple the second link member 24 to the chain guide 18 about the fourth pivot axis PA4.

The chain guide 18 is pivotally coupled to the first link member 22 to move relative to the base member 12 in response to a pivotal movement of the first link member 22 relative to the base member 12. The chain guide 18 is pivotally coupled to the second link member 24 to move relative to the base member 12 in response to a pivotal movement of the second link member 24 relative to the base member 12.

The first link pin 26 can also be referred to as an inner link pin 26. The second link pin 28 can also be referred to as an outer link pin 28. The first pivot axis PA1 can also be referred to as an inner-link pivot axis PA1. The second pivot axis PA2 can also be referred to as an outer-link pivot axis PA2. Namely, the linkage structure 20 comprises the inner link pin 26 and the outer link pin 28. The at least one link pin LP includes the inner link pin 26. The at least one link pin LP includes the outer link pin 28. The at least one link pivot axis PA includes the inner-link pivot axis PA1. The at least one link pivot axis PA includes the outer-link pivot axis PA2. The inner link pin 26 is configured to pivotally couple the inner link member 22 to the base member 12 about the inner-link pivot axis PA1. The outer link pin 28 is configured to pivotally couple the outer link member 24 to the base member 12 about the outer-link pivot axis PA2.

The first link member 22 and the inner link member 22 can also be referred to as a link member 22. The second link member 24 and the outer link pin 28 can also be referred to as a link member 24. The first link pin 26 and the inner link pin 26 can also be referred to as a link pin 26. The second link pin 28 and the outer link pin 28 can also be referred to as a link pin 28. The first pivot axis PA1 and the inner-link pivot axis PA1 can also be referred to as a link pivot axis PA1. The second pivot axis PA2 and the outer-link pivot axis PA2 can also be referred to as a link pivot axis PA2. Namely, the linkage structure 20 comprises the link member 22 and the link pin 26. The link pin 26 is configured to pivotally couple the link member 22 to the base member 12 about the link pivot axis PA1. Similarly, the linkage structure 20 comprises the link member 24 and the link pin 28. The link pin 28 is configured to pivotally couple the link member 24 to the base member 12 about the link pivot axis PA2.

As seen in FIG. 2, at least three of the first pivot axis PA1, the second pivot axis PA2, the third pivot axis PA3, and the fourth pivot axis PA4 are non-parallel to and non-perpendicular to the center axis CA1 of the mounting hole 14. At least one of the first pivot axis PA1 and the second pivot axis PA2 is non-parallel to and non-perpendicular to the center axis CA1 of the mounting hole 14. The second pivot axis PA2 and the fourth pivot axis PA4 are non-parallel to and non-perpendicular to the center axis CA1 of the mounting hole 14.

In the first embodiment, the first pivot axis PA1, the second pivot axis PA2, the third pivot axis PA3, and the fourth pivot axis PA4 are non-parallel to and non-perpendicular to the center axis CA1 of the mounting hole 14. The first pivot axis PA1, the second pivot axis PA2, the third pivot axis PA3, and the fourth pivot axis PA4 are parallel to each other. However, at least one of the first pivot axis PA1, the second pivot axis PA2, the third pivot axis PA3, and the fourth pivot axis PA4 can be parallel to and/or perpendicular to the center axis CA1 of the mounting hole 14. At least one of the first pivot axis PA1, the second pivot axis PA2, the third pivot axis PA3, and the fourth pivot axis PA4 can be non-parallel to another of the first pivot axis PA1, the second pivot axis PA2, the third pivot axis PA3, and the fourth pivot axis PA4. For example, the first pivot axis PA1 can be non-parallel to the third pivot axis PA3. The second pivot axis PA2 can be non-parallel to the fourth pivot axis PA4.

At least three of the first pivot axis PA1, the second pivot axis PA2, the third pivot axis PA3, and the fourth pivot axis PA4 are non-parallel to and non-perpendicular to a reference plane 16B defined on the mounting surface 16. The reference plane 16B of the mounting surface 16 is perpendicular to the center axis CA1 of the mounting hole 14. At least one of the first pivot axis PA1 and the second pivot axis PA2 is non-parallel to and non-perpendicular to the reference plane 16B defined on the mounting surface 16. The second pivot axis PA2 and the fourth pivot axis PA4 are non-parallel to and non-perpendicular to the reference plane 16B defined on the mounting surface 16. At least three of the first pivot axis PA1, the second pivot axis PA2, the third pivot axis PA3, and the fourth pivot axis PA4 are non-parallel to and non-perpendicular to the reference direction D2 perpendicular to the reference plane 16B defined on the mounting surface 16.

In the first embodiment, the first pivot axis PA1, the second pivot axis PA2, the third pivot axis PA3, and the fourth pivot axis PA4 are non-parallel to and non-perpendicular to the reference plane 16B defined on the mounting surface 16. However, at least one of the first pivot axis PA1, the second pivot axis PA2, the third pivot axis PA3, and the fourth pivot axis PA4 can be parallel to and/or perpendicular to the reference plane 16B defined on the mounting surface 16.

At least one of the first pivot axis PA1 and the second pivot axis PA2 is non-parallel to and non-perpendicular to a reference direction D2 perpendicular to the reference plane 16B defined on the mounting surface 16. The second pivot axis PA2 and the fourth pivot axis PA4 are non-parallel to and non-perpendicular to the reference direction D2 perpendicular to the reference plane 16B defined on the mounting surface 16.

In the first embodiment, the first pivot axis PA1, the second pivot axis PA2, the third pivot axis PA3, and the fourth pivot axis PA4 are non-parallel to and non-perpendicular to the reference direction D2 perpendicular to the reference plane 16B defined on the mounting surface 16. However, at least one of the first pivot axis PA1, the second pivot axis PA2, the third pivot axis PA3, and the fourth pivot axis PA4 can be parallel to and/or perpendicular to the reference direction D2 perpendicular to the reference plane 16B defined on the mounting surface 16 if needed and/or desired.

As seen in FIG. 4, the reference plane 16B of the mounting surface 16 is defined as a tangent plane of the curved surface 16A. The reference direction D2 is parallel to the center axis CA1 of the mounting hole 14. However, the reference direction D2 can be non-parallel to the center axis CA1 of the mounting hole 14.

As seen in FIG. 7, the bicycle derailleur 10 comprises a motor unit 34. The motor unit 34 can also be referred to as a bicycle motor unit 34. The motor unit 34 is configured to move the chain guide 18 relative to the base member 12. The motor unit 34 is configured to move the chain guide 18 relative to the base member 12 from the lower-gear position P11 to the higher-gear position P12 in the outward-shifting direction D11. The motor unit 34 is configured to move the chain guide 18 relative to the base member 12 from the higher-gear position P12 to the lower-gear position P11 in the inward-shifting direction D12.

The bicycle motor unit 34 is configured to apply rotational force to at least one of the chain guide 18 and the linkage structure 20 to move the chain guide 18 relative to the base member 12. In the first embodiment, the bicycle motor unit 34 is configured to apply the rotational force to the linkage structure 20 to move the chain guide 18 relative to the base member 12. The bicycle motor unit 34 is configured to apply the rotational force to the chain guide 18 through the linkage structure 20 to move the chain guide 18 relative to the base member 12. However, the bicycle motor unit 34 can be configured to apply the rotational force to the chain guide 18 or both the chain guide 18 and the linkage structure 20 if needed and/or desired.

Figure 8:
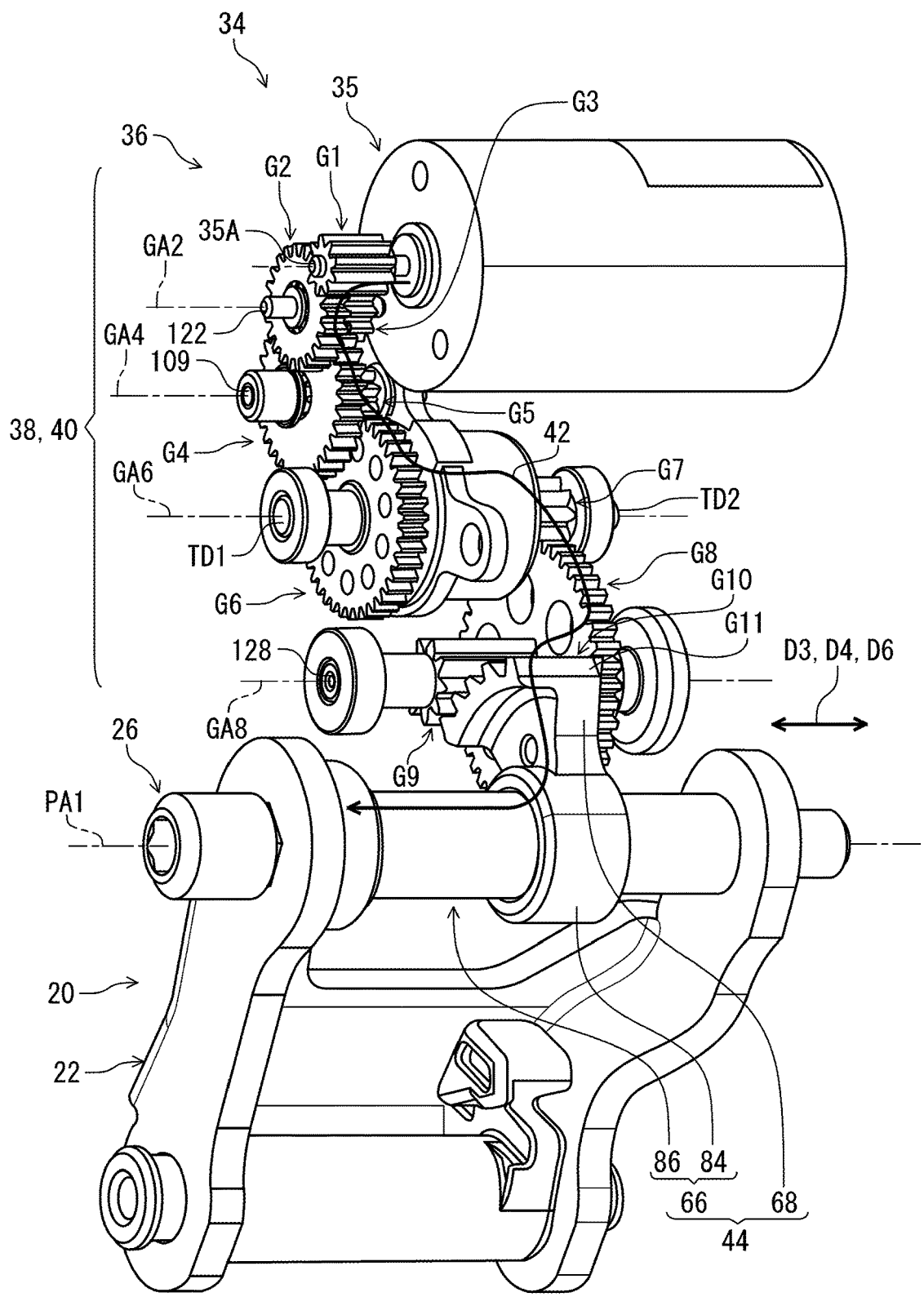
FIG. 8 is a perspective view of a motor unit and a link member of the bicycle derailleur illustrated in FIG. 2.

As seen in FIG. 8, the bicycle motor unit 34 comprises a motor 35 and a bicycle gear structure 36. The bicycle gear structure 36 can also be referred to as a gear structure 36. The motor 35 is configured to generate the rotational force. Examples of the motor 35 include a direct-current (DC) motor and a stepper motor. However, the motor 35 can include other type of motor.

The bicycle gear structure 36 is configured to transmit the rotational force. The gear structure 36 includes a plurality of gears 38. The plurality of gears 38 is configured to transmit the rotational force to the at least one of the chain guide 18 and the linkage structure 20. In the first embodiment, the plurality of gears 38 is configured to transmit the rotational force to the linkage structure 20. The plurality of gears 38 is configured to transmit the rotational force to the chain guide 18 through the linkage structure 20. However, the plurality of gears 38 can be configured to transmit the rotational force directly to the chain guide 18 or both the chain guide 18 and the linkage structure 20.

In the first embodiment, the gear structure 36 includes a plurality of spur gears 40. The plurality of spur gears 40 is configured to transmit the rotational force to the at least one of the chain guide 18 and the linkage structure 20. The plurality of spur gears 40 is configured to transmit the rotational force to the linkage structure 20. The plurality of spur gears 40 is configured to transmit the rotational force to the chain guide 18 through the linkage structure 20. However, the plurality of spur gears 40 can be configured to transmit the rotational force directly to the chain guide 18 or both the chain guide 18 and the linkage structure 20.

The motor unit 34 is free of gears other than the plurality of spur gears 40 on a rotational-force transmission path 42 provided from the motor 35 to the at least one of the chain guide 18 (see, e.g., FIG. 7) and the linkage structure 20. In the first embodiment, the rotational-force transmission path 42 is provided from the motor 35 to the linkage structure 20. However, the rotational-force transmission path 42 can be provided from the motor 35 to the chain guide 18 (see, e.g., FIG. 7) or to both the chain guide 18 (see, e.g., FIG. 7) and the linkage structure 20. The motor unit 34 can include a gear other than the plurality of spur gears 40 on the rotational-force transmission path 42 provided from the motor 35 to the at least one of the chain guide 18 (see, e.g., FIG. 7) and the linkage structure 20 if needed and/or desired.

The plurality of gears 38 includes gears G1 to G10. Each of the gears G1 to G10 are a spur gear. The gear G1 is configured to mesh with the gear G2. The gear G2 is configured to be rotatable along with the gear G3. The gear G3 is configured to mesh with the gear G4. The gear G4 is configured to be rotatable along with the gear G5. The gear G5 is configured to mesh with the gear G6. The gear G6 is configured to be rotatable along with the gear G7. The gear G7 is configured to mesh with the gear G8. The gear G8 is configured to be rotatable along with the gear G9. The gear G9 is configured to mesh with the gear G10. The gear G10 is configured to be rotatable along with the first link pin 26.

The motor 35 includes an output shaft 35A. The motor 35 is configured to rotate the output shaft 35A. The gear G1 can also be referred to as an input gear G1. The gear G10 can also be referred to as an output gear G10. Namely, the plurality of spur gears 40 includes the input gear G1 and the output gear G10. The input gear G1 is secured to the output shaft 35A. The output gear G10 is coupled to the at least one of the chain guide 18 (see, e.g., FIG. 7) and the linkage structure 20. In the first embodiment, the output gear G10 is coupled to the linkage structure 20 and is coupled to the chain guide 18 through the linkage structure 20. However, the output gear G10 can be coupled directly to the chain guide 18 or both the chain guide 18 and the linkage structure 20. The output gear G10 includes a sector gear G11. However, the output gear G10 can include other type of gear if needed and/or desired.

The gear structure 36 has a reduction ratio equal to or lower than 1400. The reduction ratio is defined from the input gear G1 to the output gear G10. In the first embodiment, the reduction ratio of the gear structure 36 is approximately 832. However, the reduction ratio of the gear structure 36 can be higher than 1400 if needed and/or desired.

The motor unit 34 is configured to apply the rotational force to the at least one link pin LP to rotate the at least one link pin LP and to pivot the at least one link member LM relative to the base member 12 about the at least one link pivot axis PA. The motor unit 34 is configured to apply the rotational force to the first link pin 26 to rotate the first link pin 26 relative to the base member 12 about the first pivot axis PA1.

The motor unit 34 includes an output structure 44. The output structure 44 is coupled to the at least one link pin LP to be rotatable relative to the base member 12 about the at least one link pivot axis PA. The output structure 44 is coupled to the first link pin 26 to be rotatable relative to the base member 12 about the first pivot axis PA1. The output structure 44 is directly or indirectly coupled to the first link pin 26 to be rotatable relative to the base member 12 about the first pivot axis PA1. In the first embodiment, the output structure 44 is directly coupled to the first link pin 26 to be rotatable relative to the base member 12 about the first pivot axis PA1. However, the output structure 44 can be indirectly coupled to the first link pin 26 to be rotatable relative to the base member 12 about the first pivot axis PA1 if needed and/or desired.

Figure 9:
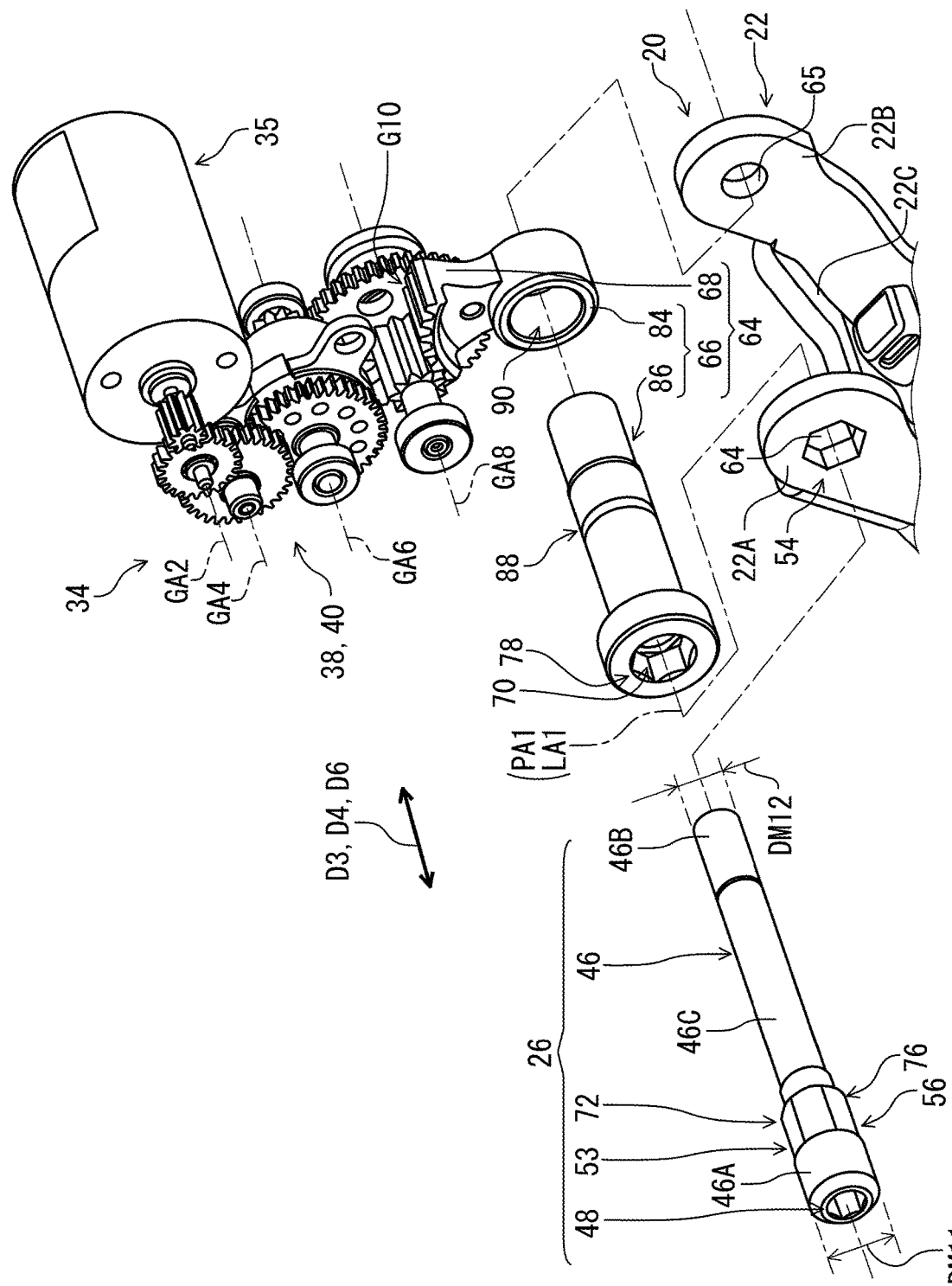
FIG. 9 is an exploded perspective view of the motor unit and the link member of the bicycle derailleur illustrated in FIG. 2.

As seen in FIG. 9, the link pin 26 for the bicycle derailleur 10 comprises a pin body 46 and a tool-engagement profile 48. The pin body 46 includes a first end portion 46A, a second end portion 46B, and an intermediate portion 46C. Namely, the first link pin 26 includes a first end portion 46A and a second end portion 46B. The intermediate portion 46C extends between the first end portion 46A and the second end portion 46B in a longitudinal direction D3 with respect to a longitudinal axis LA1 of the link pin 26. The first pivot axis PA1 and the longitudinal axis LA1 extend along the longitudinal direction D3.

The first pivot axis PA1 and the longitudinal axis LA1 are parallel to the longitudinal direction D3. The longitudinal axis LA1 of the link pin 26 is coincident with the first pivot axis PA1. However, the longitudinal axis LA1 of the link pin 26 can be offset from the first pivot axis PA1 if needed and/or desired. The first pivot axis PA1 and the longitudinal axis LA1 can be non-parallel to the longitudinal direction D3 if needed and/or desired.

The first end portion 46A has a first outer diameter DM11. The second end portion 46B has a second outer diameter DM12. In the first embodiment, the first outer diameter DM11 is larger than the second outer diameter DM12. However, the first outer diameter DM11 can be equal to or smaller than the second outer diameter DM12 if needed and/or desired.

The tool-engagement profile 48 is configured to engage with a tool for rotating the link pin 26. The tool-engagement profile 48 is provided to at least one of the first end portion 46A, the second end portion 46B, and the intermediate portion 46C. Examples of the tool includes a hexagon wrench. The tool-engagement profile 48 allows the user to change a rotational position of the first link pin 26 about the first pivot axis PA1 relative to the base member 12 and/or the output structure 44 using the tool such as the hexagon wrench.

In the first embodiment, the tool-engagement profile 48 is provided at the first end portion 46A. However, the tool-engagement profile 48 can be provided to at least one of the second end portion 46B and the intermediate portion 46C instead of or in addition to the first end portion 46A if needed and/or desired.

Figure 10:
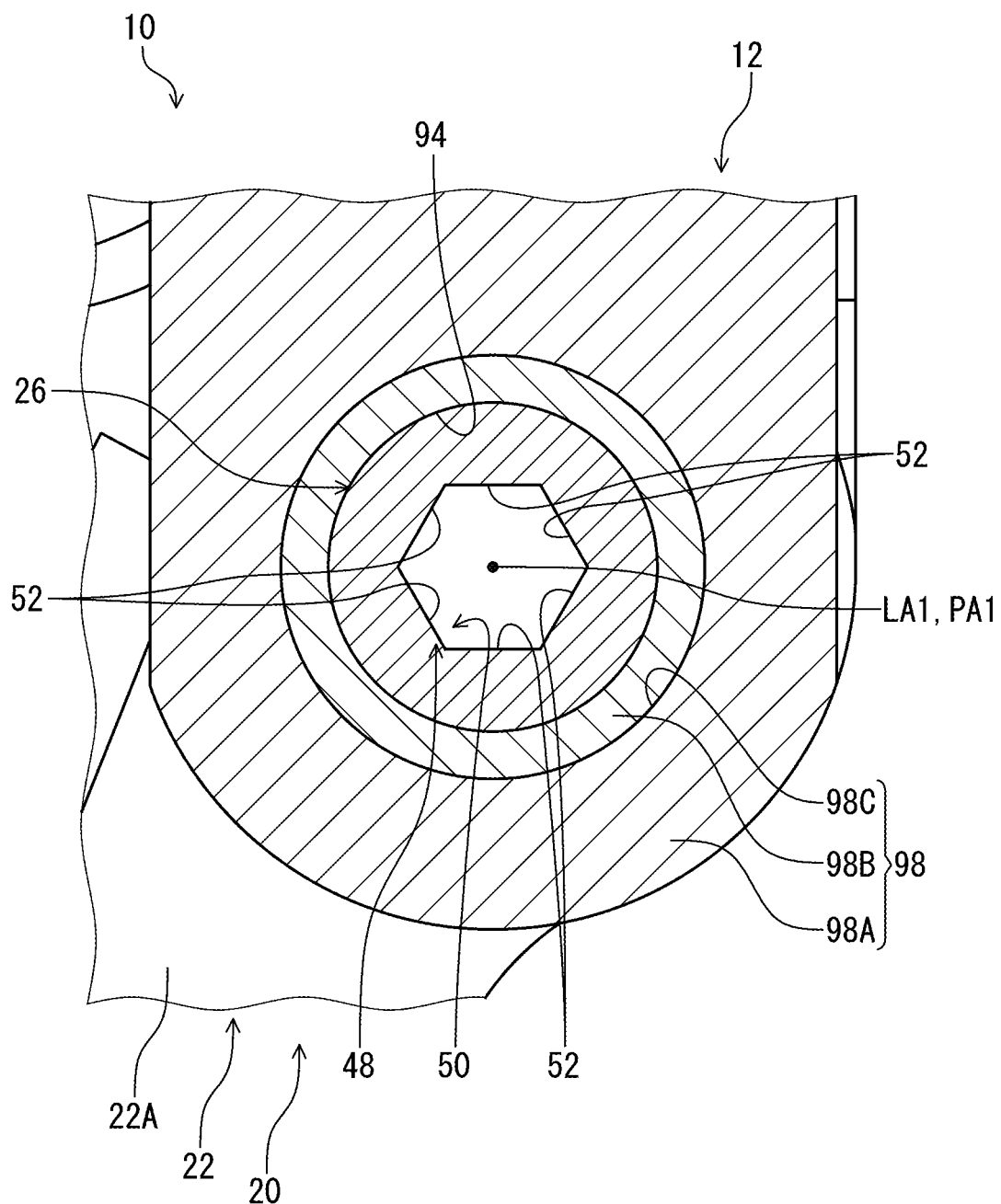
FIG. 10 is a cross-sectional view of the bicycle derailleur taken along line X-X of FIG. 3.

As seen in FIG. 10, the tool-engagement profile 48 has a shape other than a perfect circle as viewed along the longitudinal axis LA1. The tool-engagement profile 48 has a polygonal shape. The tool-engagement profile 48 has a hexagonal shape. The tool-engagement profile 48 includes a tool-engagement hole 50. The tool-engagement hole 50 includes a hexagonal hole. Namely, the tool-engagement profile 48 includes a tool-engagement inner profile having a shape other than a perfect circle as viewed along the longitudinal axis LA1. However, the tool-engagement profile 48 can include a tool-engagement outer profile instead of or in addition to the tool-engagement inner profile if needed and/or desired. The tool-engagement outer profile can have a shape other than a perfect circle as viewed along the longitudinal axis LA1 if needed and/or desired. The tool-engagement outer profile can have a polygonal shape such as a hexagonal shape if needed and/or desired. Furthermore, the tool-engagement profile 48 (the tool-engagement inner and/or outer profile) can have shapes other than a polygonal shape, such as an oval shape, a spline, and a serration if needed and/or desired.

The tool-engagement profile 48 includes at least one flat inner surface 52. The tool-engagement profile 48 includes six flat inner surfaces 52 constituting the hexagonal shape. The flat inner surface 52 defines the tool-engagement hole 50. However, the tool-engagement profile 48 can include other surfaces such as a curved surface instead of or in addition to the at least one flat inner surface 52 if needed and/or desired.

As seen in FIG. 9, the first link member 22 is coupled to the first link pin 26 to be pivotable relative to the base member 12 about the first pivot axis PA1 The first link member 22 is coupled directly to the first link pin 26 to be pivotable relative to the base member 12 about the first pivot axis PA1. However, the first link member 22 can be coupled indirectly to the first link pin 26 to be pivotable relative to the base member 12 about the first pivot axis PA1 if needed and/or desired.

At least one of the first link pin 26 and the output structure 44 includes a first coupling part 53. The first link member 22 includes a second coupling part 54. The first coupling part 53 is engaged with the second coupling part 54 to transmit the rotational force from the at least one of the first link pin 26 and the output structure 44 to the first link member 22. The first coupling part 53 is engaged with the second coupling part 54 to restrict a relative rotation between the inner link member 22 and the one of the inner link pin 26 and the output structure 44.

In the first embodiment, the first link pin 26 includes the first coupling part 53. The first coupling part 53 is engaged with the second coupling part 54 to transmit the rotational force from the first link pin 26 to the first link member 22. However, the output structure 44 or both the first link pin 26 and the output structure 44 can include the first coupling part 53 if needed and/or desired. The first coupling part 53 can be engaged with the second coupling part 54 to transmit the rotational force from the output structure 44 or both the first link pin 26 and the output structure 44 to the first link member 22.

Figure 11:
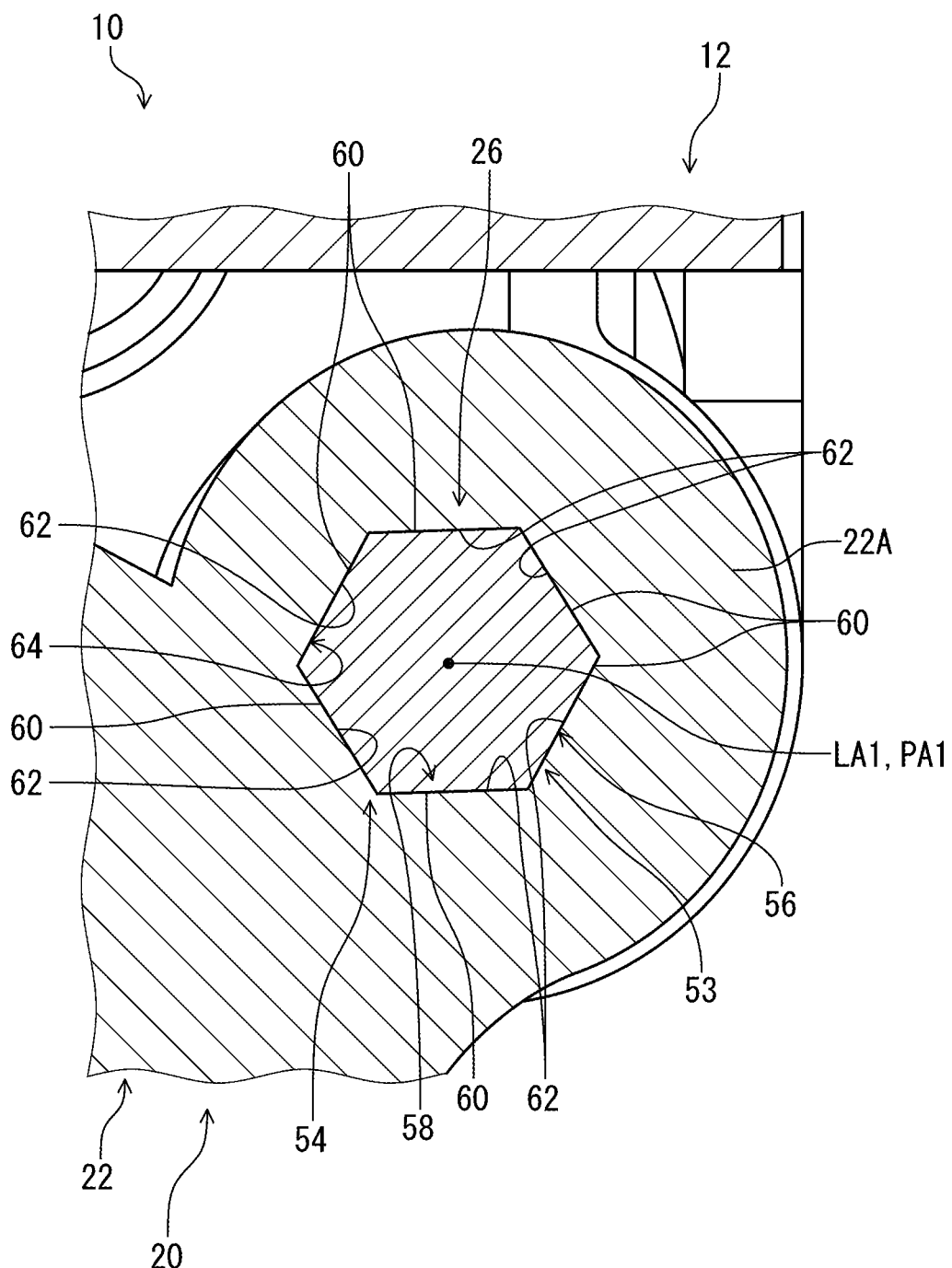
FIG. 11 is a cross-sectional view of the bicycle derailleur taken along line XI-XI of FIG. 3.

As seen in FIG. 11, the first coupling part 53 has a first profile 56 other than a perfect circle as viewed along the first pivot axis PA1. The second coupling part 54 has a second profile 58 other than a perfect circle as viewed along the first pivot axis PA1. The first profile 56 can also be referred to as a torque-transmitting profile 56. Namely, the link pin for 26 the bicycle derailleur 10 comprises the torque-transmitting profile 56. The torque-transmitting profile 56 is configured to transmit the rotational force of the link pin 26 to the link member 22 of the bicycle derailleur 10. The torque-transmitting profile 56 is configured to restrict a relative rotation between the link pin 26 and the link member 22 about the first pivot axis PA1.

In the first embodiment, the first profile 56 of the first coupling part 53 has a polygonal shape. The second profile 58 of the second coupling part 54 has a polygonal shape. The torque-transmitting profile 56 has a polygonal shape. The first profile 56 has a hexagonal shape. The second profile 58 has a hexagonal shape. The torque-transmitting profile 56 has a hexagonal shape. The first profile 56 and the second profile 58 are configured to transmit the rotational force from the at least one of the first link pin 26 and the output structure 44 to the first link member 22. The first profile 56 and the second profile 58 can have shapes other than a polygonal shape, s such as an oval shape, a spline, and a serration if needed and/or desired.

The first coupling part 53 includes at least one first flat surface 60. The torque-transmitting profile 56 includes at least one first flat surface 60. The second coupling part 54 includes at least one second flat surface 62. The at least one first flat surface 60 is contactable with the at least one second flat surface 62 to transmit the rotational force from the at least one of the first link pin 26 and the output structure 44 to the first link member 22 in a state where the first coupling part 53 is engaged with the second coupling part 54. The at least one first flat surface 60 is contactable with the at least one second flat surface 62 to restrict a relative rotation between the first link member 22 and the at least one of the first link pin 26 and the output structure 44 about the first pivot axis PAL In the first embodiment, the at least one first flat surface 60 is contactable with the at least one second flat surface 62 to transmit the rotational force from the first link pin 26 to the first link member 22 in the state where the first coupling part 53 is engaged with the second coupling part 54. However, the at least one first flat surface 60 can be configured to be contactable with the at least one second flat surface 62 to transmit the rotational force from the output structure 44 or both the first link pin 26 and the output structure 44 to the first link member 22 in the state where the first coupling part 53 is engaged with the second coupling part 54.

The first coupling part 53 includes six first flat surfaces 60 constituting the hexagonal shape. The second coupling part 54 includes six second flat surfaces 62 constituting the hexagonal shape. The first flat surface 60 is configured to face the second flat surface 62 and is contactable with the second flat surface 62. The first flat surface 60 faces away from the longitudinal axis LA1. The second flat surface 62 faces toward the longitudinal axis LA1. The second coupling part 54 includes a coupling hole 64 having the second profile 58. The coupling hole 64 is defined by the second flat surfaces 62. The first coupling part 53 is provided in the coupling hole 64. However, the second coupling part 54 can include structures other than a hole if needed and/or desired.

As seen in FIG. 9, the torque-transmitting profile 56 is provided to at least one of the first end portion 46A, the second end portion 46B, and the intermediate portion 46C. In the first embodiment, the torque-transmitting profile 56 is provided to the intermediate portion 46C and is provided between the first end portion 46A and the second end portion 46B. The torque-transmitting profile 56 is closer to the first end portion 46A than to the second end portion 46B. However, the torque-transmitting profile 56 can be provided to at least one the first end portion 46A and the second end portion 46B instead of or in addition to the intermediate portion 46C if needed and/or desired.

The torque-transmitting profile 56 is provided at a position different from a position of the tool-engagement profile 48 in the longitudinal direction D3. The torque-transmitting profile 56 is offset from the tool-engagement profile 48 in the longitudinal direction D3. However, the torque-transmitting profile 56 can be provided at the same position as the position of the tool-engagement profile 48 in the longitudinal direction D3 if needed and/or desired. In such modification, the torque-transmitting profile 56 can be provided radially outward of the tool-engagement profile 48 with respect to the longitudinal axis LA1.

The first link member 22 includes a first link arm 22A, a first additional link aim 22B, and an intermediate plate 22C. The first link aim 22A extends from the intermediate plate 22C. The second link arm extends from the intermediate plate 22C. The first additional link arm 22B is spaced apart from the first link arm 22A in an axial direction D4 with respect to the first pivot axis PA1. The first link arm 22A includes the second coupling part 54. The first additional link arm 22B includes an additional coupling hole 65. The first link pin 26 extends through the coupling hole 64 and the additional coupling hole 65. The additional coupling hole 65 has a profile having a perfect circle as viewed along the first pivot axis PA1. However, the additional coupling hole 65 can have a profile other than a perfect circle if needed and/or desired.

As seen in FIG. 9, the output structure 44 includes an engagement body 66 and a geared portion 68. The engagement body 66 includes a first engagement hole 70. The geared portion 68 is provided on the engagement body 66. The geared portion 68 extends radially outward from the engagement body 66. The geared portion 68 includes the output gear G10. Thus, the output gear G10 is coupled to the inner link pin 26 to be pivotable relative to the base member 12 along with the inner link pin 26 about the inner-link pivot axis PA1. The first link pin 26 includes a first engagement part 72. The first engagement part 72 is provided in the first engagement hole 70 to transmit the rotational force from the output structure 44 to the first link pin 26. The first engagement part 72 is provided in the first engagement hole 70 to restrict a relative rotation between the first link pin 26 and the output structure 44.

Figure 12:
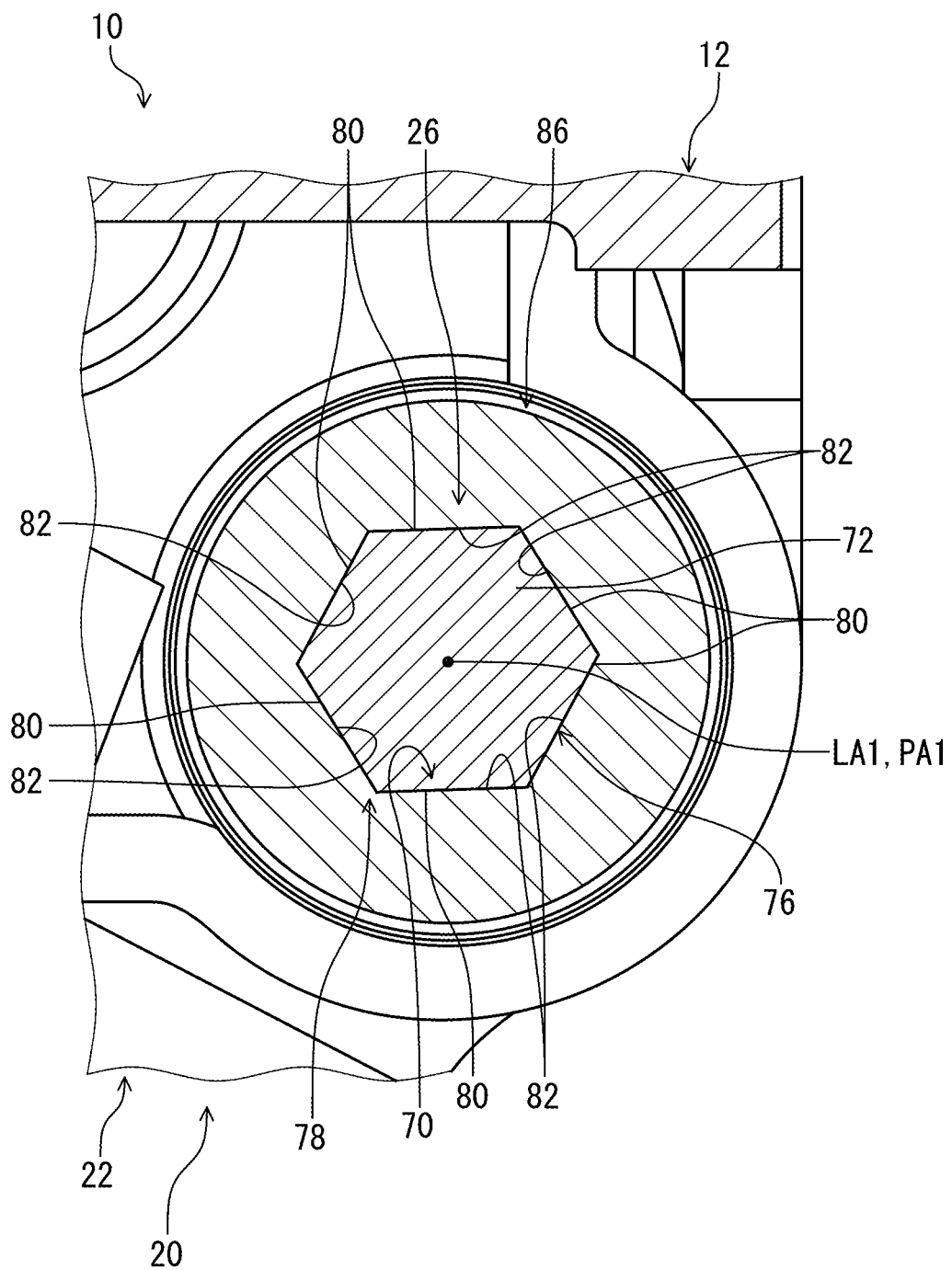
FIG. 12 is a cross-sectional view of the bicycle derailleur taken along line XII-XII of FIG. 3.

As seen in FIG. 12, the first engagement part 72 has an outer profile 76 other than a perfect circle as viewed along the first pivot axis PA1. The first engagement hole 70 has an inner profile 78 other than a perfect circle as viewed along the first pivot axis PA1. In the first embodiment, the outer profile 76 of the first engagement part 72 has a polygonal shape. The inner profile 78 of the first engagement hole 70 has a polygonal shape. The outer profile 76 has a hexagonal shape. The inner profile 78 has a hexagonal shape. The outer profile 76 and the inner profile 78 are configured to transmit the rotational force from the output structure 44 to the first link pin 26. However, the outer profile 76 and the inner profile 78 can have shapes other than a polygonal shape, such as an oval shape, a spline, and a serration if needed and/or desired.

The first engagement part 72 includes at least one outer flat surface 80. The first engagement hole 70 includes at least one inner flat surface 82. The at least one outer flat surface 80 is contactable with the at least one inner flat surface 82 to transmit the rotational force from the output gear G10 (see, e.g., FIG. 9) to the first link pin 26 in a state where the first engagement part 72 is provided in the first engagement hole 70. The at least one outer flat surface 80 is contactable with the at least one inner flat surface 82 to restrict a relative rotation between the output gear G10 (see, e.g., FIG. 9) and the first link pin 26 about the first pivot axis PA1 in the state where the first engagement part 72 is provided in the first engagement hole 70.

In the first embodiment, the first engagement part 72 includes six outer flat surfaces 80 constituting the hexagonal shape. The first engagement hole 70 includes six inner flat surfaces 82 constituting the hexagonal shape. The outer flat surface 80 is configured to face the inner flat surface 82 and is contactable with the inner flat surface 82. The outer flat surface 80 faces away from the longitudinal axis LA1. The inner flat surface 82 faces toward the longitudinal axis LA1. The first engagement hole 70 is defined by the second flat surfaces 62. However, the first engagement part 72 can include structures other than the at least one outer flat surface 80 if needed and/or desired. The first engagement hole 70 can include structures other than the at least one inner flat surface 82 if needed and/or desired.

In the first embodiment, the first engagement part 72 frictionally engages with the first engagement hole 70. The first engagement part 72 is press-fitted in the first engagement hole 70. However, the engagement structure between the first engagement part 72 and the first engagement hole 70 is not limited to the frictional engagement such as press-fitting. The engagement structure between the first engagement part 72 and the first engagement hole 70 can include other structure such as a bonding structure (e.g., an adhesive agent). Furthermore, the shapes of the first engagement hole 70 and the first engagement part 72 are not limited to a polygonal shape. At least one of the first engagement hole 70 and the first engagement part 72 can have another profile such as a circular shape, a spline, and a serration.

In the first embodiment, the first engagement part 72 and the first coupling part 53 are adjacent to each other in an axial direction D4 with respect to the first pivot axis PA1. The first engagement part 72 and the first coupling part 53 are integrally provided with each other as a one-piece unitary member. However, the first engagement part 72 can be a separate part from the first coupling part 53. The first engagement part 72 can be spaced apart from the first coupling part 53 in the axial direction D4 if needed and/or desired.

As seen in FIG. 9, the engagement body 66 includes a tubular part 84 and a sleeve 86 which is a separate member from the tubular part 84. The tubular part 84 is a separate member from the link pin 26 and the sleeve 86. The sleeve 86 includes the first engagement hole 70 and a second engagement part 88. The tubular part 84 includes a second engagement hole 90. The second engagement part 88 is provided in the second engagement hole 90 to transmit the rotational force from the tubular part 84 to the sleeve 86. The second engagement part 88 is provided in the second engagement hole 90 to restrict a relative rotation between the tubular part 84 and the sleeve 86 about the first pivot axis PA1.

Figure 13:
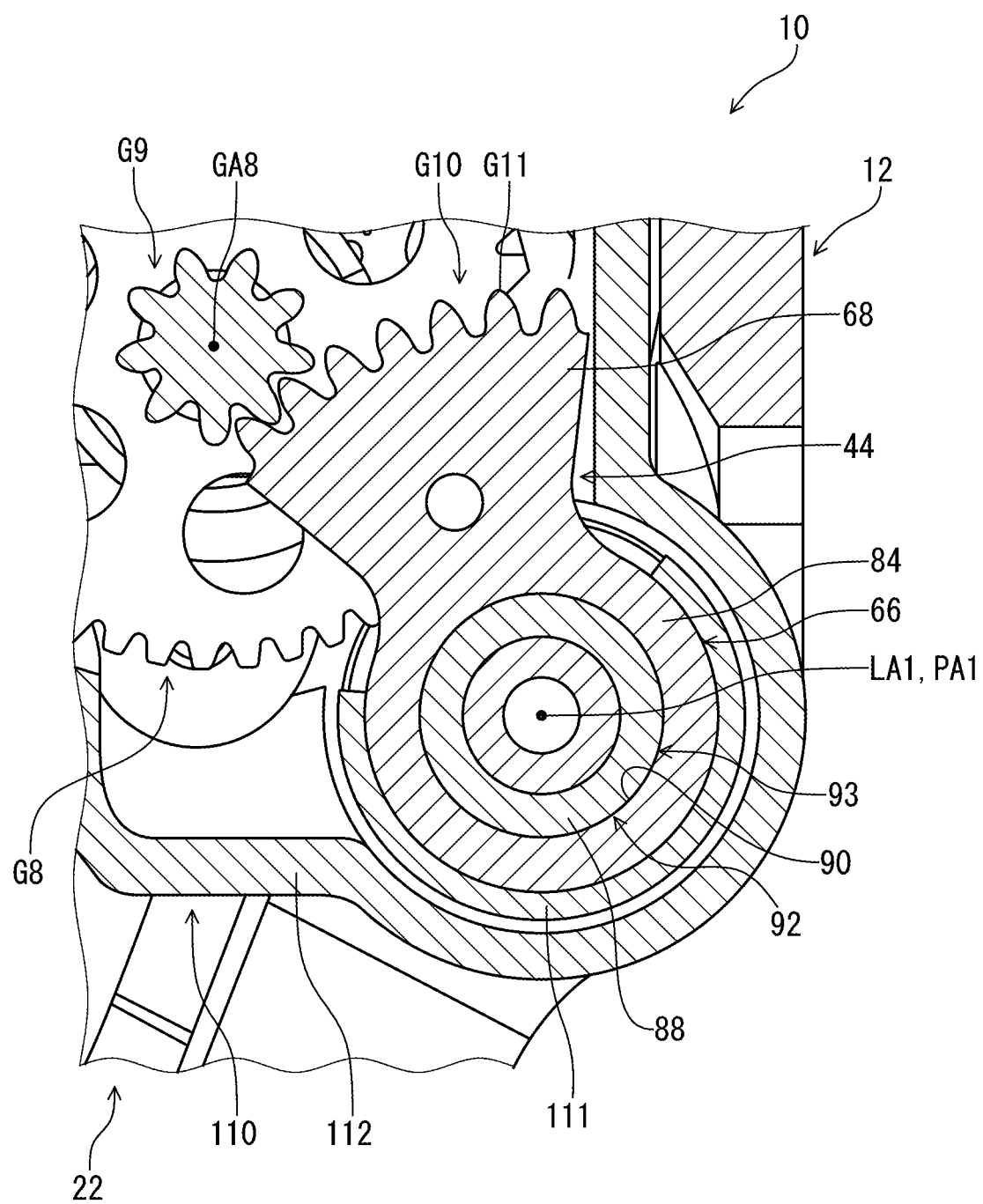
FIG. 13 is a cross-sectional view of the bicycle derailleur taken along line XIII-XIII of FIG. 3.

As seen in FIG. 13, the second engagement part 88 has an additional outer profile 92 which at least partly includes a perfect circle as viewed along the first pivot axis PA1. The second engagement hole 90 has an additional inner profile 93 which at least partly includes a perfect circle as viewed along the first pivot axis PAL In the first embodiment, the second engagement part 88 frictionally engages with the second engagement hole 90. The second engagement part 88 is press-fitted in the second engagement hole 90. However, the engagement structure between the second engagement part 88 and the second engagement hole 90 is not limited to the frictional engagement such as press-fitting. The engagement structure between the second engagement part 88 and the second engagement hole 90 can include other structure such as a bonding structure (e.g., an adhesive agent). Furthermore, the shapes of the second engagement part 88 and the second engagement hole 90 are not limited to a circular shape. At least one of the second engagement part 88 and the second engagement hole 90 can have other shapes such as an oval shape and a polygonal shape (e.g., a hexagonal shape, a spline, a serration).

As seen in FIG. 3, the first link pin 26 extends through the first engagement hole 70. The sleeve 86 extends through the second engagement hole 90. The first link pin 26 has a first length L1. The output structure 44 has a second length L2. The first length L1 is longer than the second length L2. The first end portion 46A is provided outside the first engagement hole 70. The second end portion 46B is provided outside the first engagement hole 70.

The base member 12 includes a first support hole 94 and a second support hole 95 spaced apart from the first support hole 94 along the first pivot axis PA1. The first end portion 46A is provided in the first support hole 94. The second end portion 46B is provided in the second support hole 95.

As seen in FIG. 6, the base member 12 includes a base body 96, a first support body 98, and a second support body 100. The first support body 98 protrudes from the base body 96 in a protruding direction D5 perpendicular to the first pivot axis PAL The second support body 100 protrudes from the base body 96 in the protruding direction D5.

Figure 14:
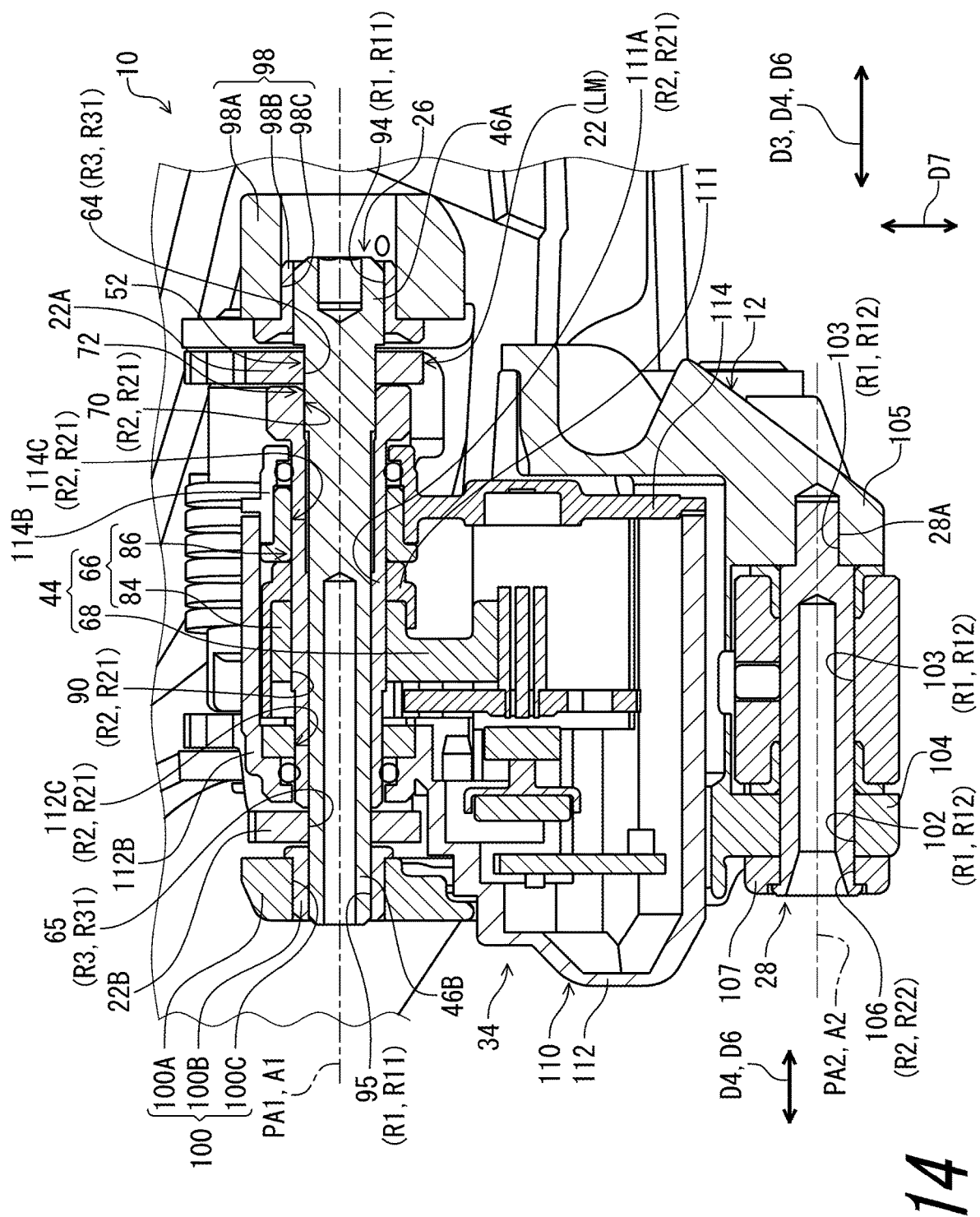
FIG. 14 is a cross-sectional view of the bicycle derailleur taken along line XIV-XIV of FIG. 5.

As seen in FIG. 14, the first support body 98 includes the first support hole 94. The second support body 100 includes the second support hole 95. The second support body 100 is spaced apart from the first support body 98 in the axial direction D4.

The first support body 98 includes a first support part 98A and a first bush 98B. The first support part 98A includes a first hole 98C. The first bush 98B includes the first support hole 94 and is provided in the first hole 98C. The second support body 100 includes a second support part 100A and a second bush 100B. The second support part 100A includes a second hole 100C. The second bush 100B includes the second support hole 95 and is provided in the second hole 100C. However, the first bush 98B can be integrally provided with the first support part 98A as a one-piece unitary member. The second bush 100B can be integrally provided with the second support part 100A as a one-piece unitary member.

The first link arm 22A is provide between the output structure 44 and the first support body 98 of the base member 12 in the axial direction D4. The first additional link arm 22B is provided between the output structure 44 and the second support body 100 of the base member 12 in the axial direction D4. The output structure 44 is provided between the first link arm 22A and the first additional link arm 22B in the axial direction D4. However, other positional relationship can be applied to the first link arm 22A, the first additional link arm 22B, the first support body 98, the second support body 100, and the output structure 44 if needed and/or desired.

Figure 15:
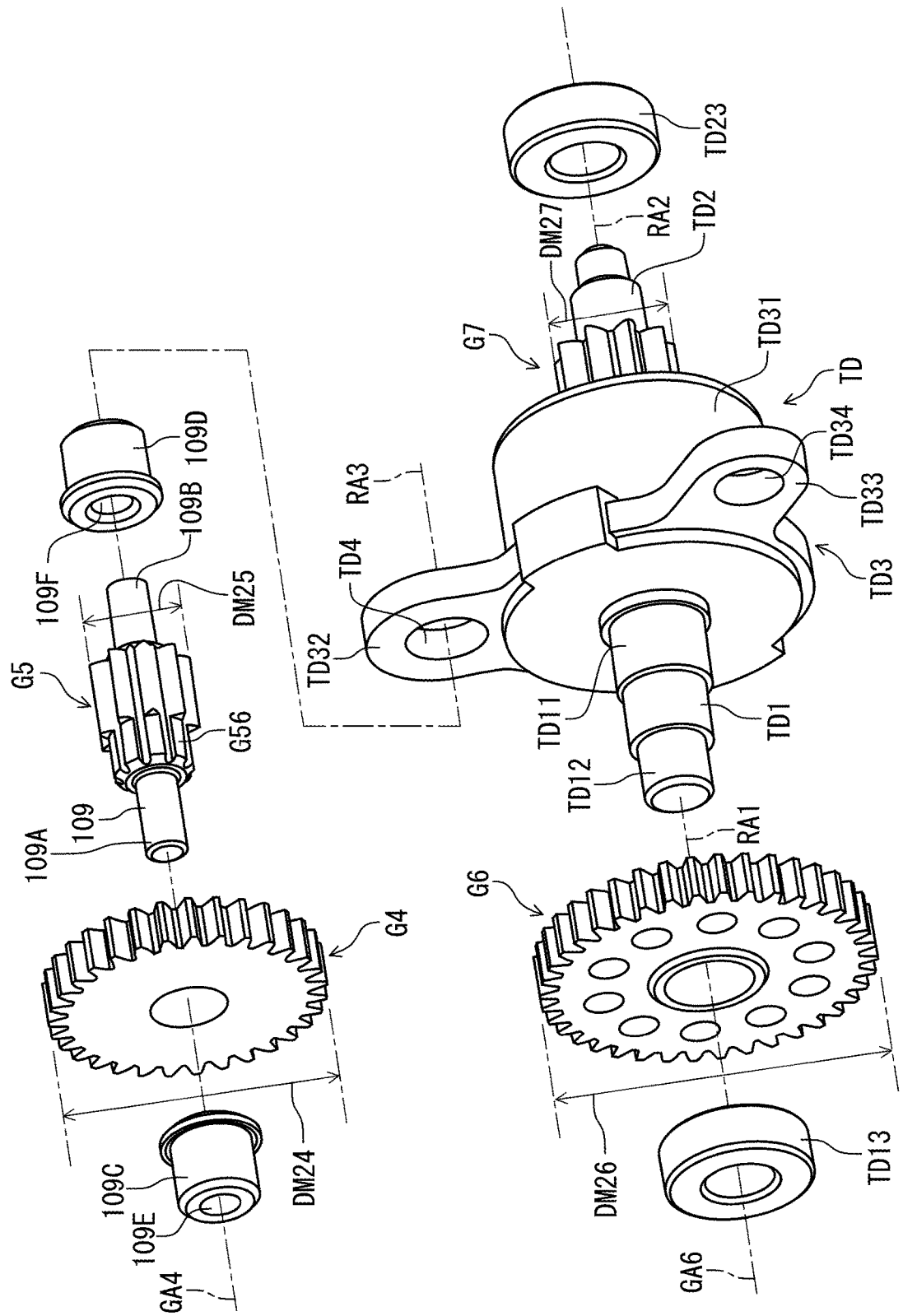
FIG. 15 is an exploded perspective view of a gear structure of the motor unit illustrated in FIG. 9.

As seen in FIG. 15, the bicycle gear structure 36 comprises a torque diode TD. The torque diode TD comprises an outer casing TD3, a first shaft TD1, and a second shaft TD2. The first shaft TD1 is rotatably mounted to the outer casing TD3 about a first rotational axis RA1. The second shaft TD2 is rotatably mounted to the outer casing TD3 about a second rotational axis RA2. The torque diode TD is configured to transmit rotation of the first shaft TD1 to the second shaft TD2. To protect the motor 35, the torque diode TD is configured not to transmit rotation of the second shaft TD2 to the first shaft TD1.

In the first embodiment, the first rotational axis RA1 is parallel to the second rotational axis RA2. The first rotational axis RA1 is coincident with the second rotational axis RA2. However, the first rotational axis RA1 can be offset from the second rotational axis RA2. The first rotational axis RA1 can be non-parallel to the second rotational axis RA2.

The gear G6 can also be referred to as a first transmitting gear G6. The gear G5 can also be referred to as a first additional transmitting gear G5. The gear G7 can also be referred to as a second transmitting gear G7. Namely, the bicycle gear structure 36 comprises the first transmitting gear G6 and the first additional transmitting gear G5. The bicycle gear structure 36 further comprises the second transmitting gear G7.

The first transmitting gear G6 is attached to the first shaft TD1. The second transmitting gear G7 is attached to the second shaft TD2. The first additional transmitting gear G5 is meshed with the first transmitting gear G6. The first additional transmitting gear G5 is rotatably mounted to the outer casing TD3 about a third rotational axis RA3 offset from the first rotational axis RA1 and the second rotational axis RA2.

The outer casing TD3 includes a gear support hole TD4. The bicycle gear structure 36 further comprises a support pin 109. The first additional transmitting gear G5 is attached to the support pin 109. The support pin 109 is rotatably provided in the gear support hole TD4. The support pin 109 is configured to be rotatably provided in the gear support hole TD4 about the third rotational axis RA3. The support pin 109 includes a pin end 109A and an opposite pin end 109B. The bicycle gear structure 36 includes support bushes 109C and 109D. The support bush 109C includes a hole 109E. The support bush 109D includes a hole 109F. The support bush 109C is provided in the gear support hole TD4. The pin end 109A of the support pin 109 is rotatably provided in the hole 109E of the support bush 109C. The opposite pin end 109B of the support pin 109 is rotatably provided in the hole 109F of the support bush 109D. However, at least one of the support bushes 109C and 109D can be omitted from the bicycle gear structure 36.

The outer casing TD3 includes an outer casing body TD31 and a gear support part TD32. The gear support part TD32 extends radially outwardly from the outer casing body TD31 with respect to the first rotational axis RA1. The gear support part TD32 includes the gear support hole TD4. The torque diode TD includes an internal structure configured to transmit rotation of the first shaft TD1 to the second shaft TD2 but not to transmit rotation of the second shaft TD2 to the first shaft TD1. The outer casing body TD31 is configured to accommodate the internal structure of the torque diode TD. The internal structure of the torque diode TD has been known in the mechanical field. Thus, it will not be describe in detail for the sake of brevity.

The outer casing TD3 includes a securing part TD33 configured to be secured to another member. The securing part TD33 extends radially outwardly from the outer casing body TD31 with respect to the first rotational axis RA1. The securing part TD33 includes a securing hole TD34.

The gear G4 can also be referred to as a third transmitting gear G4. Namely, the plurality of gears 38 includes the third transmitting gear G4. The third transmitting gear G4 is attached to the support pin 109. The third transmitting gear G4 includes an attachment hole G41. An engagement portion G56 of the support pin 109 is press-fitted in the attachment hole G41.

An outer diameter DM26 of the first transmitting gear G6 is larger than an outer diameter DM25 of the first additional transmitting gear G5. The outer diameter DM26 of the first transmitting gear G6 is larger than an outer diameter DM27 of the second transmitting gear G7. The outer diameter DM26 of the first transmitting gear G6 is larger than an outer diameter DM24 of the third transmitting gear G4. However, the outer diameter of the first transmitting gear G6 can be equal to or smaller than at least one of the outer diameter DM25 of the first additional transmitting gear G5, the outer diameter DM27 of the second transmitting gear G7, and the outer diameter DM24 of the third transmitting gear G4.

Figure 16:
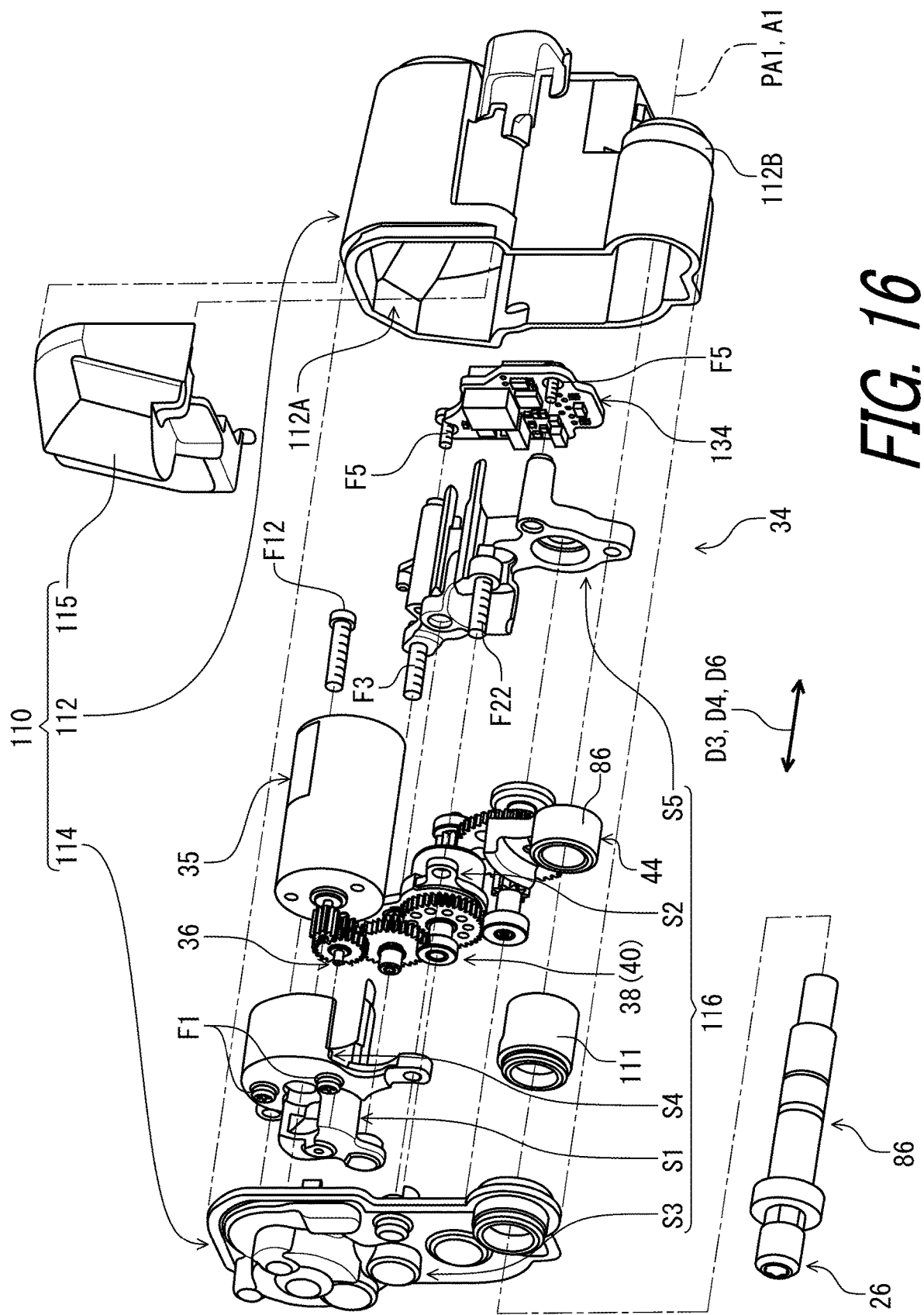
FIG. 16 is an exploded perspective view of the motor unit of the bicycle derailleur illustrated in FIG. 2.

As seen in FIG. 16, the motor unit 34 includes a housing 110. The motor unit 34 includes a cover 111 configured to at least partly cover the output structure 44. The motor 35, the gear structure 36, and the cover 111 are provided in the housing 110. The housing 110 includes a first housing 112, a second housing 114, and a third housing 115. The first housing 112 includes an accommodation space 112A. The motor 35 and the gear structure 36 are provided in the accommodation space 112A. The second housing 114 is attached to the first housing 112 to cover an end opening of the accommodation space 112A. The third housing 115 is attached to the first housing 112 to hold the second housing 114 between the first housing 112 and the third housing 115. The first housing 112 includes a first housing support part 112B. The second housing 114 includes a second housing support part 114B.

As seen in FIG. 14, the cover 111 includes a cover opening 111A. The first housing support part 112B includes a first through-hole 112C. The second housing support part 114B includes a second through-hole 114C. The first link pin 26 extends through the cover opening 111A, the first through-hole 112C, and the second through-hole 114C. The sleeve 86 of the output structure 44 extends through the cover opening 111A, the first through-hole 112C, and the second through-hole 114C. The cover 111, the first housing 112, and the second housing 114 are supported by the first link pin 26 with respect to the base member 12.

The base member 12 has at least one first link-pin-receiving opening R1. The motor unit 34 has at least one second link-pin-receiving opening R2. The at least one link member LM has at least one third link-pin-receiving opening R3. One of the at least one link pin LP is configured to extend through the at least one first link-pin-receiving opening R1, the at least one second link-pin-receiving opening R2, and the at least one third link-pin-receiving opening R3.

The at least one first link-pin-receiving opening R1 of the base member 12 includes at least one first inner link-pin-receiving opening R11. The at least one first inner link-pin-receiving opening R11 includes the first support hole 94 and the second support hole 95. The first support hole 94 can also be referred to as a first inner link-pin-receiving opening 92. The second support hole 95 can also be referred to as a first inner link-pin-receiving opening 94. Namely, the at least one first inner link-pin-receiving opening R11 includes a pair of first inner link-pin-receiving openings 94 and 95. However, the total number of the at least one first inner link-pin-receiving opening R11 it not limited to two.

The at least one second link-pin-receiving opening R2 of the motor unit 34 includes at least one second inner link-pin-receiving opening R21. The at least one second inner link-pin-receiving opening R21 includes the first engagement hole 70, the second engagement hole 90, the cover opening 111A, the first through-hole 112C of the first housing 112, and the second through-hole 114C of the second housing 114. The first engagement hole 70 can also be referred to as a second inner link-pin-receiving opening 70. The second engagement hole 90 can also be referred to as a second inner link-pin-receiving opening 90. The cover opening 111A can also be referred to as a second inner link-pin-receiving opening 111A. The first through-hole 112C can also be referred to as a second inner link-pin-receiving opening 112C. The second through-hole 114C can also be referred to as a second inner link-pin-receiving opening 114C. However, the total number of the at least one second inner link-pin-receiving opening R21 is not limited to five.

The at least one third link-pin-receiving opening R3 of the at least one link member LM includes at least one third inner link-pin-receiving opening R31 that the inner link member 22 has. The at least one third inner link-pin-receiving opening R31 includes the coupling hole 64 and the additional coupling hole 65. The coupling hole 64 can also be referred to as a third inner link-pin-receiving opening 64. The additional coupling hole 65 can also be referred to as a third inner link-pin-receiving opening 65. Namely, the at least one third inner link-pin-receiving opening R31 includes a pair of third inner link-pin-receiving openings 64 and 65. However, the total number of the at least one third inner link-pin-receiving opening R31 is not limited to two.

The inner link pin 26 is configured to extend through the at least one first inner link-pin-receiving opening R11, the at least one second inner link-pin-receiving opening R21, and the at least one third inner link-pin-receiving opening R31. The inner link pin 26 is configured to extend through the first inner link-pin-receiving openings 94 and 95, the second inner link-pin-receiving openings 70, 90, 111A, 112C, and 114C, and the third inner link-pin-receiving openings 64 and 65. The inner link pin 26 is provided in the first support hole 94, the second support hole 95, the first engagement hole 70, and the coupling hole 64 which are aligned along the inner-link pivot axis PA1.

The at least one first link-pin-receiving opening R1, the at least one second link-pin-receiving opening R2, and the at least one third link-pin-receiving opening R3 are provided coaxially with each other in an assembled state of the bicycle derailleur 10. The at least one first inner link-pin-receiving opening R11, the at least one second inner link-pin-receiving opening R21, and the at least one third inner link-pin-receiving opening R31 are provided coaxially with each other on an inner co-axis A1 in the assembled state of the bicycle derailleur 10.

In the first embodiment, the first inner link-pin-receiving openings 94 and 95, the second inner link-pin-receiving openings 70, 90, 111A, 112C, and 114C, and the third inner link-pin-receiving openings 64 and 65 are provided coaxially with each other on the inner co-axis A1 in the assembled state of the bicycle derailleur 10. The inner co-axis A1 is coincident with the inner-link pivot axis PA1. However, at least one of the first inner link-pin-receiving openings 94 and 95, the second inner link-pin-receiving openings 70, 90, 111A, 112C, and 114C, and the third inner link-pin-receiving openings 64 and 65 can be offset from another opening in the assembled state of the bicycle derailleur 10. The inner co-axis A1 can be offset from the inner-link pivot axis PA1.

At least one of the at least one second inner link-pin-receiving opening R21 and the at least one third inner link-pin-receiving opening R31 are disposed between the pair of first inner link-pin-receiving openings 94 and 95 in the axial direction D4 with respect to the inner co-axis A1. The at least one second inner link-pin-receiving opening R21 is disposed between the pair of third inner link-pin-receiving openings 64 and 65 in the axial direction D4 with respect to the inner co-axis A1.

In the first embodiment, the second inner link-pin-receiving openings 70, 90, 111A, 112C, and 114C are disposed between the pair of third inner link-pin-receiving openings in the axial direction D4 with respect to the inner co-axis A1. The second inner link-pin-receiving openings 70, 90, 111A, 112C, and 114C are disposed between the pair of third inner link-pin-receiving openings 64 and 65 in the axial direction D4 with respect to the inner co-axis A1. However, at least one of the second inner link-pin-receiving openings 70, 90, 111A, 112C, and 114C can be disposed outside a space defined between the pair of first inner link-pin-receiving openings 94 and 95 in the axial direction D4. At least one of the second inner link-pin-receiving openings 70, 90, 111A, 112C, and 114C can be disposed outside a space defined between the pair of third inner link-pin-receiving openings 64 and 65 in the axial direction D4.

As seen in FIG. 14, the at least one first link-pin-receiving opening R1 of the base member 12 includes at least one first outer link-pin-receiving opening R12. The at least one second link-pin-receiving opening R2 of the motor unit 34 includes at least one second outer link-pin-receiving opening R22. The at least one third link-pin-receiving opening R3 of the at least one link member LM includes at least one third outer link-pin-receiving opening R32 that the outer link member 24 has. The outer link pin 28 is configured to extend through the at least one first outer link-pin-receiving opening R12, the at least one second outer link-pin-receiving opening R22, and the at least one third outer link-pin-receiving opening R32.

In the first embodiment, the at least one first outer link-pin-receiving opening R12 includes a pair of first outer link-pin-receiving openings 102 and 103. The first outer link-pin-receiving openings 102 includes a through-hole. The first outer link-pin-receiving openings 103 includes a threaded hole. The base member 12 includes a third support body 104 and a fourth support body 105. The third support body 104 protrudes from the base body 96 in a protruding direction D7 perpendicular to the second pivot axis PA2. The fourth support body 105 protrudes from the base body 96 in the protruding direction D7. The third support body 104 includes the first outer link-pin-receiving openings 102. The fourth support body 105 includes the first outer link-pin-receiving openings 103.

The at least one second outer link-pin-receiving opening R22 of the motor unit 34 includes a second outer link-pin-receiving opening 106. The motor unit 34 includes a pin support part 107. The pin support part 107 includes the second outer link-pin-receiving opening 106. The at least one third outer link-pin-receiving opening R32 of the outer link member 24 includes a third outer link-pin-receiving opening 108. The outer link pin 28 is configured to extend through the pair of first outer link-pin-receiving openings 102 and 103, the second outer link-pin-receiving opening 106, and the third outer link-pin-receiving opening 108. The outer link pin 28 includes an external threaded part 28A configured to be threadedly engaged with the first outer link-pin-receiving openings 103.

The at least one first outer link-pin-receiving opening R12, the at least one second outer link-pin-receiving opening R22, and the at least one third outer link-pin-receiving opening R32 are provided coaxially with each other on an outer co-axis A2 in the assembled state of the bicycle derailleur 10. In the first embodiment, the pair of first outer link-pin-receiving openings 102 and 103, the second outer link-pin-receiving opening 106, and the third outer link-pin-receiving opening 108 are provided coaxially with each other on the outer co-axis A2 in the assembled state of the bicycle derailleur 10. The outer co-axis A2 is coincident with the outer-link pivot axis PA2. However, at least one of the pair of first outer link-pin-receiving openings 102 and 103, the second outer link-pin-receiving opening 106, and the third outer link-pin-receiving opening 108 can be offset from another opening in the assembled state of the bicycle derailleur 10. The outer co-axis A2 can be offset from the outer-link pivot axis PA2.

At least one of the at least one second outer link-pin-receiving opening R22 and the at least one third outer link-pin-receiving opening R32 are disposed between the pair of first outer link-pin-receiving openings in an axial direction D6 with respect to the outer co-axis A2. The at least one second outer link-pin-receiving opening R22 is disposed outside a space defined between the pair of first outer link-pin-receiving openings 102 and 103 in the axial direction D6 with respect to the outer co-axis A2.

In the first embodiment, the third outer link-pin-receiving opening 108 is disposed between the pair of first outer link-pin-receiving openings 102 and 103 in the axial direction D6 with respect to the outer co-axis A2. The second outer link-pin-receiving opening 106 is disposed outside a space defined between the pair of first outer link-pin-receiving openings 102 and 103 in the axial direction D6 with respect to the outer co-axis A2. However, the third outer link-pin-receiving opening 108 can be disposed outside a space defined between the pair of first outer link-pin-receiving openings 102 and 103 in the axial direction D6. The second outer link-pin-receiving opening 106 can be disposed between the pair of first outer link-pin-receiving openings 102 and 103 in the axial direction D6.

As seen in FIG. 16, the motor unit 34 comprises a gear support structure 116. The gear support structure 116 is configured to rotatably support the plurality of gears 38. The gear support structure 116 comprises a first support S1, the second support S2, a third support S3, and a fourth support S4. The gear support structure 116 comprises a fifth support S5. In the first embodiment, the second support S2 is a separate member from the first support S1. The second support S2 is a separate member from the third support S3, the fourth support S4, and the fifth support S5. The first support S1 is a separate member from the second support S2, the third support S3, and the fifth support S5. The first support S1 is integrally provided with the fourth support S4 as a one-piece unitary member. The third support S3 is a separate member from the first support S1, the second support S2, the fourth support S4, and the fifth support S5. The fifth support S5 is a separate member from the first support S1, the second support S2, the third support S3, and the fourth support S4. However, the first support S1 can be integrally provided with at least one of the second support S2, the third support S3, and the fifth support S5 as a one-piece unitary member. The first support S1 can be a separate member from the fourth support S4. The second support S2 can be integrally provided with at least one of the first support S1, the third support S3, the fourth support S4, and the fifth support S5 as a one-piece unitary member. The third support S3 can be integrally provided with at least one of the first support S1, the second support S2, the fourth support S4, and the fifth support S5 as a one-piece unitary member. The fifth support S5 can be integrally provided with at least one of the first support S1, the second support S2, the third support S3, and the fourth support S4 as a one-piece unitary member.

The housing 110 includes at least one of the first support S1, the second support S2, the third support S3, the fourth support S4, and the fifth support S5. In the first embodiment, the second housing 114 includes the third support S3. However, the housing 110 can include at least one of the first support S1, the second support S2, the fourth support S4, and the fifth support S5 instead of or in addition to the third support S3.

The first support S1 and the fourth support S4 are secured to the motor 35 with first fasteners F1 such as screws. The first support S1 and the fourth support S4 are secured to the second housing 114 with second fasteners F21 and F22 such as screws. The outer casing TD3 of the torque diode TD is secured to the second housing 114 with the second fastener F22. The fifth support S5 is secured to the second housing 114 with the second fastener F22 and a third fastener F3 such as screws.

As seen in FIG. 8, the gear G2 can also be referred to as a first gear G2. The gear G3 can also be referred to as a first additional gear G3. The gear G4 and the third transmitting gear G4 can also be referred to as a second gear G4. The gear G5 and the first additional transmitting gear G5 can also be referred to as a second additional gear G5. The gear G6 and the first transmitting gear G6 can also be referred to as a third gear G6. Namely, the plurality of gears 38 comprises the first gear G2. The plurality of gears 38 comprises the first additional gear G3. The plurality of gears 38 comprises the second gear G4 and the third gear G6. The plurality of gears 38 comprises the second additional gear G5.

The first gear G2 is rotatable relative to the gear support structure 116 about a first gear axis GA2. The second gear G4 is rotatable relative to the gear support structure 116 about a second gear axis GA4. The third gear G6 is rotatable relative to the gear support structure 116 about a third gear axis GA6. The first additional gear G3 is rotatable relative to the gear support structure 116 about the first gear axis GA2. The second additional gear G5 is rotatable relative to the gear support structure 116 about the second gear axis GA4.

The first shaft TD1 can also be referred to as a third pin TD1. The support pin 109 can also be referred to as a second pin 109. The plurality of gears 38 comprises a first pin 122, the second pin 109, and the third pin TD1. The first pin 122 is configured to rotatably support the first gear G2 about the first gear axis GA2. The second pin 109 is configured to rotatably support the second gear G4 about the second gear axis GA4. The third pin TD1 is configured to rotatably support the third gear G6 about the third gear axis GA6. The first pin 122 is configured to rotatably support the first gear G2 and the first additional gear G3 about the first gear axis GA2. The second pin 109 is configured to rotatably support the second gear G4 and the second additional gear G5 about the second gear axis GA4.

The gears G8 and G9 are rotatable relative to the gear support structure 116 about a fourth gear axis GA8. The plurality of gears 38 includes a fourth pin 128. The gears G8 and G9 are attached to the fourth pin 128. The fourth pin 128 is configured to rotatably support the gears G8 and G9 about the fourth gear axis GA8.

Figure 17:
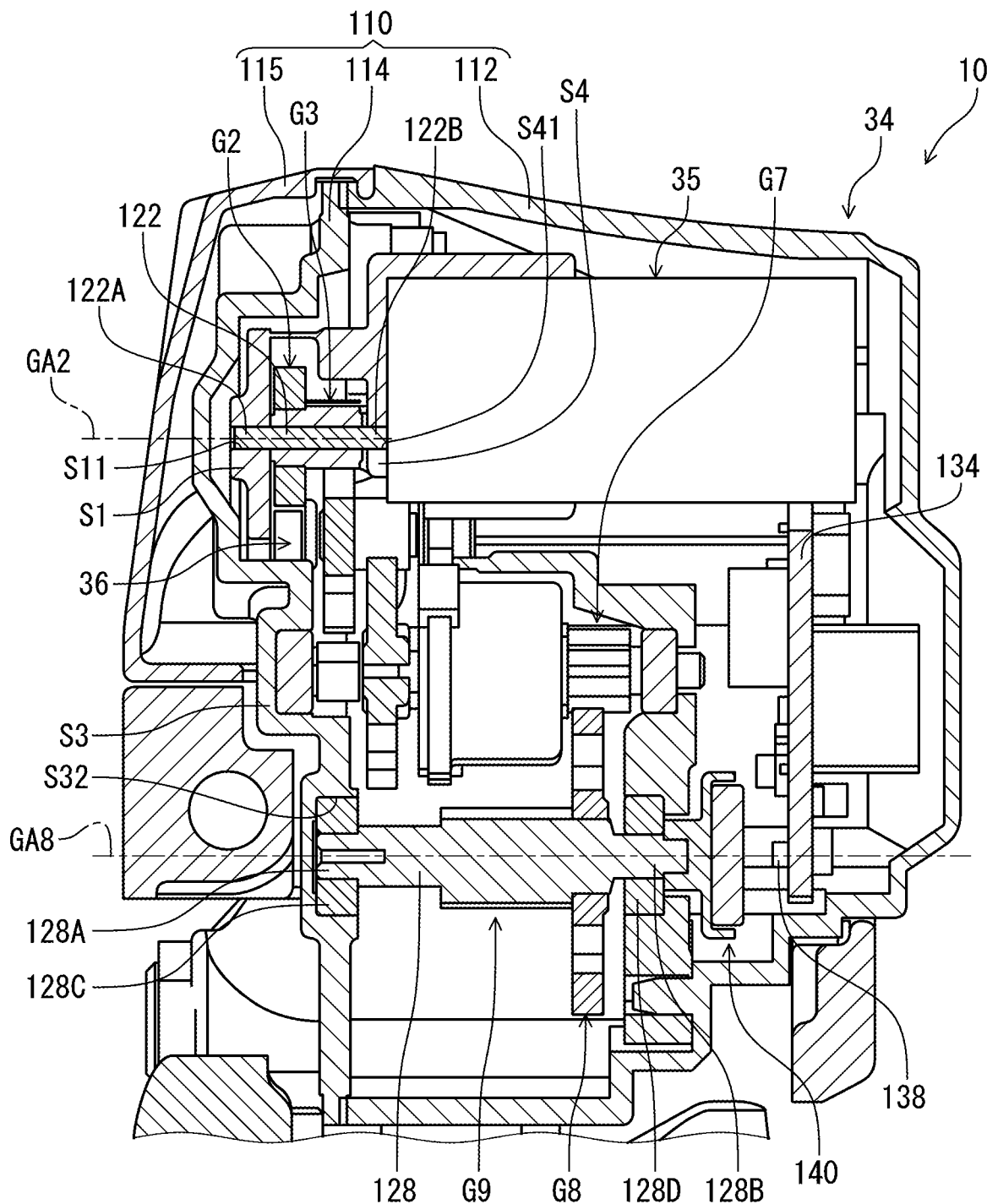
FIG. 17 is a cross-sectional view of the bicycle derailleur illustrated in FIG. 2.

As seen in FIG. 17, the first pin 122 includes a first pin end 122A and a first opposite pin end 122B. The fourth pin 128 includes a fourth pin end 128A and a fourth opposite pin end 128B. The gear structure 36 includes support bushes 128C and 128D. The support bush 128C is attached to the fourth pin end 128A. The support bush 128D is attached to the fourth opposite pin end 128B.

Figure 18:
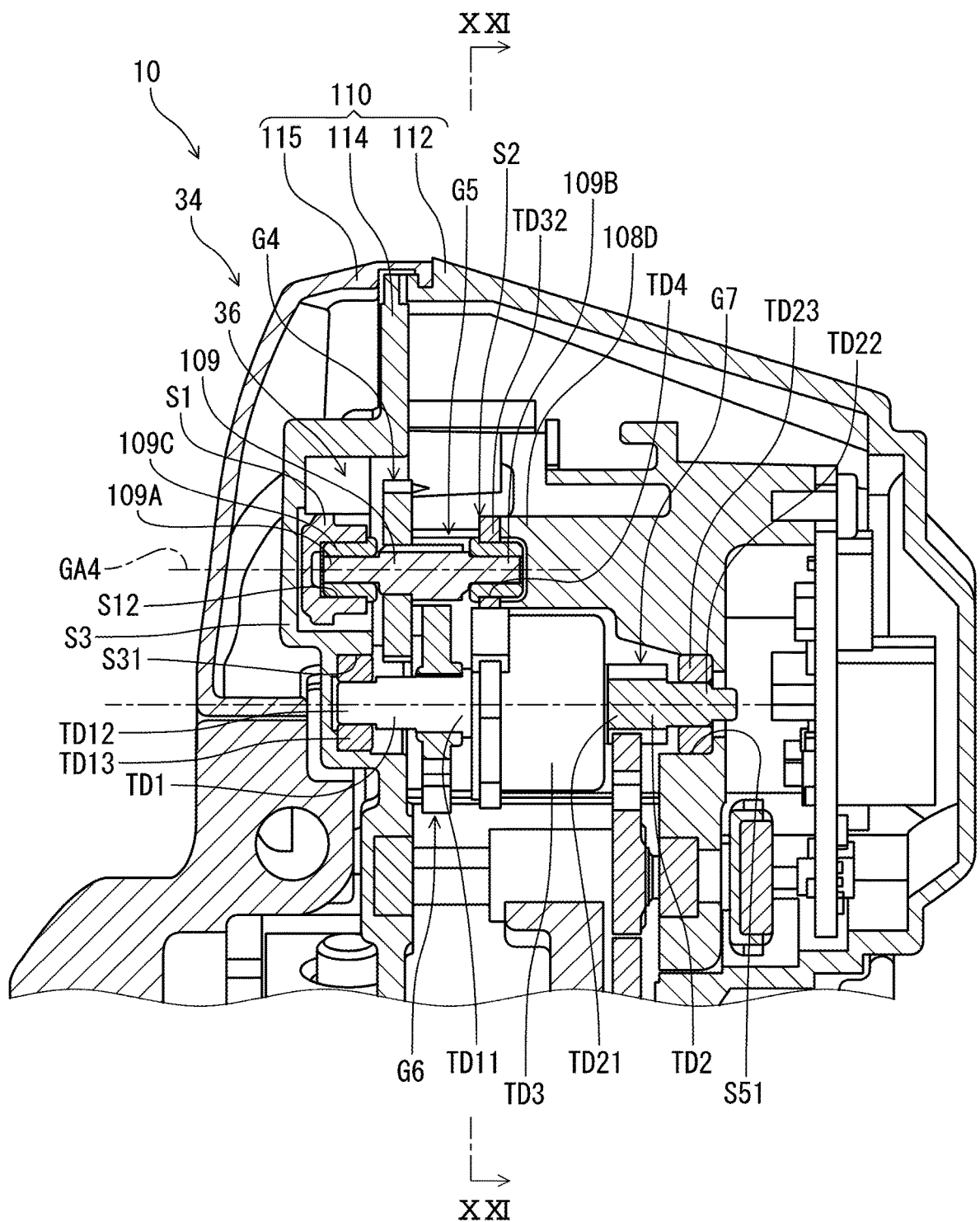
FIG. 18 is a cross-sectional view of the bicycle derailleur illustrated in FIG. 2.

As seen in FIG. 18, the pin end 109A of the support pin 109 can also be referred to as a second pin end 109A. The opposite pin end 109B of the support pin 109 can also be referred to as a second opposite pin end 109B. Namely, the second pin 109 includes the second pin end 109A and the second opposite pin end 109B. The third pin TD1 includes a third pin end TD11 and a third opposite pin end TD12. The second shaft TD2 includes a pin end TD21 and an opposite pin end TD22. The gear structure 36 includes support bushes TD13 and TD23. The support bush 109C is attached to the second pin end 109A. The support bush 109D is attached to the second opposite pin end 109B. The support bush TD13 is attached to the third opposite pin end TD12. The support bush TD23 is attached to the opposite pin end TD22.

As seen in FIGS. 17 and 18, the first support S1 is configured to support the first pin end 122A and the second pin end 109A. As seen in FIG. 17, the fourth support S4 is configured to support the first opposite pin end 122B. As seen in FIG. 18, the second support S2 is configured to support the second opposite pin end 109B and the third pin end TD11. The third support S3 is configured to support the third opposite pin end TD12. The second support S2 is configured to support the pin end TD21 of the second shaft TD2. The fifth support S5 is configured to support the opposite pin end TD22 of the second shaft TD2.

The outer casing TD3 of the torque diode TD includes at least one of the first support S1, the second support S2, the third support S3, and the fourth support S4. In the first embodiment, the outer casing TD3 includes the second support S2. The second support S2 includes the gear support part TD32 (see, e.g., FIG. 15). However, the outer casing TD3 can include at least one of the first support S1, the third support S3, and the fourth support S4 instead of or in addition to the second support S2.

As seen in FIG. 17, the first support S1 includes a first support hole S11. The fourth support S4 includes a fourth support hole S41. The first pin end 122A is rotatably provided in the first support hole S11 about the first gear axis GA2. The first opposite pin end 122B is rotatably provided in the fourth support hole S41 about the first gear axis GA2.

As seen in FIG. 18, the first support S1 includes a first support hole S12. The second support S2 includes the gear support hole TD4. The third support S3 includes a third support hole S31. The fifth support S5 includes a fifth support hole S51. The second pin end 109A is rotatably provided in the first support hole S12 about the second gear axis GA4. The support bush 109C is provided in the first support hole S12 to rotatably support the second pin end 109A. The second opposite pin end 109B is rotatably provided in the gear support hole TD4 about the second gear axis GA4. The support bush 109D is provided in the gear support hole TD4 to rotatably support the second opposite pin end 109B. The third opposite pin end TD12 is rotatably provided in the third support hole S31. The support bush TD13 is provided in the third support hole S31 to rotatably support the third opposite pin end TD12. The opposite pin end TD22 of the second shaft TD2 is rotatably provided in the fifth support hole S51. The support bush TD23 is provided in the fifth support hole S51 to rotatably support the opposite pin end TD22 of the second shaft TD2.

As seen in FIGS. 17 and 18, each of the first support S1, the second support S2, the third support S3, and the fifth support S5 is configured to rotatably support at least two gear support pins. Specifically, the first support S1 is configured to rotatably support the first pin 122 and the second pin 109. The second support S2 is configured to rotatably support the second pin 109 and the third pin TD1. The third support S3 is configured to rotatably support the third pin TD1 and the fourth pin 128. The fifth support S5 is configured to rotatably support the fourth pin 128 and the second shaft TD2. However, at least one of the first to fifth supports S1 to S5 can be configured to rotatably support at least one pin. At least one of the first to fifth supports S1 to S5 can be omitted from the bicycle derailleur 10.

Figure 19:
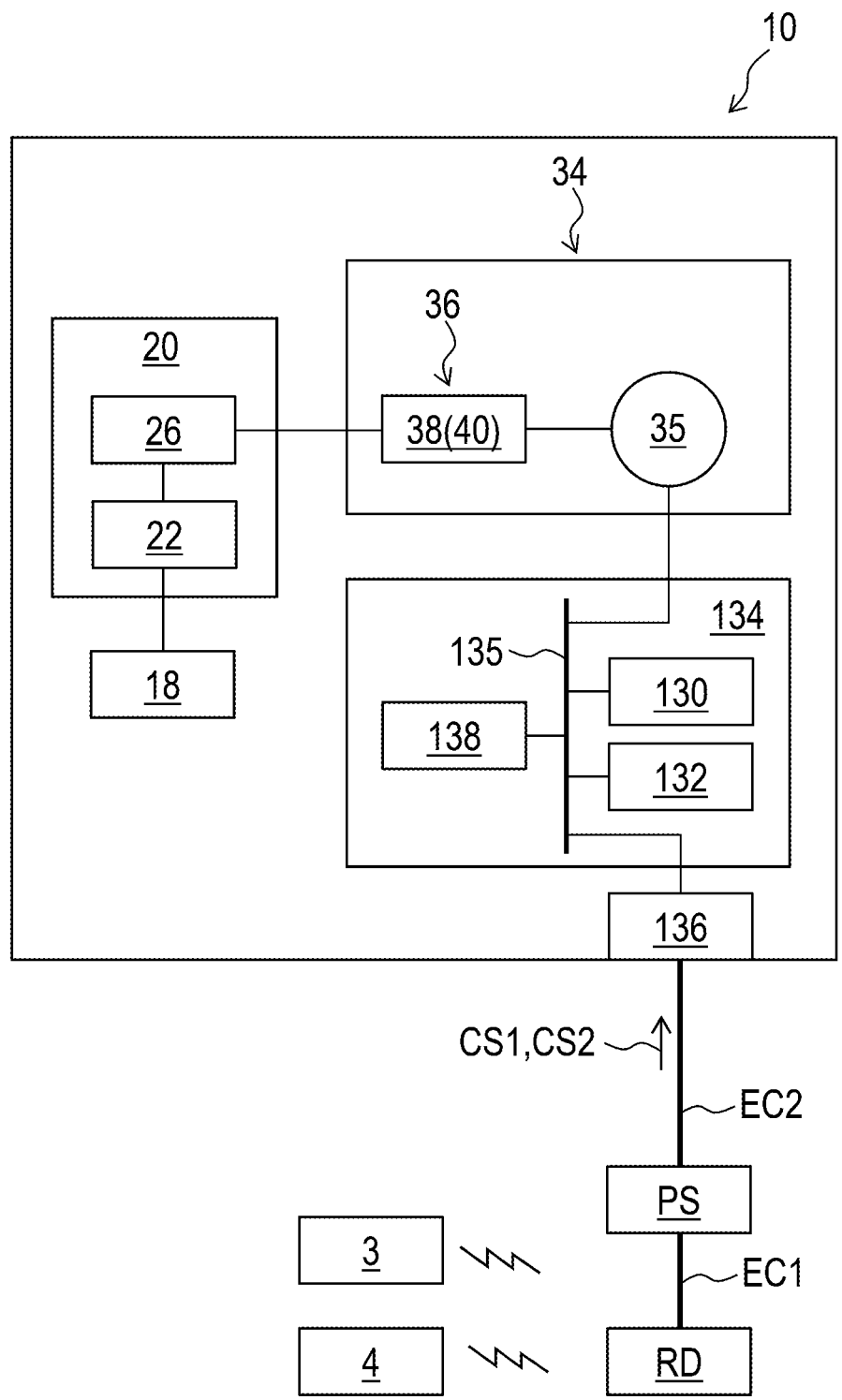
FIG. 19 is a schematic block diagram of the bicycle derailleur illustrated in FIG. 2.

As seen in FIG. 19, the motor unit 34 is configured to move the chain guide 18 relative to the base member 12 in response to a control signal transmitted from the operating device 3. The motor unit 34 is configured to be powered by the electric power source PS separately provided from the bicycle derailleur 10. In the first embodiment, the motor unit 34 is configured to be electrically connected to the electric power source PS through the electric cable EC2. The motor unit 34 is configured to communicate with the operating device 4 through the electric power source PS, the bicycle derailleur RD, and the electric cables EC1 and EC2 using the PLC. However, the electric power source PS can be directly mounted to at least one of the bicycle derailleurs 10 and RD. The bicycle derailleurs RD and 10 can be configured to wirelessly communicate with the operating devices 3 and 4 if electric power sources are directly mounted to the bicycle derailleurs RD and 10. Furthermore, the electric power source PS can be configured to be shared between at least one of the bicycle derailleurs 10 and RD and devices other than the bicycle derailleurs 10 and RD, such as an assist driving unit configured to apply assist force to the drive train DT (see, e.g., FIG. 1).

The motor unit 34 includes a motor driver 130, a communicator 132, a circuit board 134, and a system bus 135. The motor driver 130 and the communicator 132 are electrically mounted on the circuit board 134. The motor 35, the motor driver 130, and the communicator 132 are electrically connected to each other through the circuit board 134 and the system bus 135. The motor driver 130 is configured to control the motor 35 in response to an upshifting signal CS1 and a downshifting signal CS2 transmitted from the operating device 3. The communicator 132 is configured to receive the upshifting signal CS1 and the downshifting signal CS2 from the operating device 3. The communicator 132 is configured to transmit and/or receive information to and/or from other devices using the PLC. The communicator 132 is configured to receive electric power from the electric power source PS.

As seen in FIG. 16, the circuit board 134 is attached to the gear support structure 116. The circuit board 134 is secured to the fifth support S5 with fasteners F5 such as screws. The circuit board 134 is provided in the housing 110.

Figure 20:
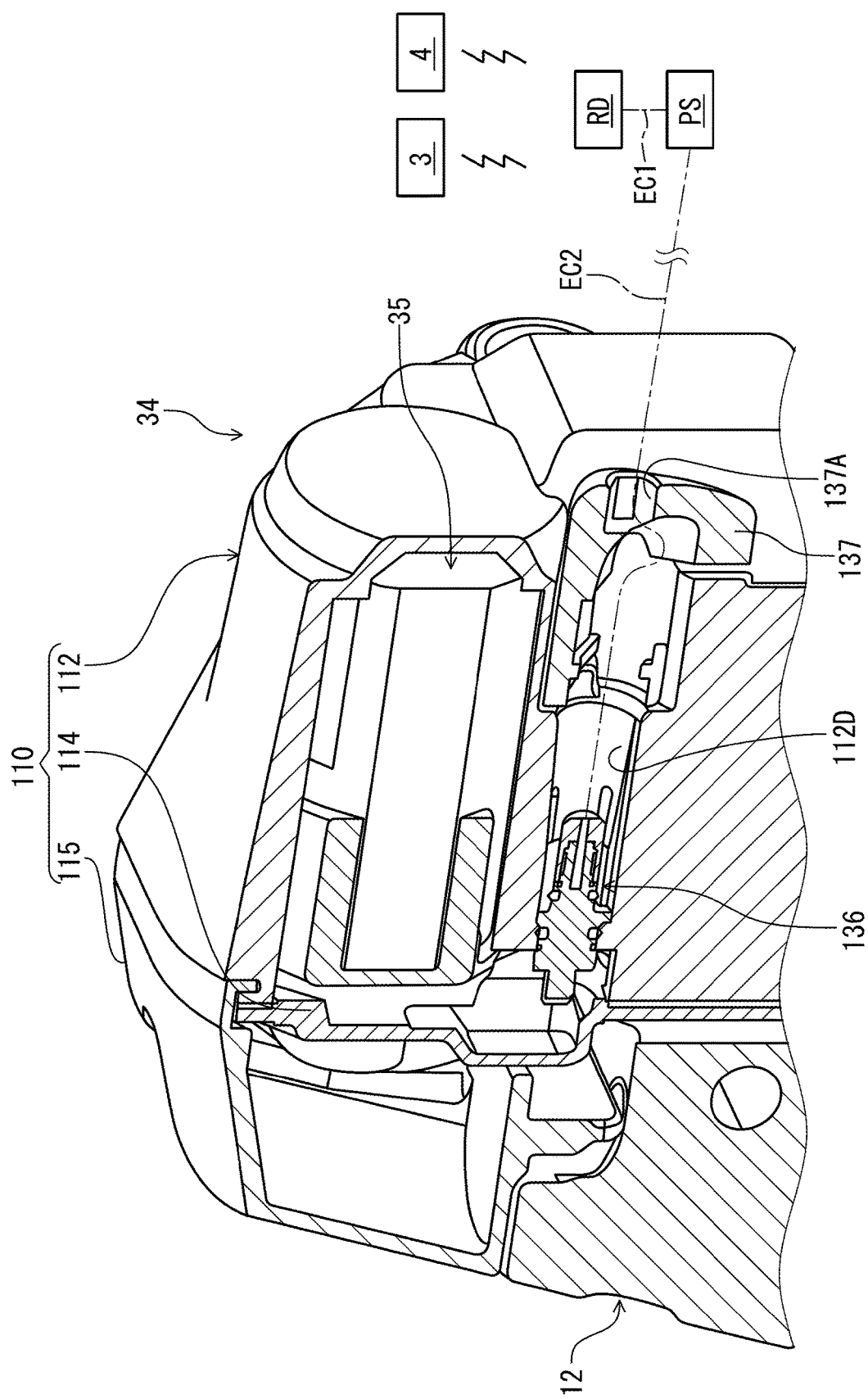
FIG. 20 is a perspective cross-sectional view of the bicycle derailleur illustrated in FIG. 2.

As seen in FIG. 20, the motor unit 34 includes a connector 136 configured to be electrically connected to the electric cable EC2. A connector of the electric cable EC2 is detachably connected to the connector 136. The connector 136 is attached to the first housing 112 of the housing 110. The first housing 112 includes a connector hole 112D. The connector 136 is provided in the connector hole 112D. The housing 110 includes a connector cover 137. The connector cover 137 is attached to the first housing 112 to cover the connector hole 112D. The connector cover 137 includes a cable opening 137A. The electric cable EC2 extends through the cable opening 137A. As seen in FIG. 19, the connector 136 is electrically connected to the motor driver 130 and the communicator 132 through the circuit board 134 and the system bus 135.

The term "detachably," as used herein, encompasses a configuration in which an element is repeatedly detachable from and attachable to another element without substantial damage.

As seen in FIG. 19, the bicycle derailleur 10 further comprises a rotation sensor 138. The rotation sensor 138 is configured to sense a rotational position of one of the plurality of gears 38 in the gear structure 36. The rotation sensor 138 is configured to sense a rotational position of one of the plurality of spur gears 40. The rotation sensor 138 is electrically mounted on the circuit board 134. The rotation sensor 138 is electrically connected to the motor driver 130 and the communicator 132 through the circuit board 134 and the system bus 135.

As seen in FIG. 17, the gear G8 can also be referred to as a sensor gear G8. Namely, the plurality of gears 38 includes the sensor gear G8. The plurality of spur gears 40 includes the sensor gear G8. The rotation sensor 138 is configured to sense a rotational position of the sensor gear G8. The sensor gear G8 is provided on the rotational-force transmission path 42 provided from the motor 35 to the at least one of the chain guide 18 and the linkage.

In the first embodiment, the gear structure 36 includes a sensor object 140 coupled to the sensor gear G8. The sensor object 140 is rotatable relative to the housing 110 along with the sensor gear G8. The sensor object 140 is secured to the fourth opposite pin end 128B of the fourth pin 128. The rotation sensor 138 is configured to sense a rotational position of the sensor object 140 to sense the rotational position of the sensor gear G8.

In the first embodiment, the rotation sensor 138 includes an optical encoder. The rotation sensor 138 is configured to emit light to the sensor object 140 and configured to detect light reflected by the sensor object 140. However, the rotation sensor 138 can include another sensor instead of or in addition to the optical encoder. The rotation sensor 138 can be omitted from the bicycle derailleur 10.

As seen in FIGS. 5 and 7, the base member 12, the motor unit 34, and the link member 22 and/or 24 are provided to at least partially overlap with each other in a plurality of separate areas as viewed along the link pivot axis PA1 and/or PA2. In the first embodiment, the base member 12, the motor unit 34, and the inner link member 22 are provided to at least partially overlap with each other in a first separate area SA1 as viewed along the inner-link pivot axis PA1. The base member 12, the motor unit 34, and the inner link member 22 are provided to at least partially overlap with each other in a second separate area SA2 as viewed along the outer-link pivot axis PA2. The first separate area SA1 is spaced apart from the second separate area SA2.

In the first embodiment, the first support body 98 of the base member 12, the second support body 100 of the base member 12, the first housing support part 112B of the first housing 112, the second housing support part 114B of the second housing 114, and the link member 22 are provided partially overlap with each other in the first separate area SA1 as viewed along the link pivot axis PAL The first housing 112 includes the pin support part 107. The third support body 104 of the base member 12, the fourth support body 105 of the base member 12, the pin support part 107 of the first housing 112, and the link member 24 are provided partially overlap with each other in the second separate area SA2 as viewed along the link pivot axis PA2. However, the arrangement of each member is not limited to the above arrangement.

Figure 21:
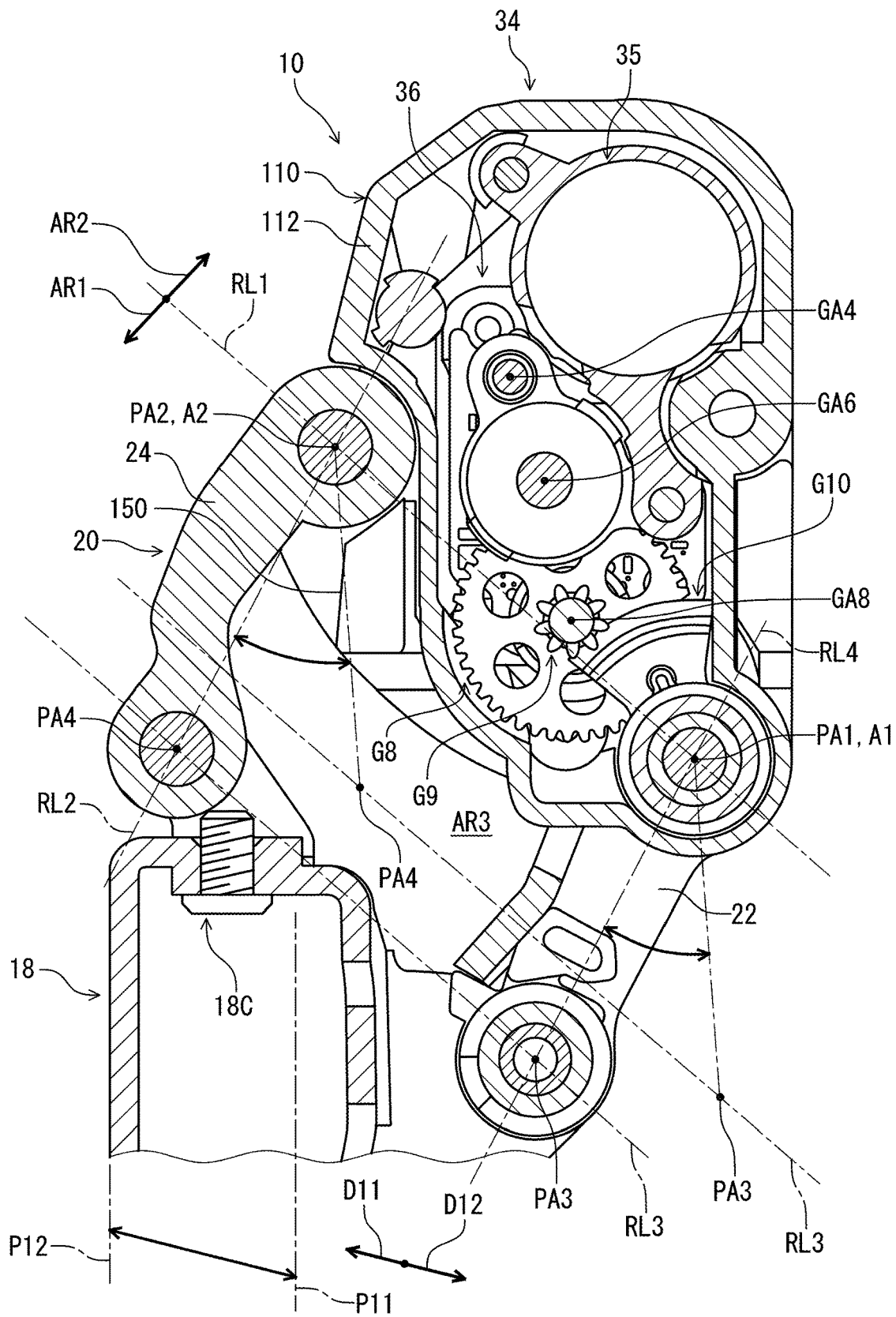
FIG. 21 is a cross-sectional view of the bicycle derailleur taken along line XXI-XXI of FIG. 18.

As seen in FIG. 21, a first reference line RL1 extends through the first pivot axis PA1 and the second pivot axis PA2 as viewed along the first pivot axis PAL The first reference line RL1 extends through the first pivot axis PA1 and the second pivot axis PA2 to establish a boundary between a first area AR1 and a second area AR2 as viewed along the first pivot axis PA1. A second reference line RL2 extends through the second pivot axis PA2 and the fourth pivot axis PA4 as viewed along the first pivot axis PAL A third reference line RL3 extends through the third pivot axis PA3 and the fourth pivot axis PA4 as viewed along the first pivot axis PAL A fourth reference line RL4 extends through the first pivot axis PA1 and the third pivot axis PA3 as viewed along the first pivot axis PA1.

The chain guide 18 is provided in the first area AR1 with respect to the first reference line RL1 as viewed along the first pivot axis PA1. The chain guide 18 is provided in the first area AR1 with respect to the first reference line RL1 without being provided in the second area AR2 as viewed along the first pivot axis PAL At least one of the motor 35 and the gear structure 36 are at least partly provided in the first area AR1 as viewed along the first pivot axis PAL In the first embodiment, the motor 35 is entirely provided in the second area AR2 as viewed along the first pivot axis PAL At least one gear of the plurality of gears 38 is at least partly provided in the first area AR1 as viewed along the first pivot axis PAL At least one gear of the plurality of gears 38 is partly provided in the first area AR1 as viewed along the first pivot axis PA1. Specifically, the sensor gear G8 is at least partly provided in the first area AR1 as viewed along the first pivot axis PA1. The sensor gear G8 is partly provided in the first area AR1 as viewed along the first pivot axis PA1. The gear G9 is partly provided in the first area AR1 as viewed along the first pivot axis PAL The gear G10 is partly provided in the first area AR1 as viewed along the first pivot axis PA1 in a lower-gear state where the chain guide 18 is in the lower-gear position P11. However, another gear of the plurality of gears 38 can be at least partly provided in the first area AR1 as viewed along the first pivot axis PA1 if needed and/or desired. The motor 35 can be at least partly or entirely provided in the first area AR1 as viewed along the first pivot axis PA1 if needed and/or desired. The gear structure 36 can be entirely provided in one of the first area AR1 and the second area AR2 as viewed along the first pivot axis PA1 if needed and/or desired.

The gear structure 36 is at least partly provided in an arrangement area AR3 surrounded by the first reference line RL1, the second reference line RL2, the third reference line RL3, and the fourth reference line RL4 as viewed along the first pivot axis PA1. At least one of the motor 35 and the gear structure 36 are at least partly provided in the arrangement area AR3 as viewed along the first pivot axis PAL The gear structure 36 is at least partly provided in the arrangement area AR3 as viewed along the first pivot axis PA1 in the lower-gear state. The gear structure 36 is at least partly provided in the arrangement area AR3 as viewed along the first pivot axis PA1 in a higher-gear state where the chain guide 18 is in the higher-gear position P12. However, the gear structure 36 can be at least partly provided in the arrangement area AR3 as viewed along the first pivot axis PA1 in a state where the chain guide 18 is in only one of the lower-gear state and the higher-gear state.

In the first embodiment, the gear structure 36 is partly provided in the arrangement area AR3 as viewed along the first pivot axis PA1 in both the lower-gear state and the higher-gear state. The motor 35 is entirely provided outside the arrangement area AR3 as viewed along the first pivot axis PA1 in both the lower-gear state and the higher-gear state. At least one gear of the plurality of gears 38 is at least partly provided in the arrangement area AR3 as viewed along the first pivot axis PA1 in both the lower-gear state and the higher-gear state. At least one gear of the plurality of gears 38 is partly provided in the arrangement area AR3 as viewed along the first pivot axis PA1 in both the lower-gear state and the higher-gear state. Specifically, the sensor gear G8 is at least partly provided in the arrangement area AR3 as viewed along the first pivot axis PAL The sensor gear G8 is partly provided in the arrangement area AR3 as viewed along the first pivot axis PA1 in both the lower-gear state and the higher-gear state. The gear G9 is partly provided in the arrangement area AR3 as viewed along the first pivot axis PAL The gear G10 is partly provided in the arrangement area AR3 as viewed along the first pivot axis PA1 in both the lower-gear state and the higher-gear state. However, another gear of the plurality of gears 38 can be at least partly provided in the arrangement area AR3 as viewed along the first pivot axis PA1 in at least one of the lower-gear state and the higher-gear state. The motor 35 can be at least partly or entirely provided in the arrangement area AR3 as viewed along the first pivot axis PA1 in at least one of the lower-gear state and the higher-gear state. The gear structure 36 can be entirely provided outside the arrangement area AR3 as viewed along the first pivot axis PA1 in at least one of the lower-gear state and the higher-gear state.

As seen in FIG. 21, at least one of the inner link member 22 and the outer link member 24 is contactable with one of the base member 12 and an outer surface of the housing 110 to define at least one of the lower-gear position P11 and the higher-gear position P12. The outer link member 24 is contactable with one of the base member 12 and the outer surface of the housing 110 to define the lower-gear position P11. One of the base member 12 and the outer surface of the housing 110 includes a lower-gear positioning surface 150 contactable with the outer link member 24 to define the lower-gear position P11.

In the first embodiment, the outer link member 24 is contactable with the base member 12 to define the lower-gear position P11. The chain guide 18 is in the lower-gear position P11 in a state where the outer link member 24 is in contact with the lower-gear positioning surface 150. The base member 12 includes the lower-gear positioning surface 150. However, the outer link member 24 can be configured to be contactable with the outer surface of the housing 110 to define the lower-gear position P11. The outer surface of the housing 110 can include the lower-gear positioning surface 150.

The lower-gear positioning surface 150 is provided between the first reference line RL1 and the third reference line RL3 as viewed along the first pivot axis PA1. The lower-gear positioning surface 150 is provided closer to the first reference line RL1 than to the third reference line RL3 as viewed along the first pivot axis PA1 in both the lower-gear state and the higher-gear state. The lower-gear positioning surface 150 is provided in the arrangement area AR3 as viewed along the first pivot axis PA1 in both the lower-gear state and the higher-gear state. However, the lower-gear positioning surface 150 can be provided between the first reference line RL1 and the third reference line RL3 as viewed along the first pivot axis PA1 in at least one of the lower-gear state and the higher-gear state. The lower-gear positioning surface 150 can be provided closer to the first reference line RL1 than to the third reference line RL3 as viewed along the first pivot axis PA1 in at least one of the lower-gear state and the higher-gear state. The lower-gear positioning surface 150 can be provided closer to the third reference line RL3 than to the first reference line RL1 as viewed along the first pivot axis PA1 in at least one of the lower-gear state and the higher-gear state. The lower-gear positioning surface 150 can be provided at an intermediate position between the first reference line RL1 and the third reference line RL3 as viewed along the first pivot axis PA1 in at least one of the lower-gear state and the higher-gear state.

The outer link member 24 is contactable with the chain guide 18 to define the higher-gear position P12. The chain guide 18 includes a higher-gear positioning members 18C configured to be contactable with the outer link member 24 to define the higher-gear position P12. The chain guide 18 is in the higher-gear position P12 in a state where the higher-gear positioning members 18C is in contact with the outer link member 24.

The higher-gear positioning members 18C is attached to at least one of the inner guide member 18A and the outer guide member 18B. The higher-gear positioning members 18C includes a screw threadedly engaged with the at least one of the inner guide member 18A and the outer guide member 18B. However, the higher-gear position P12 can be defined by other structures.

Figure 22:
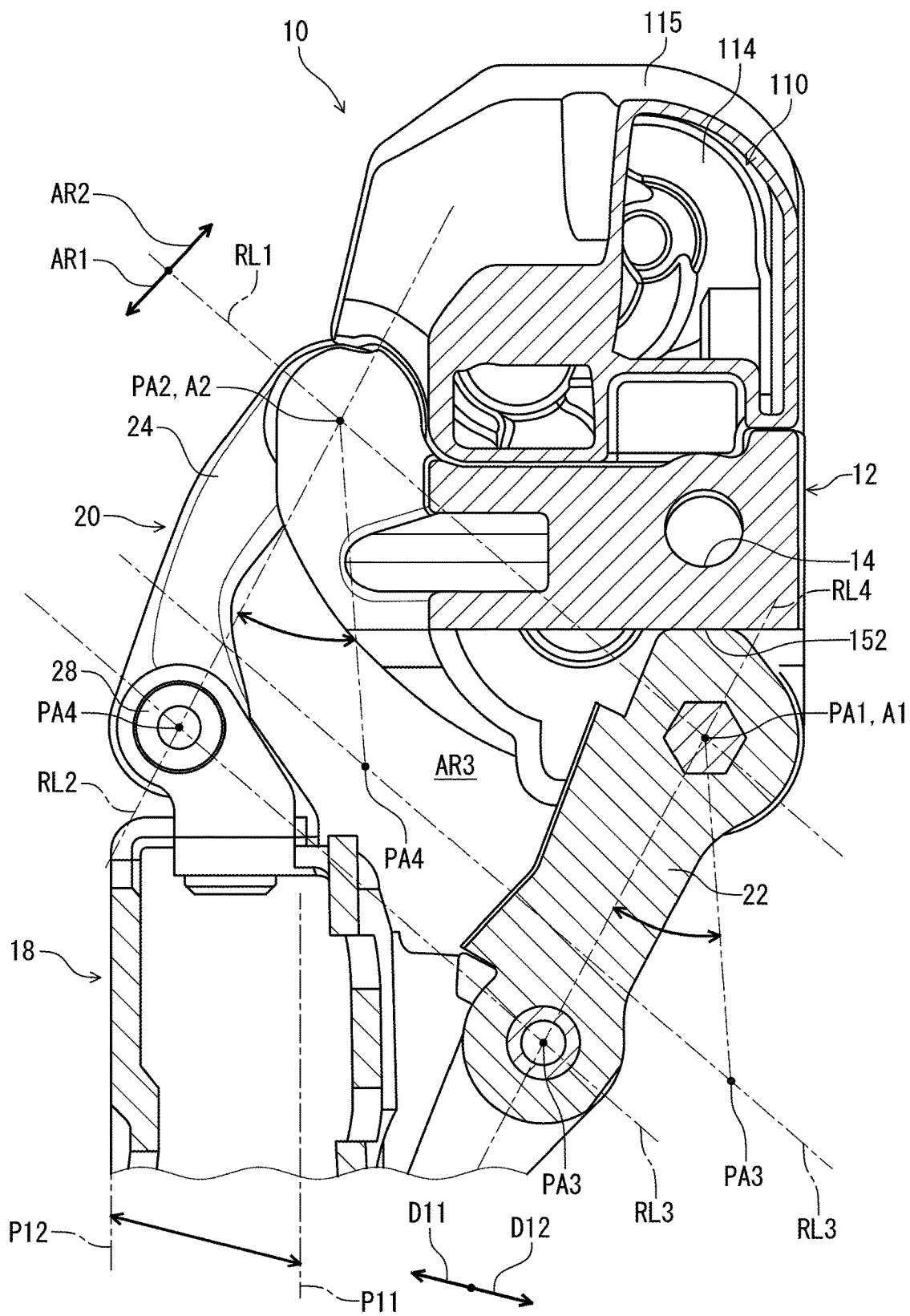
FIG. 22 is a cross-sectional view of a bicycle derailleur in accordance with a modification.

As seen in FIG. 22, for example, the inner link member 22 can be contactable with one of the base member 12 and the outer surface of the housing 110 to define the higher-gear position P12. One of the base member 12 and the outer surface of the housing 110 can include a higher-gear positioning surface 152 contactable with the inner link member 22 to define the higher-gear position P12. In the modification, the higher-gear positioning members 18C illustrated in FIG. 21 is omitted from the chain guide 18. Instead, the inner link member 22 is contactable with the base member 12 to define the higher-gear position P12. The base member 12 includes the higher-gear positioning surface 152. However, the inner link member 22 can be configured to be contactable with the outer surface of the housing 110 to define the higher-gear position P12. The outer surface of the housing 110 can include the higher-gear positioning surface 152.

In the modification, the higher-gear positioning surface 152 is provided between the second reference line RL2 and the fourth reference line RL4 as viewed along the first pivot axis PA1. The higher-gear positioning surface 152 is provided between the second reference line RL2 and the fourth reference line RL4 as viewed along the first pivot axis PA1 in both the lower-gear state and the higher-gear state. The higher-gear positioning surface 152 is provided outside a space provided between the first pivot axis PA1 and the third pivot axis PA3 as viewed along the first pivot axis PA1 in at least one of the lower-gear state and the higher-gear state. The higher-gear positioning surface 152 is provided closer to the fourth reference line RL4 than to the second reference line RL2 as viewed along the first pivot axis PA1 in at least one of the lower-gear state and the higher-gear state. However, the higher-gear positioning surface 152 can be provided closer to the second reference line RL2 than to the fourth reference line RL4 as viewed along the first pivot axis PA1 in at least one of the lower-gear state and the higher-gear state. The higher-gear positioning surface 152 is provided between the second reference line RL2 and the fourth reference line RL4 as viewed along the first pivot axis PA1 in at least one of the lower-gear state and the higher-gear state.

Figure 23:
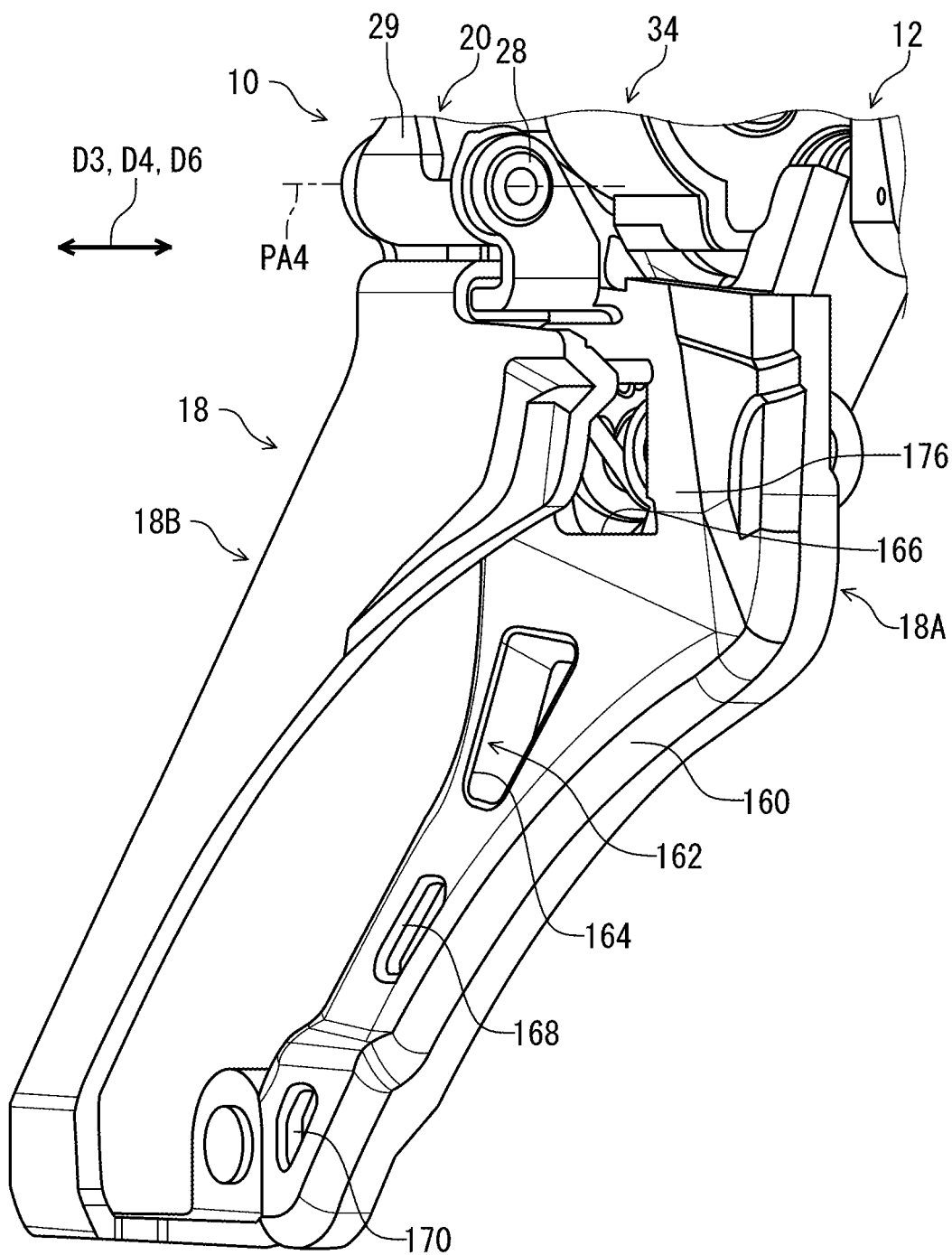
FIG. 23 is a perspective view of the bicycle derailleur illustrated in FIG. 2.

As seen in FIG. 23, the inner guide member 18A includes an inner guide plate 160. The inner guide plate 160 includes an opening 162 having an inner periphery 164. The inner guide plate 160 includes openings 166, 168, and 170. At least one of the openings 166, 168, and 170 can be omitted from the inner guide plate 160.

Figure 24:
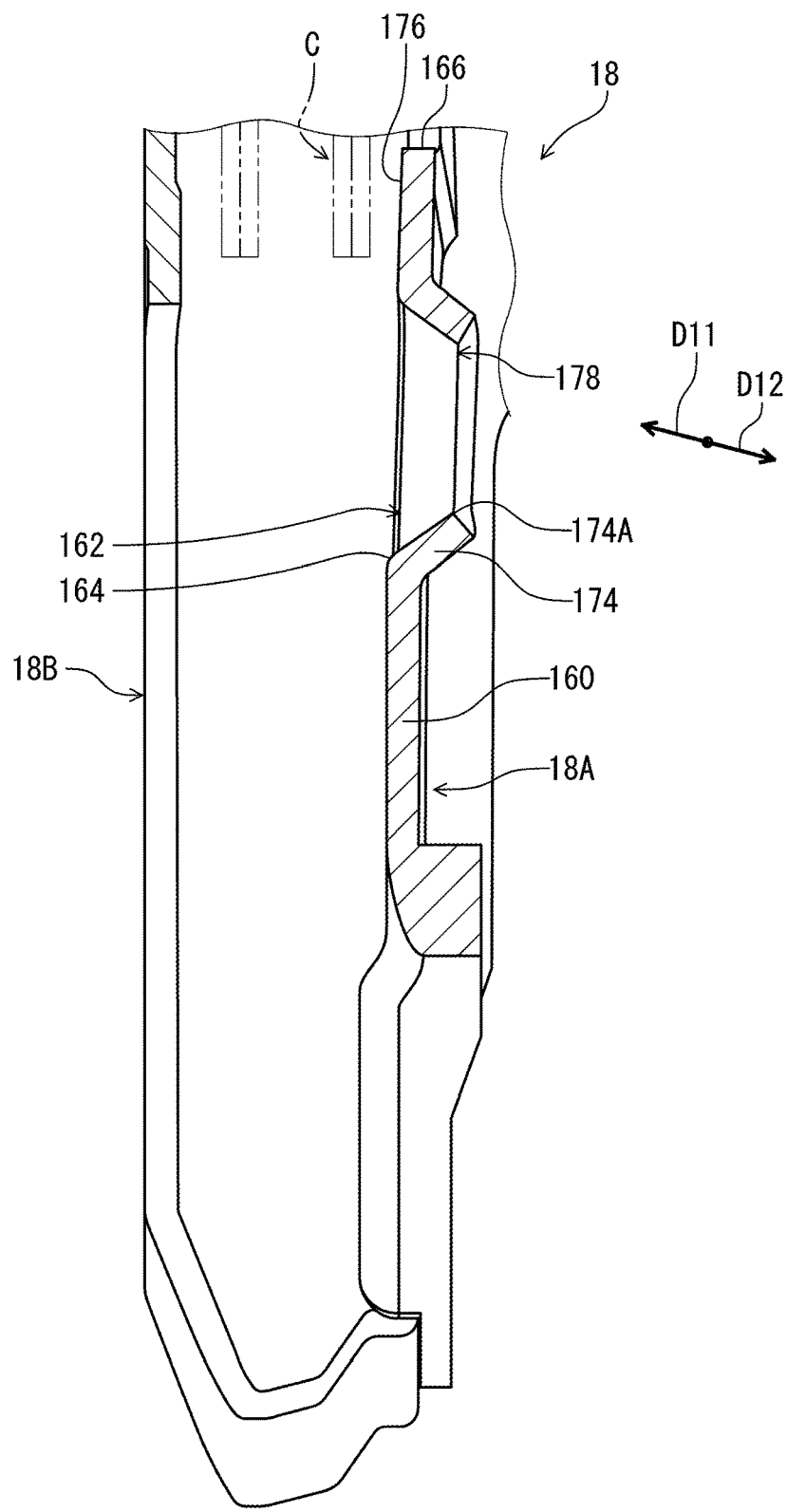
FIG. 24 is a cross-sectional view of the bicycle derailleur taken along line XXIV-XXIV of FIG. 2.

As seen in FIG. 24, the inner guide member 18A includes a surrounding wall 174. The surrounding wall 174 extends from the inner periphery 164 of the opening 162 in one of the outward-shifting direction D11 and the inward-shifting direction D12. In the first embodiment, the surrounding wall 174 extends from the inner periphery 164 of the opening 162 in the inward-shifting direction D12. However, the surrounding wall 174 can be configured to extend from the inner periphery 164 of the opening 162 in the outward-shifting direction D11 if needed and/or desired.

The inner guide plate 160 has an inner guide surface 176 configured to be contactable with the chain C when the inner guide plate 160 guides the chain C in the outward-shifting direction D11. The surrounding wall 174 is at least partly inclined relative to the inner guide surface 176. In the first embodiment, the surrounding wall 174 is entirely inclined relative to the inner guide surface 176. However, the surrounding wall 174 can be partly inclined relative to the inner guide surface 176 if needed and/or desired.

The opening 162 of the inner guide plate 160 is at least partly provided in the inner guide surface 176. However, the opening 162 can be provided outside the inner guide surface 176 if needed and/or desired.

The surrounding wall 174 includes an annular end 174A defining an additional opening 178. In the first embodiment, the additional opening 178 is smaller than the opening 162 of the inner guide plate 160. However, the additional opening 178 can has the same area as that of the opening 162 of the inner guide plate 160 or can larger than the opening 162 of the inner guide plate 160 if needed and/or desired.

In the first embodiment, the surrounding wall 174 is integrally provided with the inner guide plate 160 as a one-piece unitary member. For example, the inner guide plate 160 and the surrounding wall 174 are formed by press working from a plate material. However, the surrounding wall 174 can be a separate member from the inner guide plate 160 if needed and/or desired.

Figure 25:
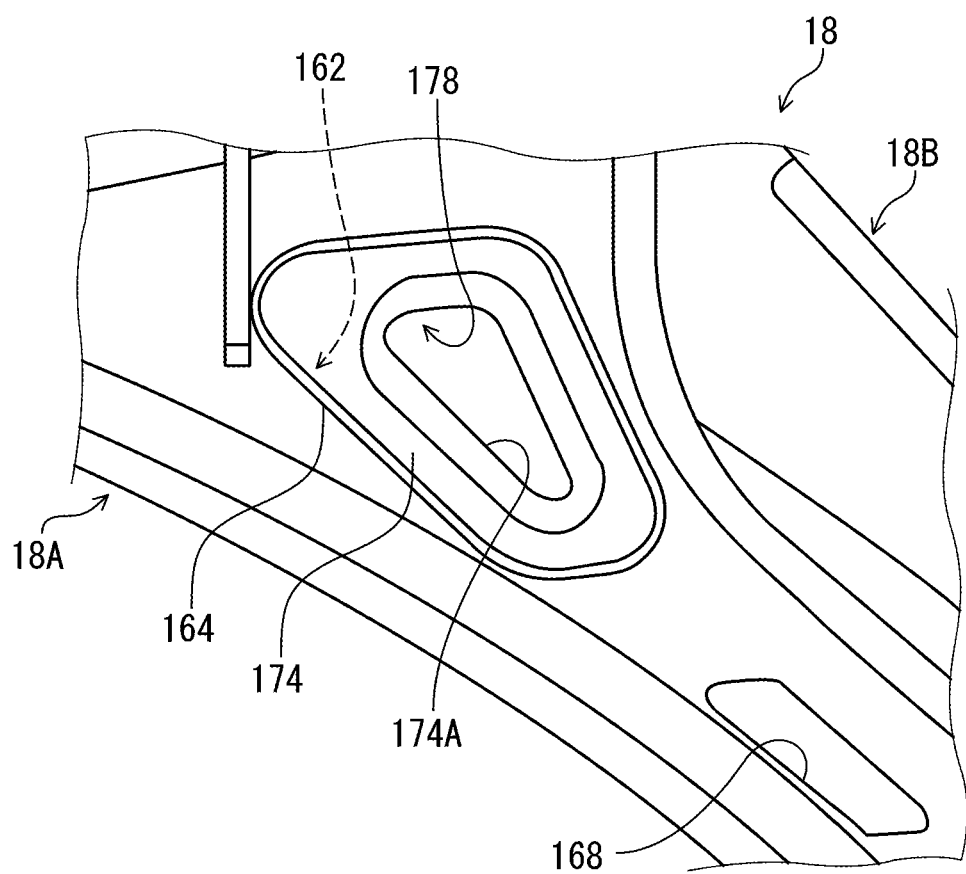
FIG. 25 is a partial elevational view of the bicycle derailleur illustrated in FIG. 2.

As seen in FIG. 25, the surrounding wall 174 is provided to at least partly surround the opening 162. In the first embodiment, the surrounding wall 174 is provided to entirely surround the opening 162. However, the surrounding wall 174 can be provided to partly surround the opening 162 if needed and/or desired.

Figure 26:
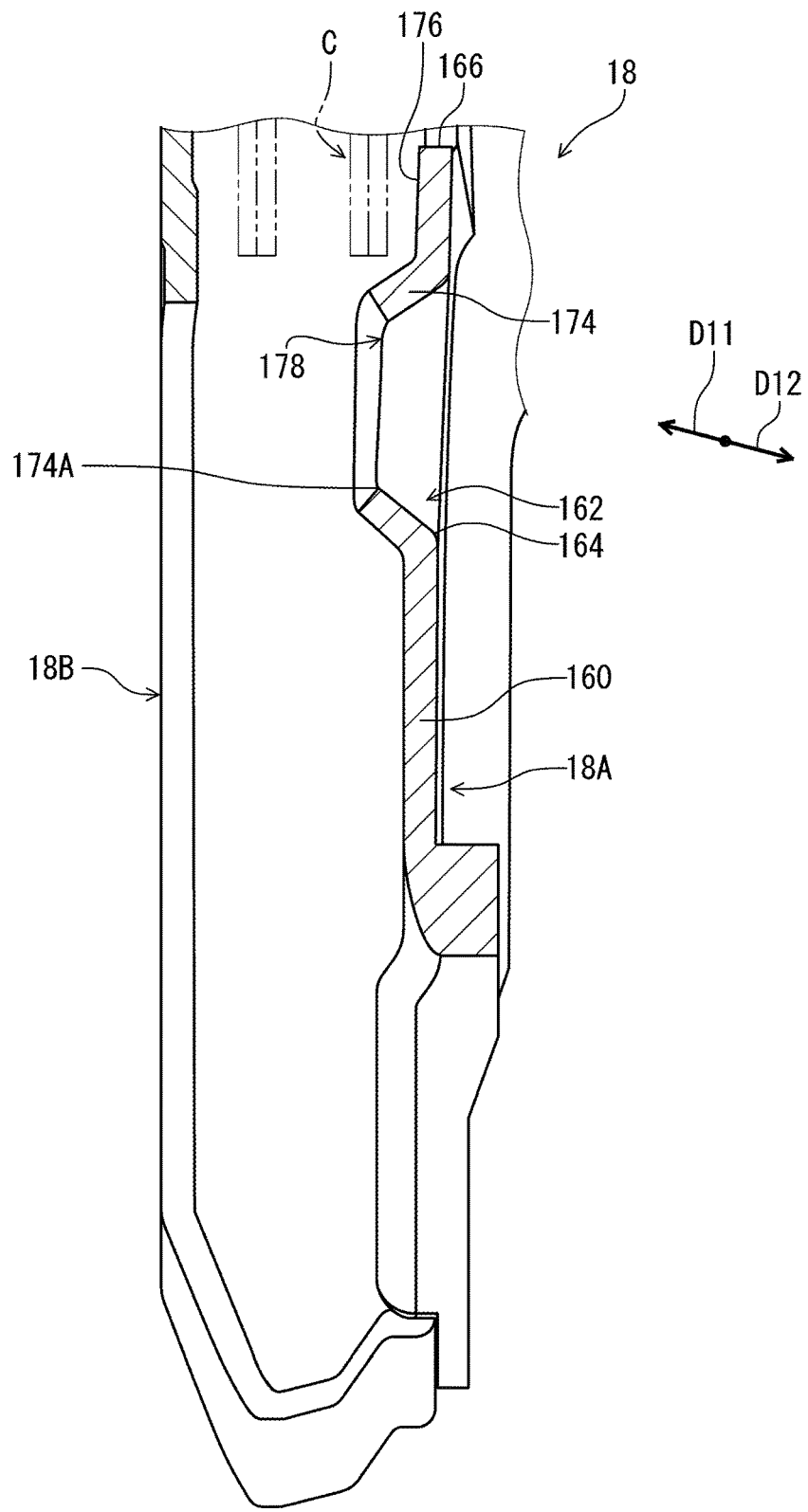
FIG. 26 is a cross-sectional view of a bicycle derailleur in accordance with a modification.

As seen in FIG. 26, the surrounding wall 174 can be provided to the inner guide surface 176 of the inner guide plate 160 and configured to push the chain C in an outward-shifting operation in which the chain C moves in the outward-shifting direction D11 if needed and/or desired.

Second Embodiment

A bicycle derailleur 210 in accordance with a second embodiment will be described below referring to FIGS. 27 to 36. The bicycle derailleur 210 has the same structure and/or configuration as those of the bicycle derailleur 10 except for the coupling structure of the link member 22. Thus, elements having substantially the same function as those in the first embodiment will be numbered the same here, and will not be described and/or illustrated again in detail here for the sake of brevity.

Figure 27:
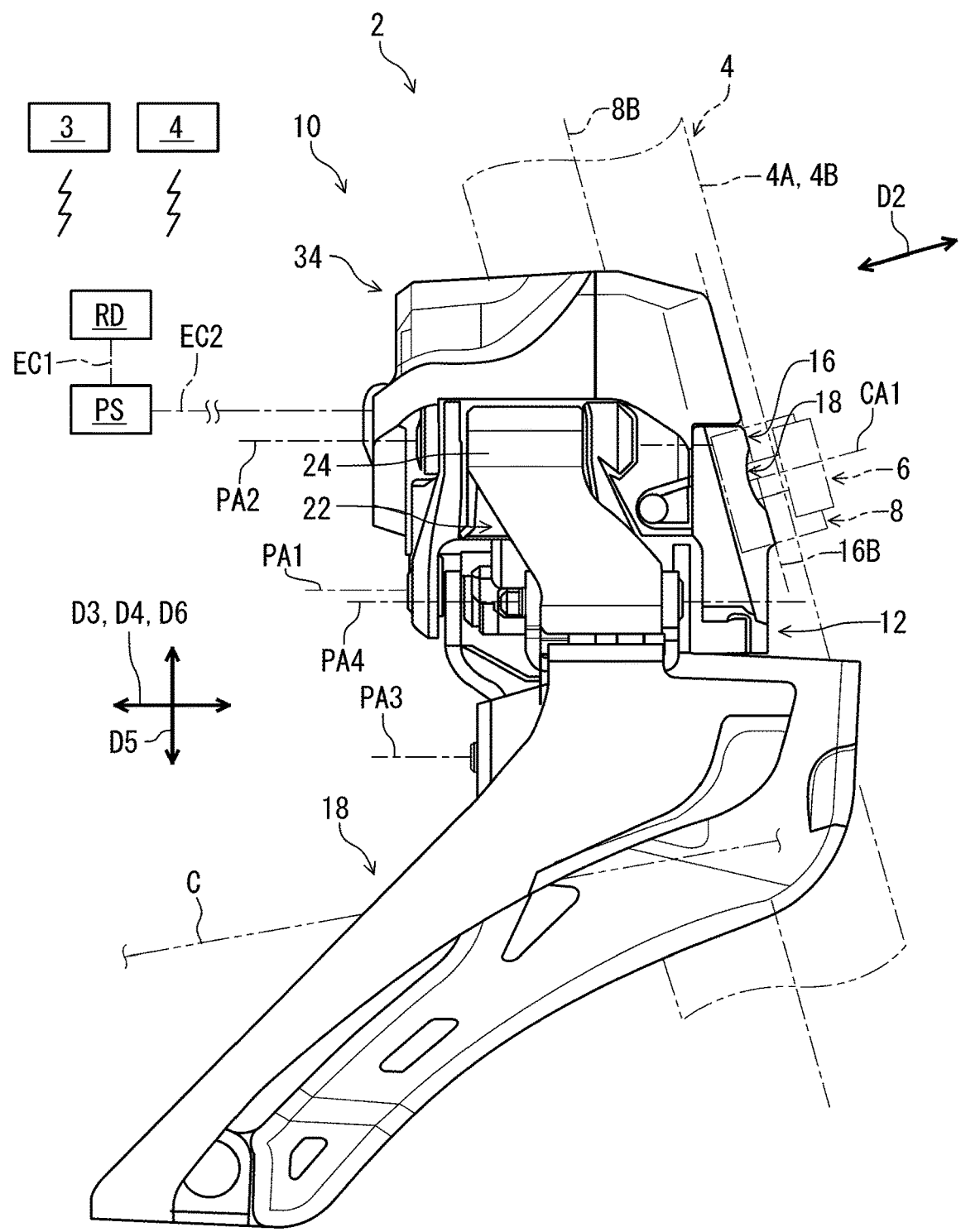
FIG. 27 is a side elevational view of a bicycle derailleur in accordance with a second embodiment.
Figure 28:
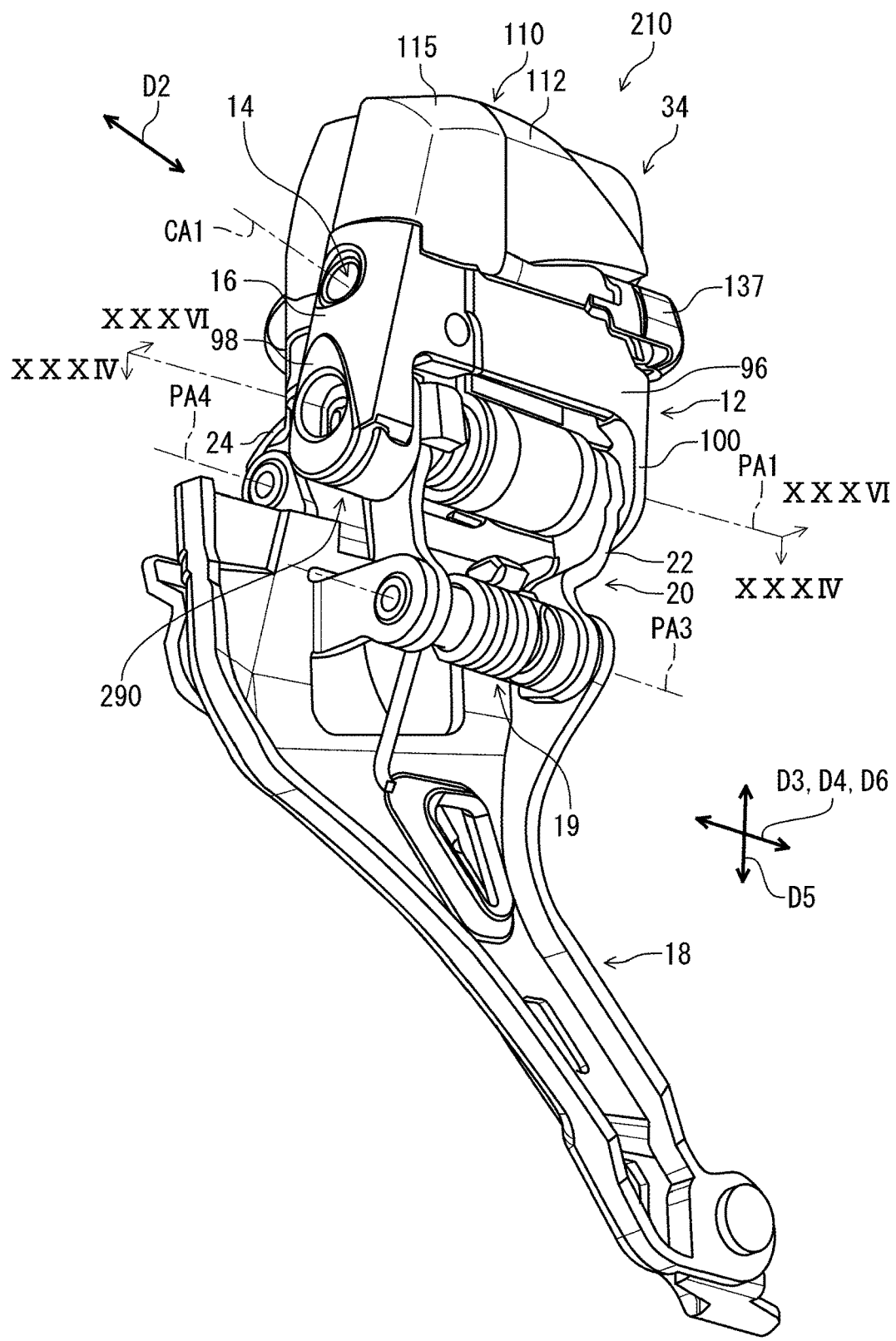
FIG. 28 is a perspective view of the bicycle derailleur illustrated in FIG. 27.

As seen in FIGS. 27 and 28, the bicycle derailleur 210 comprises the base member 12. The bicycle derailleur 210 comprises the chain guide 18. The bicycle derailleur 210 comprises the linkage structure 20. The bicycle derailleur 210 comprises the motor unit 34.

Figure 29:
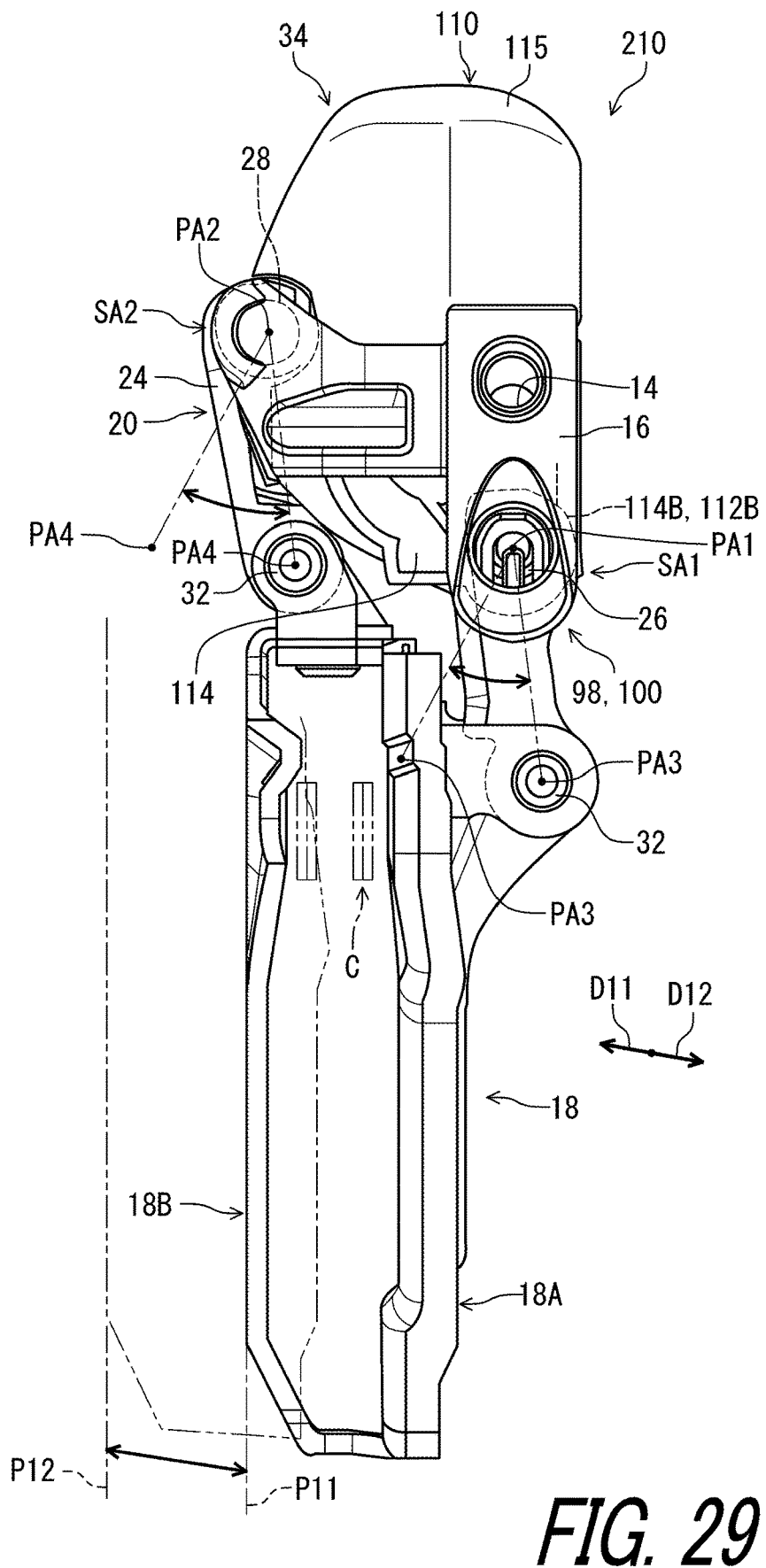
FIG. 29 is a front view of the bicycle derailleur illustrated in FIG. 27.

As seen in FIG. 29, the motor unit 34 is configured to apply the rotational force to the first link pin 26 to rotate the first link pin 26 relative to the base member 12 about the first pivot axis PA1. The first link member 22 is coupled to the first link pin 26 to be pivotable relative to the base member 12 about the first pivot axis PA1. The chain guide 18 is pivotally coupled to the first link member 22 to move relative to the base member 12 in response to a pivotal movement of the first link member 22 relative to the base member 12.

Figure 30:
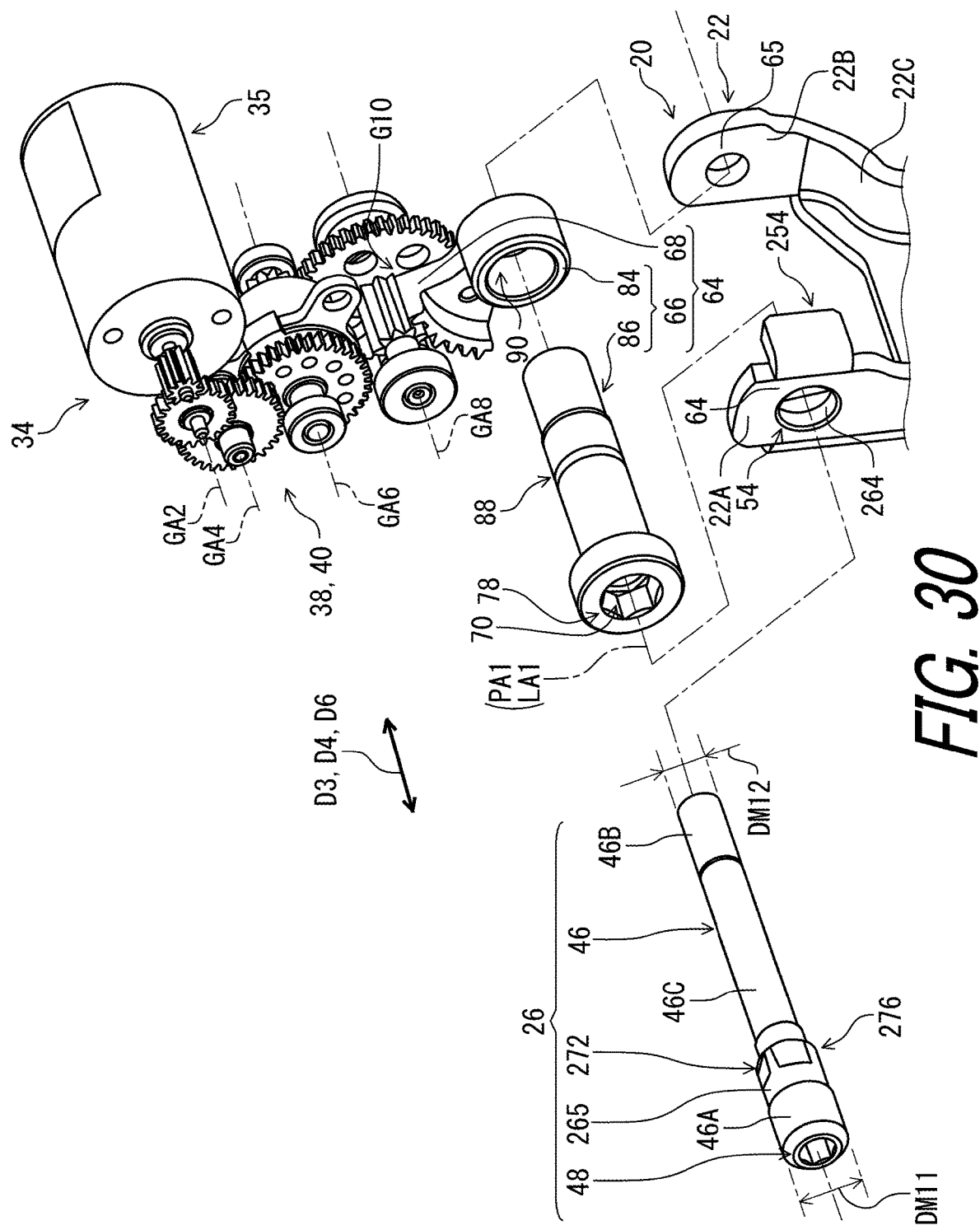
FIG. 30 is an exploded perspective view of the motor unit and the link member of the bicycle derailleur illustrated in FIG. 27.

As seen in FIG. 30, the output structure 44 is coupled to the first link pin 26 to be rotatable relative to the base member 12 about the first pivot axis PA1. At least one of the first link pin 26 and the output structure 44 includes a first coupling part 252. The first link member 22 includes a second coupling part 254. The first coupling part 252 is engaged with the second coupling part 254 to transmit the rotational force from the at least one of the first link pin 26 and the output structure 44 to the first link member 22. The first coupling part 252 is engaged with the second coupling part 254 to restrict a relative rotation between the inner link member 22 and the one of the inner link pin 26 and the output structure 44.

In the second embodiment, the output structure 44 includes the first coupling part 252. The first coupling part 252 is engaged with the second coupling part 254 to transmit the rotational force from the output structure 44 to the first link member 22. However, the first link pin 26 or both the first link pin 26 and the output structure 44 can include the first coupling part 252 if needed and/or desired. The first coupling part 252 can be engaged with the second coupling part 254 to transmit the rotational force from first link pin 26 or both the first link pin 26 and the output structure 44 to the first link member 22 if needed and/or desired.

Figure 31:
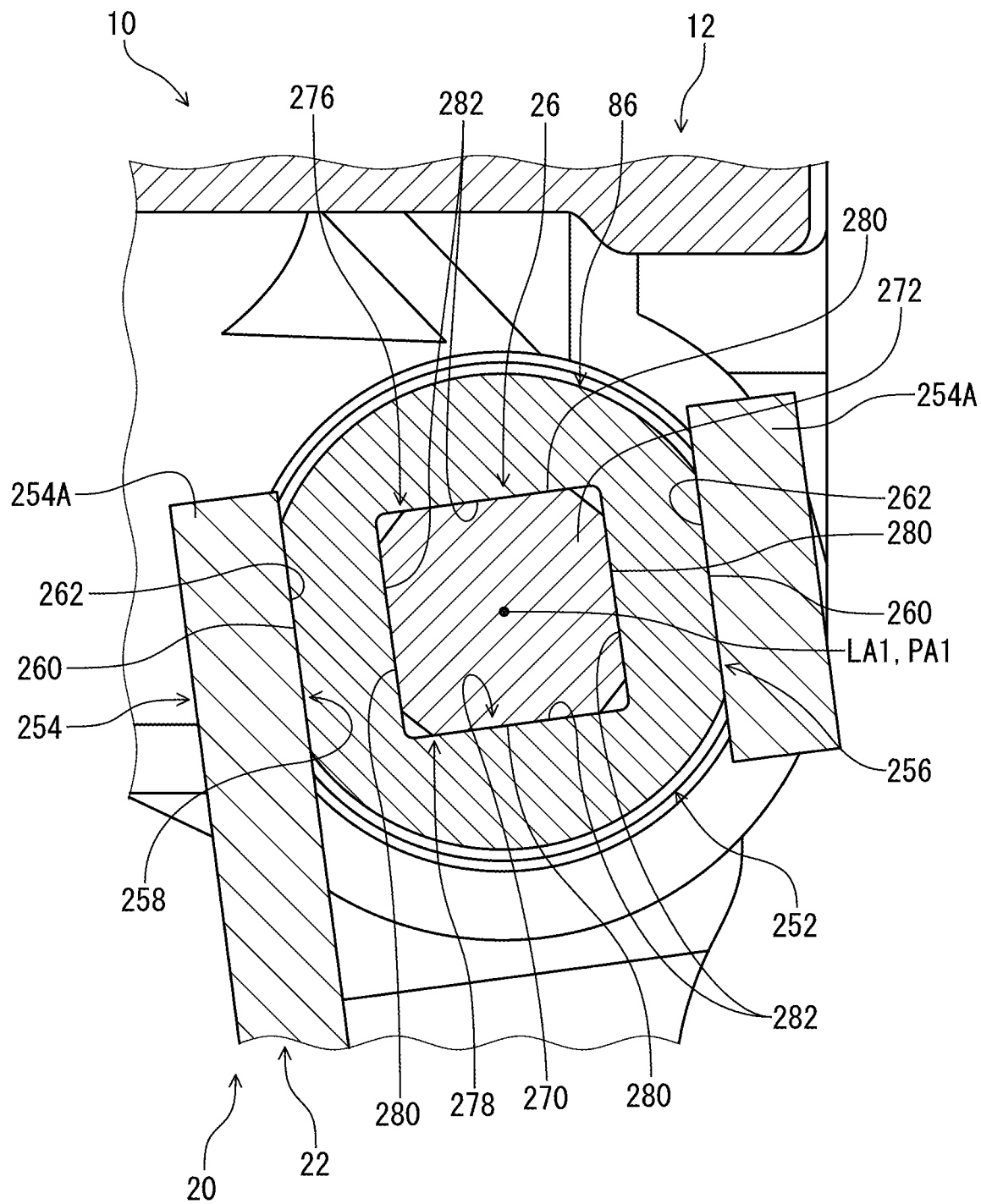
FIG. 31 is a cross-sectional view of the bicycle derailleur taken along line XXXI-XXXI of FIG. 34.

As seen in FIG. 31, the first coupling part 252 has a first profile 256 other than a perfect circle as viewed along the first pivot axis PA1. The second coupling part 254 has a second profile 258 other than a perfect circle as viewed along the first pivot axis PAL In the second embodiment, the first coupling part 252 includes at least one first flat surface 260. The at least one first flat surface 260 constitutes the first profile 256. The torque-transmitting profile 256 includes at least one first flat surface 260. The second coupling part 254 includes at least one second flat surface 262. The at least one second flat surface 262 constitutes the second profile 258. The at least one first flat surface 260 is contactable with the at least one second flat surface 262 to transmit the rotational force from the at least one of the first link pin 26 and the output structure 44 to the first link member 22 in a state where the first coupling part 252 is engaged with the second coupling part 254. The at least one first flat surface 260 is contactable with the at least one second flat surface 262 to restrict a relative rotation between the first link member 22 and the at least one of the first link pin 26 and the output structure 44 about the first pivot axis PA1.

In the second embodiment, the at least one first flat surface 260 is contactable with the at least one second flat surface 262 to transmit the rotational force from the output structure 44 to the first link member 22 in the state where the first coupling part 252 is engaged with the second coupling part 254. However, the at least one first flat surface 260 can be configured to be contactable with the at least one second flat surface 262 to transmit the rotational force from the first link pin 26 or both the first link pin 26 and the output structure 44 to the first link member 22 in the state where the first coupling part 252 is engaged with the second coupling part 254 if needed and/or desired.

The first coupling part 252 includes two first flat surfaces 260. One of the first flat surfaces 260 is provided on a reverse side of the other of the first flat surfaces 260 with respect to the first pivot axis PA1. The second coupling part 254 includes two second flat surfaces 262. One of the second flat surfaces 262 is provided on an opposite side of the other of the second flat surfaces 262 with respect to the first pivot axis PA1. The first flat surface 260 is configured to face the second flat surface 262 and is contactable with the second flat surface 262. The first flat surface 260 faces away from the longitudinal axis LA1. The second flat surface 262 faces toward the longitudinal axis LA1. The second flat surfaces 262 are spaced apart from each other.

Figure 32:
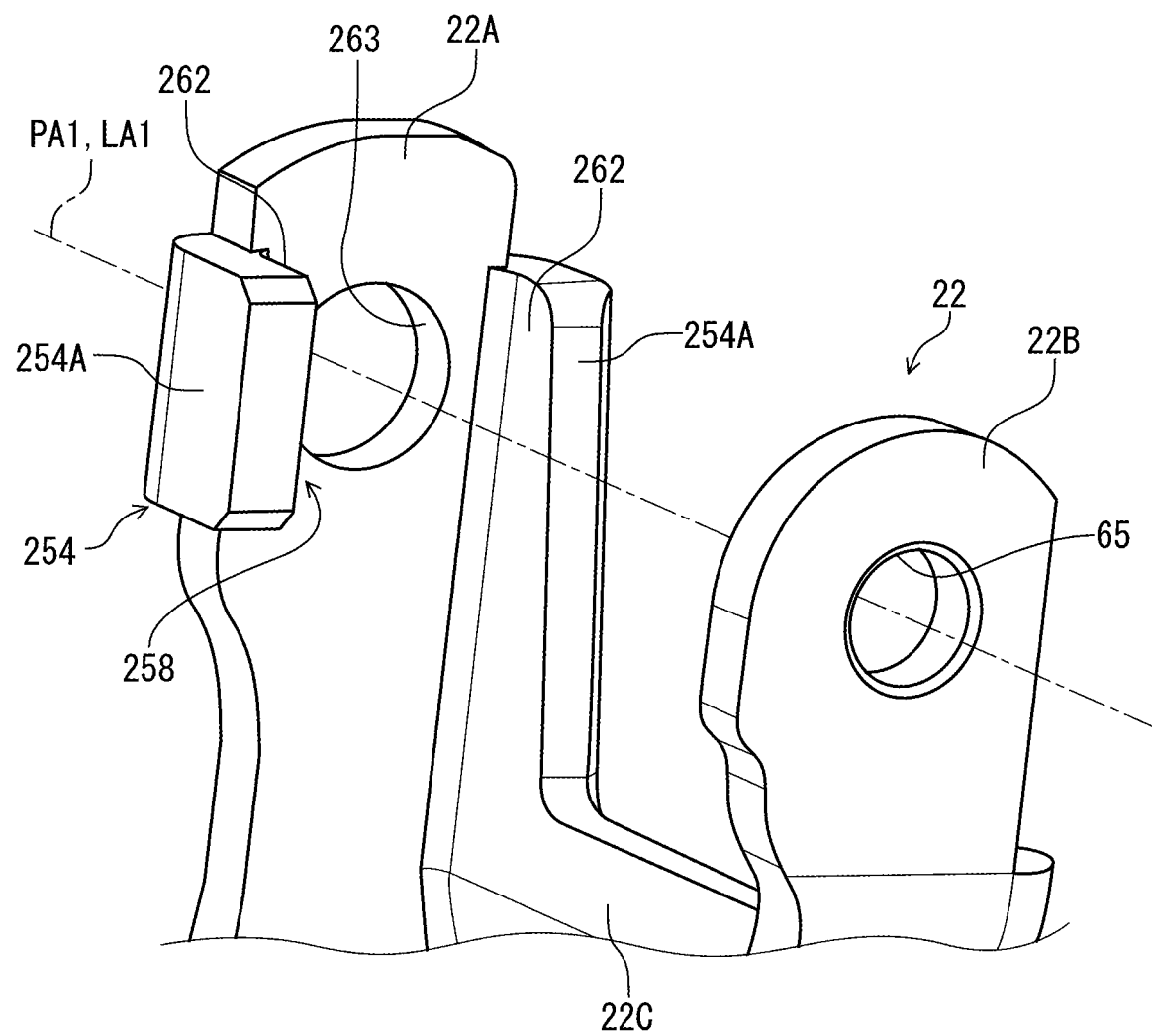
FIG. 32 is a partial perspective view of a link member of the bicycle derailleur illustrated in FIG. 27.

As seen in FIG. 32, the second coupling part 254 includes at least one coupling portion 254A. In the second embodiment, the second coupling part 254 includes two coupling portion 254A. The coupling portion 254A includes the second flat surface 262. The coupling portions 254A are spaced apart from each other. The coupling portions 254A extend from the first link arm 22A in the axial direction D4 of the first pivot axis PA1.

Figure 33:
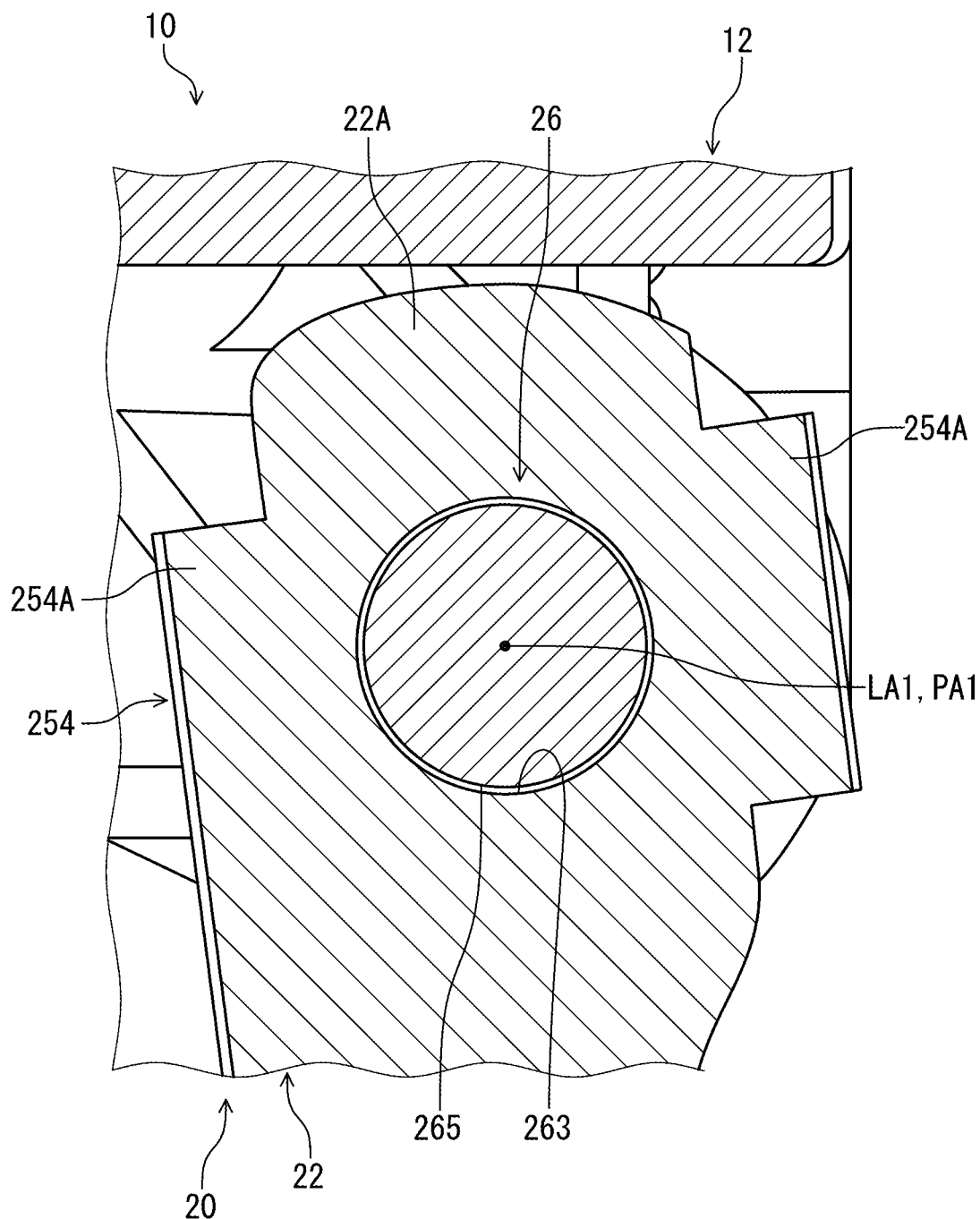
FIG. 33 is a cross-sectional view of the bicycle derailleur taken along line XXXIII-XXXIII of FIG. 34.

As seen in FIG. 30, the first link member 22 includes a coupling hole 264 provided on the first link arm 22A. The first link pin 26 includes an additional coupling part 265. As seen in FIG. 33, the additional coupling part 265 is provided in the coupling hole 264. The coupling hole 264 has an inner profile which is a perfect circle as viewed along the first pivot axis PA1. The additional coupling part 265 has an outer profile which is a perfect circle as viewed along the first pivot axis PA1. However, the coupling hole 264 and the additional coupling part 265 can have a profile other than a perfect circle as viewed along the first pivot axis PA1.

As seen in FIG. 30, the engagement body 66 includes a first engagement hole 270. The sleeve 86 includes the first engagement hole 270 and the second engagement part 88. The first link pin 26 includes a first engagement part 272. The first engagement part 272 is provided in the first engagement hole 270 to transmit the rotational force from the output structure 44 to the first link pin 26. The first engagement part 272 is provided in the first engagement hole 270 to restrict a relative rotation between the first link pin 26 and the output structure 44.

As seen in FIG. 31, the first engagement part 272 has an outer profile 276 other than a perfect circle as viewed along the first pivot axis PA1. The first engagement hole 270 has an inner profile 278 other than a perfect circle as viewed along the first pivot axis PA1. In the second embodiment, the outer profile 276 of the first engagement part 272 has a polygonal shape. The inner profile 278 of the first engagement hole 270 has a polygonal shape. The outer profile 276 has a substantially tetragonal shape. The inner profile 278 has a substantially tetragonal shape. The outer profile 276 and the inner profile 278 are configured to rotate the first link pin 26 along with the output structure 44 about the first pivot axis PA1.

The first engagement part 272 includes at least one outer flat surface 280. The first engagement hole 270 includes at least one inner flat surface 282. The at least one outer flat surface 280 is contactable with the at least one inner flat surface 282 to transmit the rotational force from the output gear G10 (see, e.g., FIG. 30) to the first link pin 26 in a state where the first engagement part 272 is provided in the first engagement hole 270. The at least one outer flat surface 280 is contactable with the at least one inner flat surface 282 to restrict a relative rotation between the output gear G10 (see, e.g., FIG. 30) and the first link pin 26 about the first pivot axis PA1 in the state where the first engagement part 272 is provided in the first engagement hole 270.

In the second embodiment, the first engagement part 272 includes four outer flat surfaces 280 constituting the substantially tetragonal shape. The first engagement hole 270 includes four inner flat surfaces 282 constituting the substantially tetragonal shape. The outer flat surface 280 is configured to face the inner flat surface 282 and is contactable with the inner flat surface 282. The outer flat surface 280 faces away from the longitudinal axis LA1. The inner flat surface 282 faces toward the longitudinal axis LA1. The first engagement hole 270 is defined by the second flat surfaces 62. However, the first engagement part 272 can include structures other than the at least one outer flat surface 280. The first engagement hole 270 can include structures other than the at least one inner flat surface 282.

In the second embodiment, the first engagement part 272 frictionally engages with the first engagement hole 270. The first engagement part 272 is press-fitted in the first engagement hole 270. However, the engagement structure between the first engagement part 272 and the first engagement hole 270 is not limited to the frictional engagement such as press-fitting. The engagement structure between the first engagement part 272 and the first engagement hole 270 can include other structure such as a bonding structure (e.g., an adhesive agent). Furthermore, the shapes of the first engagement hole 270 and the first engagement part 272 are not limited to a polygonal shape. At least one of the first engagement hole 270 and the first engagement part 272 can have another profile such as a circular shape, a spline, and a serration.

Figure 34:
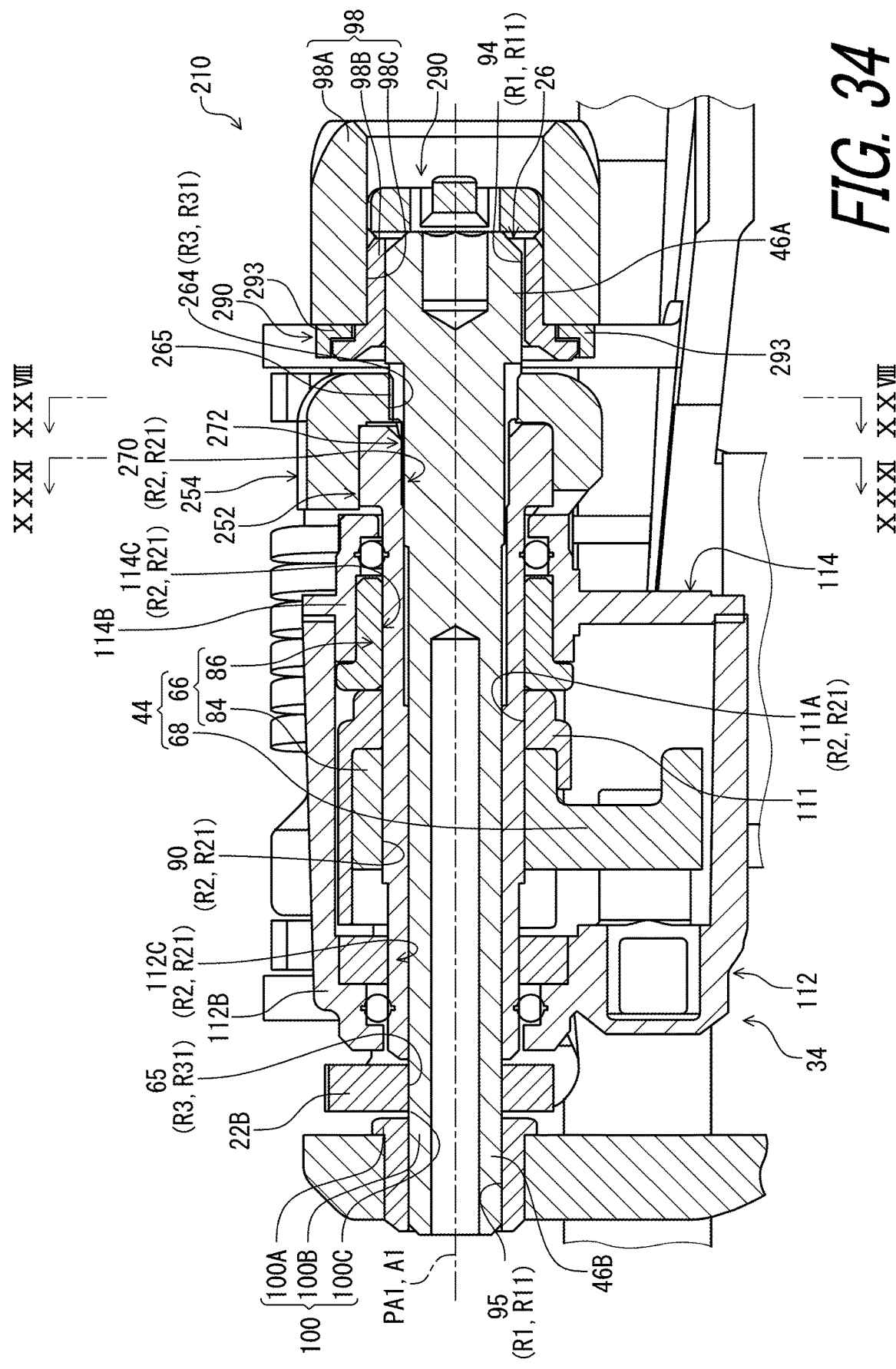
FIG. 34 is a cross-sectional view of the bicycle derailleur taken along line XXXIV-XXXIV of FIG. 28.

As seen in FIG. 34, the first link pin 26 extends through the first engagement hole 270. The sleeve 86 extends through the second engagement hole 90. The first end portion 46A is provided outside the first engagement hole 270. The second end portion 46B is provided outside the first engagement hole 270.

The at least one second link-pin-receiving opening R2 of the motor unit 34 includes at least one second inner link-pin-receiving opening R21. The at least one second inner link-pin-receiving opening R21 includes the first engagement hole 270, the second engagement hole 90, the cover opening 111A, the first through-hole 112C of the first housing 112, and the second through-hole 114C of the second housing 114. The first engagement hole 270 can also be referred to as a second inner link-pin-receiving opening 270. However, the total number of the at least one second inner link-pin-receiving opening R21 is not limited to five.

The at least one third link-pin-receiving opening R3 of the at least one link member LM includes at least one third inner link-pin-receiving opening R31 that the inner link member 22 has. The at least one third inner link-pin-receiving opening R31 includes the coupling hole 264 and the additional coupling hole 65. The coupling hole 264 can also be referred to as a third inner link-pin-receiving opening 264. Namely, the at least one third inner link-pin-receiving opening R31 includes a pair of third inner link-pin-receiving openings 264 and 65. However, the total number of the at least one third inner link-pin-receiving opening R31 is not limited to two.

The inner link pin 26 is configured to extend through the at least one first inner link-pin-receiving opening R11, the at least one second inner link-pin-receiving opening R21, and the at least one third inner link-pin-receiving opening R31. The inner link pin 26 is configured to extend through the first inner link-pin-receiving openings 94 and 95, the second inner link-pin-receiving openings 270, 90, 111A, 112C, and 114C, and the third inner link-pin-receiving openings 264 and 65. The inner link pin 26 is provided in the first support hole 94, the second support hole 95, the first engagement hole 270, and the coupling hole 264 which are aligned along the inner-link pivot axis PA1.

The at least one first link-pin-receiving opening R1, the at least one second link-pin-receiving opening R2, and the at least one third link-pin-receiving opening R3 are provided coaxially with each other in an assembled state of the bicycle derailleur 210. The at least one first inner link-pin-receiving opening R11, the at least one second inner link-pin-receiving opening R21, and the at least one third inner link-pin-receiving opening R31 are provided coaxially with each other on an inner co-axis A1 in the assembled state of the bicycle derailleur 210.

In the second embodiment, the first inner link-pin-receiving openings 94 and 95, the second inner link-pin-receiving openings 270, 90, 111A, 112C, and 114C, and the third inner link-pin-receiving openings 264 and 65 are provided coaxially with each other on the inner co-axis A1 in the assembled state of the bicycle derailleur 210. The inner co-axis A1 is coincident with the inner-link pivot axis PA1. However, at least one of the first inner link-pin-receiving openings 94 and 95, the second inner link-pin-receiving openings 270, 90, 111A, 112C, and 114C, and the third inner link-pin-receiving openings 264 and 65 can be offset from another opening in the assembled state of the bicycle derailleur 210. The inner co-axis A1 can be offset from the inner-link pivot axis PA1.

At least one of the at least one second inner link-pin-receiving opening R21 and the at least one third inner link-pin-receiving opening R31 are disposed between the pair of first inner link-pin-receiving openings 94 and 95 in the axial direction D4 with respect to the inner co-axis A1. The at least one second inner link-pin-receiving opening R21 is disposed between the pair of third inner link-pin-receiving openings 264 and 65 in the axial direction D4 with respect to the inner co-axis A1.

In the second embodiment, the second inner link-pin-receiving openings 270, 90, 111A, 112C, and 114C are disposed between the pair of third inner link-pin-receiving openings in the axial direction D4 with respect to the inner co-axis A1. The second inner link-pin-receiving openings 270, 90, 111A, 112C, and 114C are disposed between the pair of third inner link-pin-receiving openings 264 and 65 in the axial direction D4 with respect to the inner co-axis A1. However, at least one of the second inner link-pin-receiving openings 270, 90, 111A, 112C, and 114C can be disposed outside a space defined between the pair of first inner link-pin-receiving openings 94 and 95 in the axial direction D4. At least one of the second inner link-pin-receiving openings 270, 90, 111A, 112C, and 114C can be disposed outside a space defined between the pair of third inner link-pin-receiving openings 264 and 65 in the axial direction D4.

As seen in FIG. 28, the bicycle derailleur 210 further comprises a retainer 290. The retainer 290 is configured to restrict the first link pin 26 from being unintentionally dropped off from the base member 12. The retainer 290 is configured to be detachably attached to the base member 12.

Figure 35:
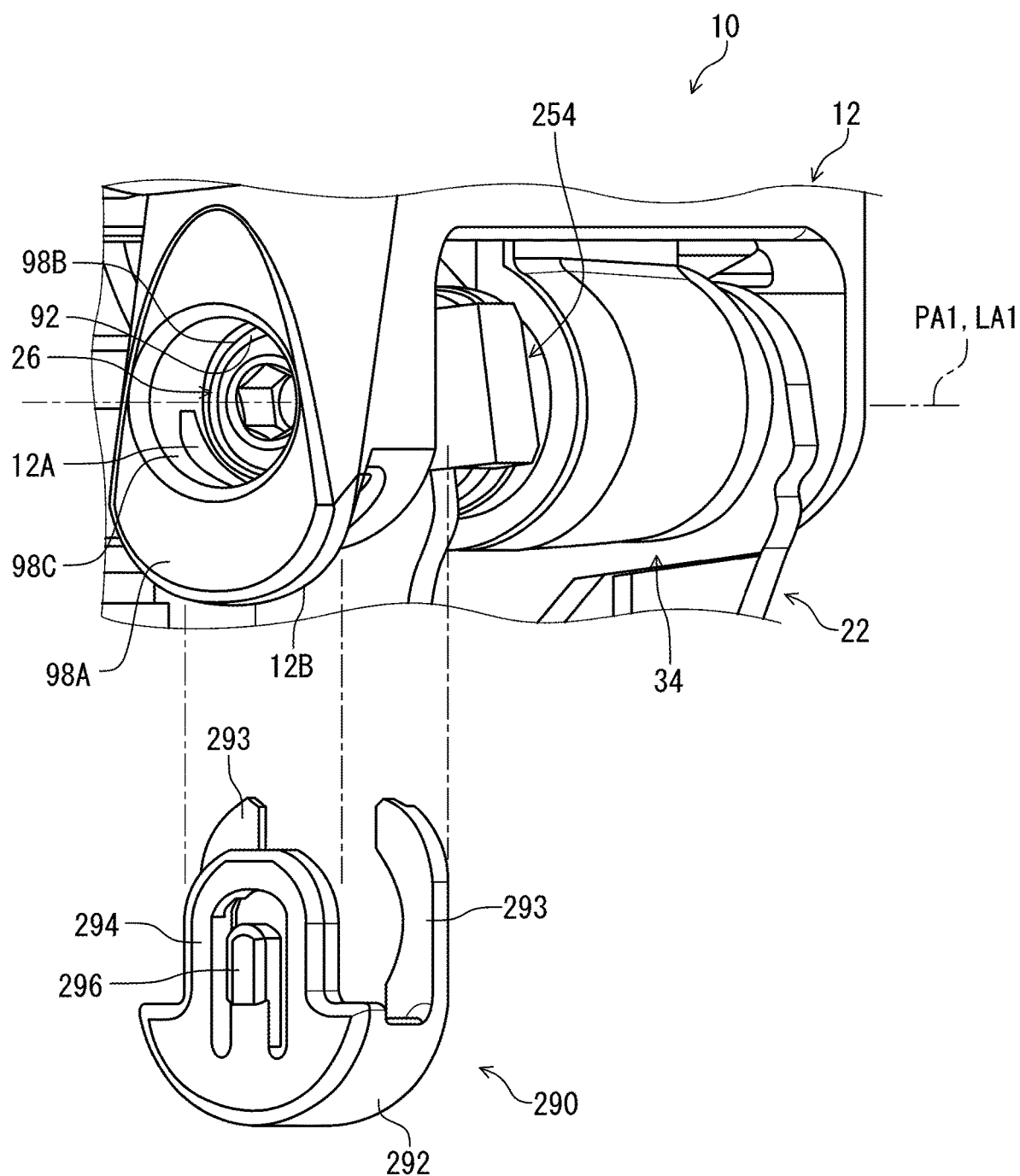
FIG. 35 is an exploded perspective view of the bicycle derailleur illustrated in FIG. 27.

As seen in FIG. 35, the first support part 98A of the base member 12 includes an insertion opening 12A and a recess 12B. The insertion opening 12A is connected to an inner peripheral surface of the first hole 98C of the first support part 98A. The retainer 290 is configured to be at least partly provided in the insertion opening 12A and the recess 12B.

The retainer 290 includes an attachment body 292, a pair of attachment arms 293, and a retainer body 294. The attachment arms 293 extend from the attachment body 292. The attachment arms 293 are configured to hold a part of the base member 12 to detachably couple the retainer 290 to the base member 12. In the second embodiment, the attachment arms 293 are configured to hold the first bush 98B of the base member 12 therebetween.

The retainer body 294 extends from the attachment body 292. The retainer body 294 is partly provided in the insertion opening 12A in a state where the retainer 290 is attached to the base member 12. The retainer body 294 is at least partly provided in the first hole 98C of the first support part 98A in the state where the retainer 290 is attached to the base member 12.

The retainer 290 includes an engagement part 296 configured to be engaged with the base member 12. The engagement part 296 extends from the attachment body 292. The engagement part 296 is configured to be elastically deformed.

Figure 36:
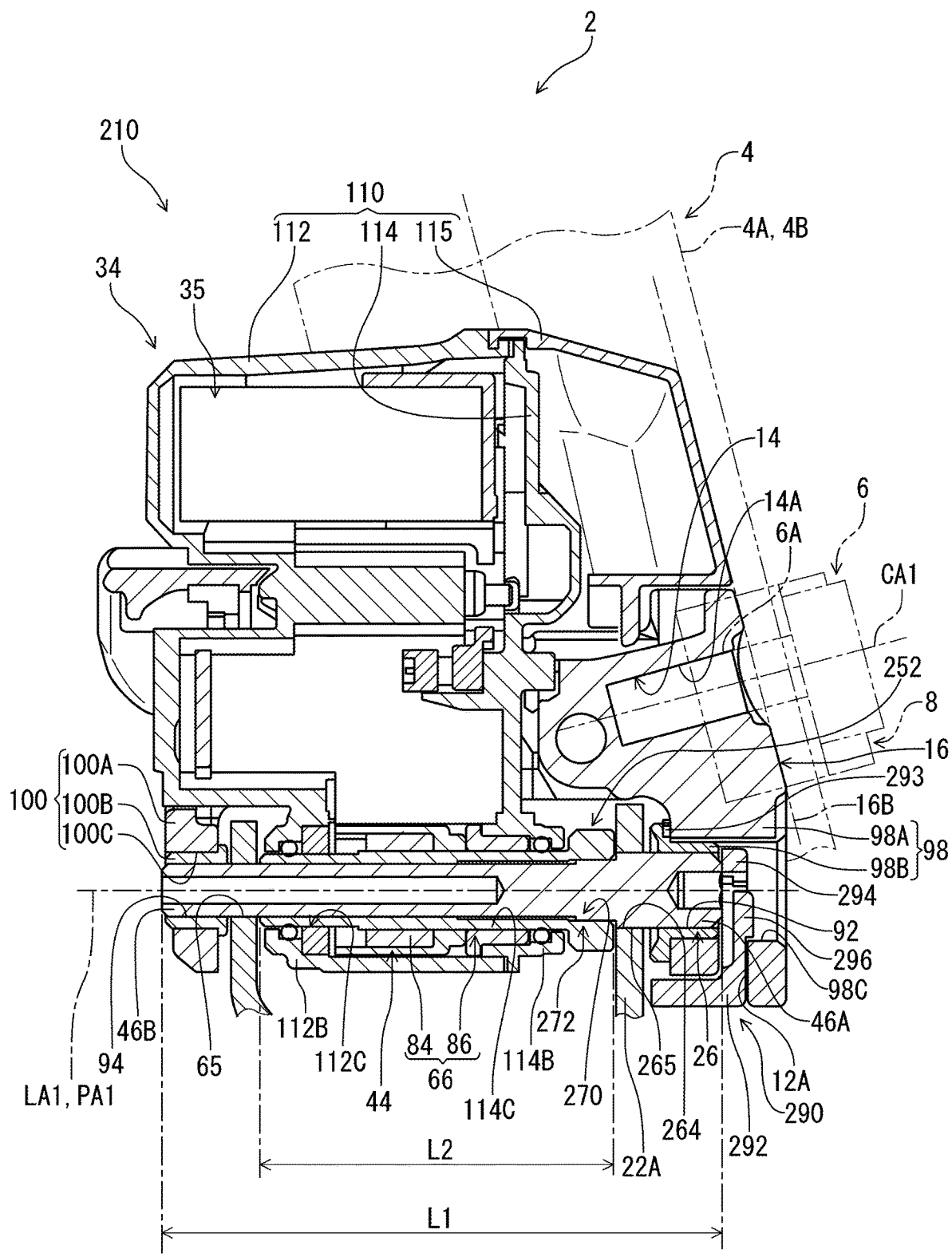
FIG. 36 is a cross-sectional view of the bicycle derailleur taken along line XXXVI-XXXVI of FIG. 28.

As seen in FIG. 36, the engagement part 296 is configured to be engaged with an inner peripheral surface of the first hole 98C to restrict the retainer 290 from being unintentionally dropped off from the base member 12. Thus, the retainer 290 restricts the first link pin 26 from being unintentionally dropped off from the first support hole 94 and the first hole 98C of the base member 12 in the state where the retainer 290 is attached to the base member 12. However, the retainer 290 can be omitted from the bicycle derailleur 210 if needed and/or desired. Furthermore, the retainer 290 can be applied to the bicycle derailleur 10 of the first embodiment.

Modifications

Figure 37:
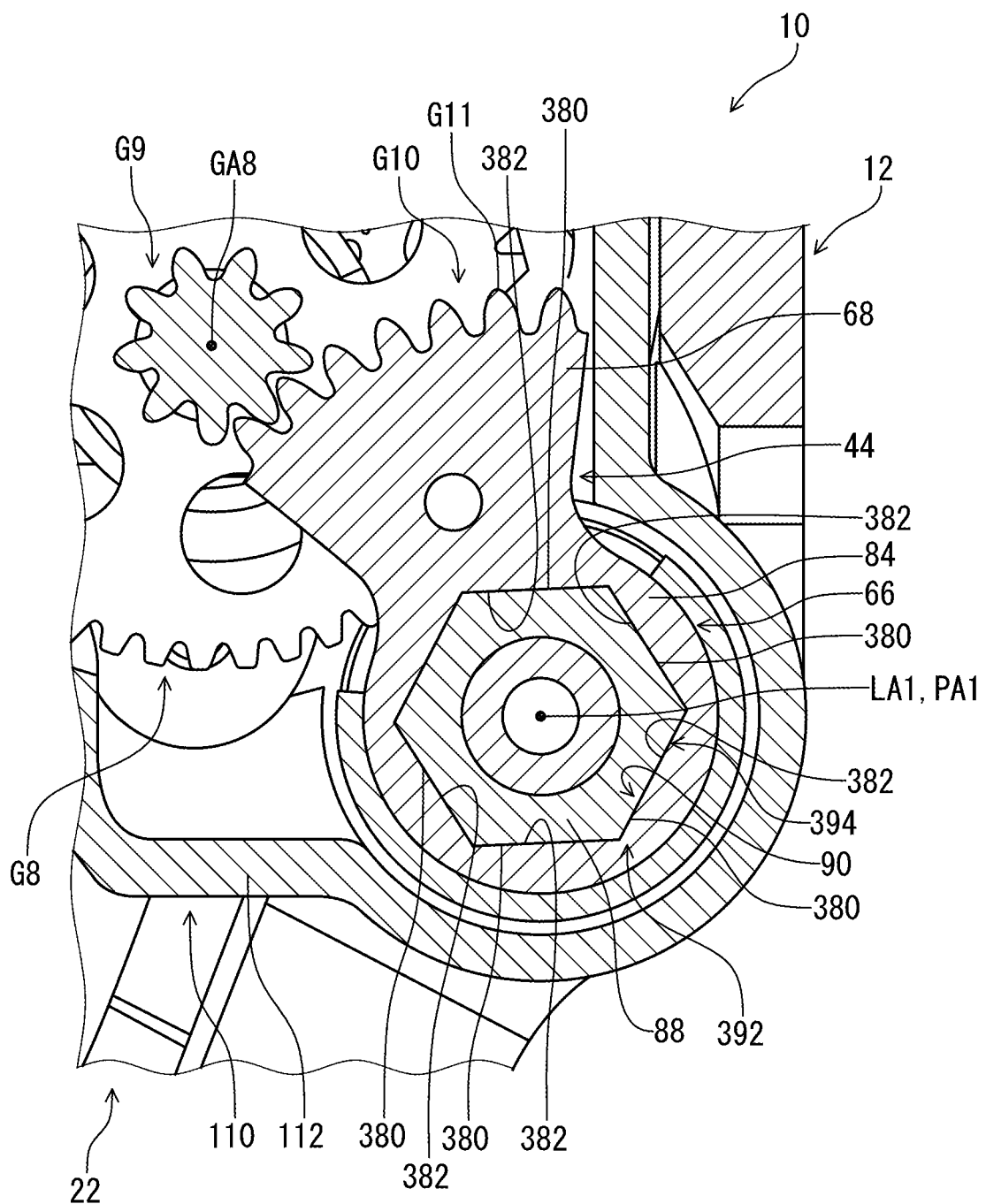
FIG. 37 is a cross-sectional view of a bicycle derailleur in accordance with a modification.

In the first and second embodiments, the second engagement part 88 of the sleeve 86 has the additional outer profile 92 which is a perfect circle as viewed along the first pivot axis PA1. The second engagement hole 90 of the tubular part 84 has the additional inner profile 93 which is a perfect circle as viewed along the first pivot axis PA1. As seen in FIG. 37, however, the second engagement part 88 can have an additional outer profile 392 other than a perfect circle as viewed along the first pivot axis PA1. The second engagement hole 90 can have an additional inner profile 394 other than a perfect circle as viewed along the first pivot axis PA1.

In the modification, the additional outer profile 392 of the second engagement part 88 has a polygonal shape. The additional inner profile 394 of the second engagement hole 90 has a polygonal shape. The additional outer profile 392 of the second engagement part 88 has a hexagonal shape. The additional inner profile 394 of the second engagement hole 90 has a hexagonal shape. The second engagement part 88 includes at least one additional outer flat surface 380. The second engagement hole 90 includes at least one additional inner flat surface 382. The at least one additional outer flat surface 380 is contactable with the at least one additional inner flat surface 382 to transmit the rotational force from the tubular part 84 to the sleeve 86. The second engagement part 88 includes six additional outer flat surfaces 380 constituting the hexagonal shape. The second engagement hole 90 includes six additional inner flat surface 382 constituting the hexagonal shape. However, at least one of the second engagement part 88 and the second engagement hole 90 can have another profile other than a perfect circle and the hexagonal shape.

In the first and second embodiments, the communicator 132 is configured to communicate with other devices using a wired communication. However, the bicycle derailleur 10 can be configured to communicate with other devices such as the operating device 3 using a wireless communication or both the wired communication and the wireless communication. The communicator 132 can be configured to communicate with other devices such as the operating device 3 using wireless communication or both the wired communication and the wireless communication. The communicator 132 can includes a wireless communicator configured to wirelessly communicate with other devices such as the operating device 3. In such a modification, for example, the wireless communicator can be provided in the arrangement area AR3 and/or the second area AR2 as viewed along the first pivot axis PA1.

In the first and second embodiments, the bicycle derailleur 10 or 210 includes the motor unit 34. However, the motor unit 34 can be omitted from the bicycle derailleur 10 or 210. In such a modification, the bicycle derailleur 10 or 210 can be actuated by a mechanical cable such as a Bowden cable.

In the first and second embodiments, the bicycle derailleur 10 or 210 is configured to be electrically connected to the electric power source PS mounted to the bicycle frame 4. However, the electric power source PS can be directly mounted to the bicycle derailleur 10. In such a modification, the bicycle derailleur 10 or 210 includes a power-source attachment part to which an electric power source PS is attached.

The bicycle derailleur 10 or 210 can includes an indicator such as a light-emitting diode (LED). In such a modification, the indicator is configured to indicate information relating to the bicycle 2. The information relating to the bicycle 2 includes a communication status of the bicycle derailleur 10 or 210, a remaining level of the electric power source PS, and a gear position of the bicycle derailleur 10 or 210.

Figure 38:
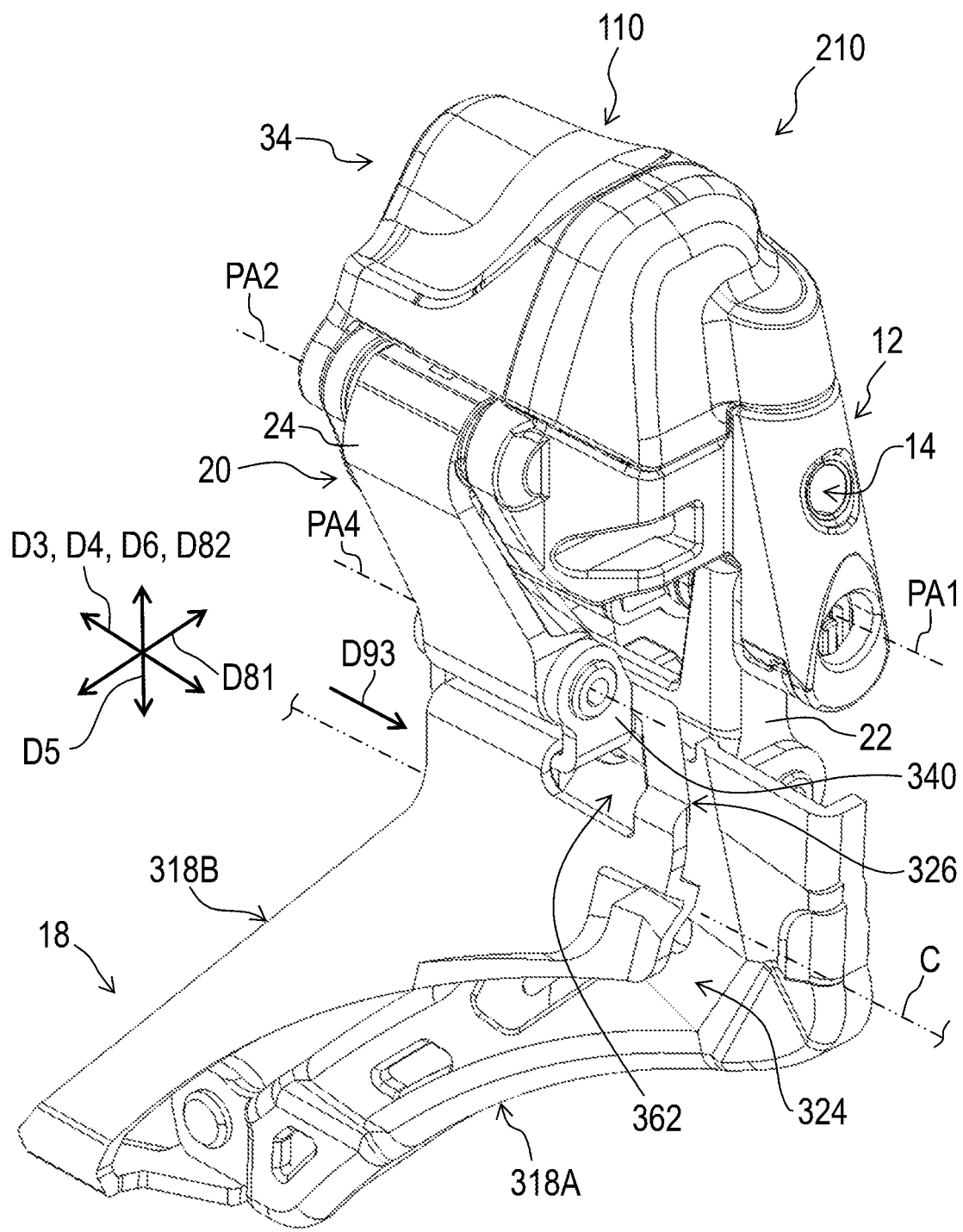
FIG. 38 is a perspective view of a bicycle derailleur in accordance with a modification.

As seen in FIGS. 38 to 43, the chain guide 18 can have shapes illustrated in the first and second embodiments. As seen in FIG. 38, for example, the chain guide 18 of the bicycle derailleur 210 comprises a first guide member 318A and a second guide member 318B. The first guide member 318A is an inner guide member. The second guide member 318B is an outer guide member. Thus, the first guide member 318A can also be referred to as an inner guide member 318A. The second guide member 318B can also be referred to as an outer guide member 318B. However, the first guide member 318A can be an outer guide member. The second guide member 318B can be an inner guide member. The first guide member 318A has substantially the same structure as the structure of the inner guide member 18A of the first and second embodiments. The second guide member 318B has substantially the same structure as the structure of the outer guide member 18B of the first and second embodiments. In this modification, the second guide member 318B is a separate member from the first guide member 318A. However, the second guide member 318B can be integrally provided with the first guide member 318A as a one-piece unitary member.

Figure 39:
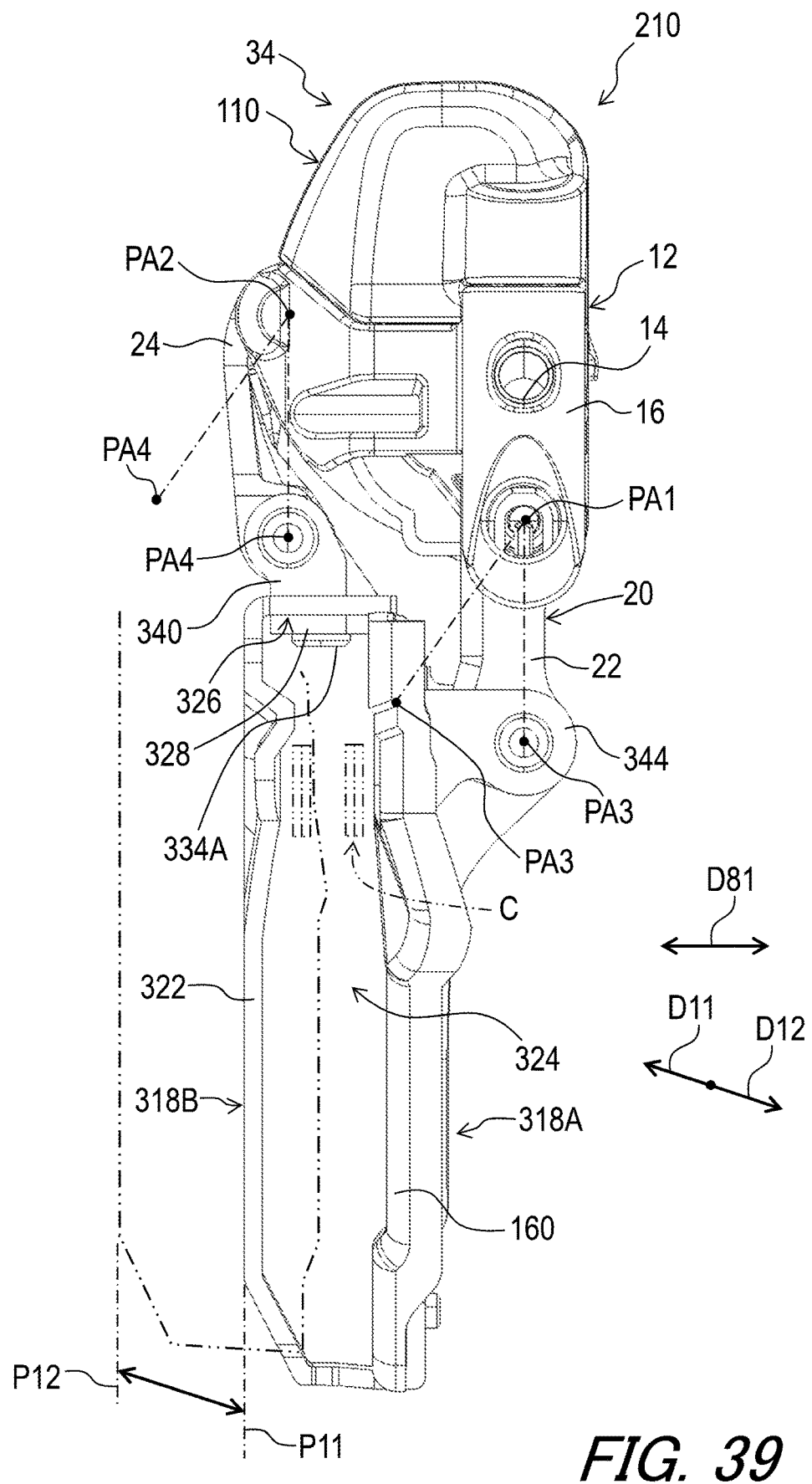
FIG. 39 is a side elevational view of the bicycle derailleur illustrated in FIG. 38.

As seen in FIG. 39, the inner guide plate 160 can also be referred to as a first guide plate 160. Thus, the first guide member 318A includes the first guide plate 160 configured to be contactable with the chain C. The second guide member 318B includes a second guide plate 322 configured to be contactable with the chain C and is spaced apart from the first guide member 318A. The second guide plate 322 is spaced apart from the first guide plate 160 in a first direction D81. The first guide plate 160 and the second guide plate 322 defines a chain-guide space 324 in which the chain C is to be provided.

Figure 40:
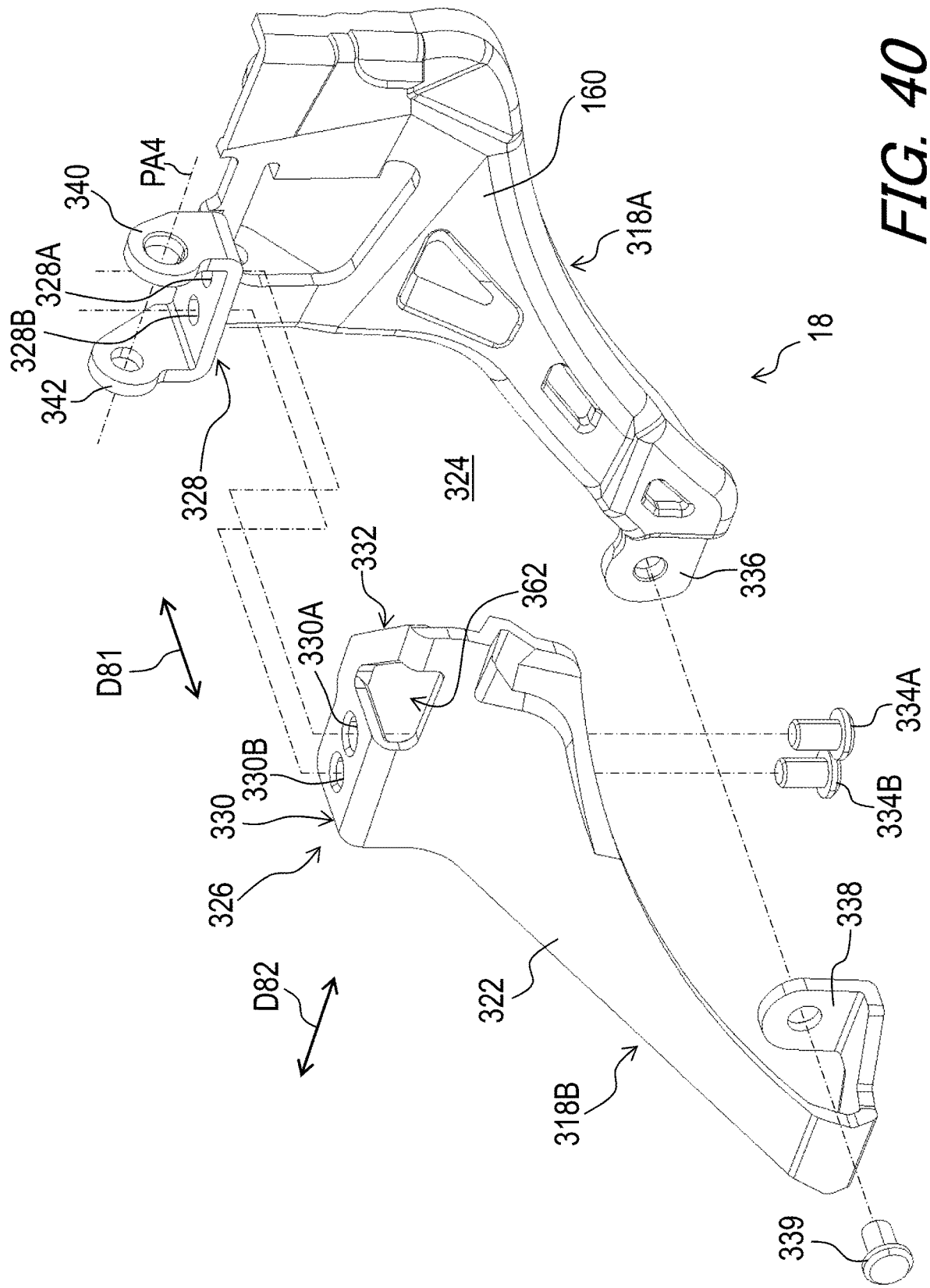
FIG. 40 is an exploded perspective view of a chain guide of the bicycle derailleur illustrated in FIG. 38.

As seen in FIG. 40, the second guide member 318B includes an extending part 326. The extending part 326 extends from the second guide plate 322 toward the first guide plate 160. The extending part 326 extends from the second guide plate 322 toward the first guide plate 160 in the first direction D81. The first guide member 318A includes a securing part 328 extending from the first guide plate 160 toward the second guide plate 322. The securing part 328 extends from the first guide plate 160 toward the second guide plate 322 in the first direction D81. The extending part 326 is configured to be secured to the securing part 328.

The extending part 326 includes a first extending part 330 and a second extending part 332. The first extending part 330 is at least partly spaced apart from the second extending part 332. The first extending part 330 is at least partly spaced apart from the second extending part 332 in a second direction D82 different from the first direction D81. In this modification, the first extending part 330 is partly spaced apart from the second extending part 332 in the second direction D82 perpendicular to the first direction D81. However, the second direction D82 can be non-perpendicular to the first direction D81.

The first extending part 330 includes a fastening hole 330A. The chain guide 18 further comprises a fastener 334A configured to secure the extending part 326 to the first guide member 318A. The fastener 334A extends through the fastening hole 330A.

Similarly, the first extending part 330 includes a fastening hole 330B. The chain guide 18 further comprises a fastener 334B configured to secure the extending part 326 to the first guide member 318A. The fastener 334B extends through the fastening hole 330B. The fastening hole 330A is spaced apart from the fastening hole 330B in the second direction D82. A total number of the fastening holes 330A and 330B is not limited to two. Furthermore, the second extending part 332 can include a fastening hole 330A instead of or in addition to the fastening holes 330A and 330B. At least one of the fastening holes 330A and 330B can be omitted from the first extending part 330.

The securing part 328 includes an additional fastening hole 328A. The additional fastening hole 328A corresponds to the fastening hole 330A. The fastener 334A extends through the additional fastening hole 328A. Similarly, the securing part 328 includes an additional fastening hole 328B. The additional fastening hole 328B corresponds to the fastening hole 330B. The fastener 334B extends through the additional fastening hole 328B. The additional fastening hole 328A is spaced apart from the additional fastening hole 328B in the second direction D82. A total number of the additional fastening holes 328A and 328B is not limited to two. At least one of the additional fastening holes 328A and 328B can be omitted from the securing part 328.

In the present embodiment, each of the fasteners 334A and 334B includes a screw. Each of the fastening holes 330A and 330B includes a threaded hole. Each of the additional fastening holes 328A and 328B includes a threaded hole. The fastener 334A is configured to be threadedly engaged in the fastening hole 330A and the additional fastening hole 328A. The fastener 334B is configured to be threadedly engaged in the fastening hole 330B and the additional fastening hole 328B.

The first guide member 318A includes an additional securing part 336. The second guide member 318B includes an additional securing part 338. The chain guide 18 includes an additional fastener 339. The additional securing part 336 is secured to the additional securing part 338 with the additional fastener 339. The additional fastener 339 includes a rivet. However, the additional fastener 339 can include other fasteners such as a screw.

The first guide member 318A includes a first coupling arm 340 and a first additional coupling arm 342. The first coupling arm 340 is configured to be pivotally coupled to the link member 24 (see, e.g., FIG. 39) of the linkage structure 20. The first additional coupling arm 342 is configured to be pivotally coupled to the link member 24 (see, e.g., FIG. 39) of the linkage structure 20.

The first coupling aim 340 extends from the securing part 328 away from the chain-guide space 324. The first additional coupling arm 342 extends from the securing part 328 away from the chain-guide space 324.

Figure 41:
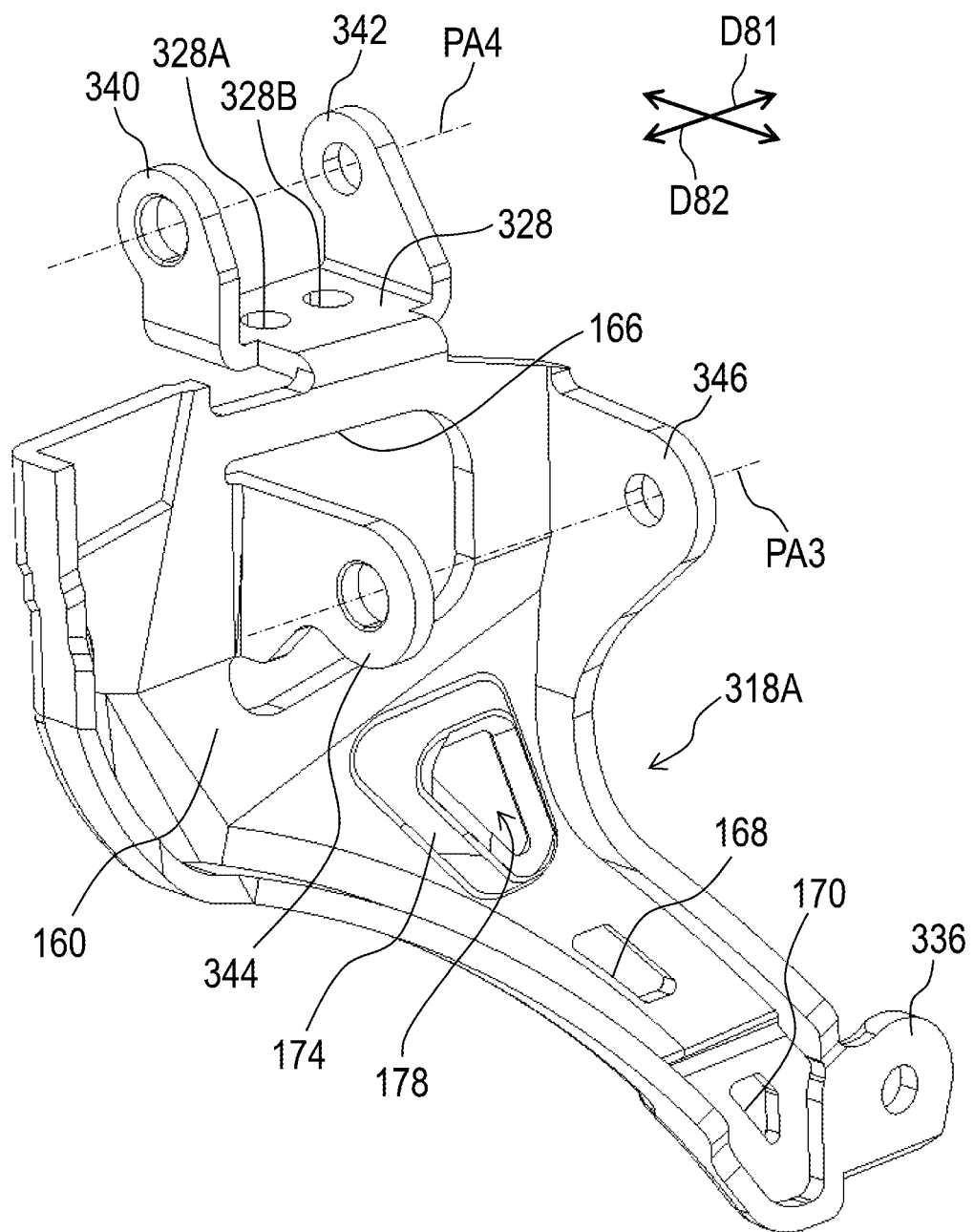
FIG. 41 is a perspective view of a first guide member of the chain guide of the bicycle derailleur illustrated in FIG. 38.

As seen in FIG. 41, the first guide member 318A includes a second coupling arm 344 and a second additional coupling arm 346. The second coupling arm 344 is configured to be pivotally coupled to the additional link member 22 (see, e.g., FIG. 39) of the linkage structure 20. The second additional coupling arm 346 is configured to be pivotally coupled to the additional link member 22 (see, e.g., FIG. 39) of the linkage structure 20. The second coupling atm 344 and the second additional coupling arm 346 extend from the second guide plate 322 in the first direction D81.

Figure 42:
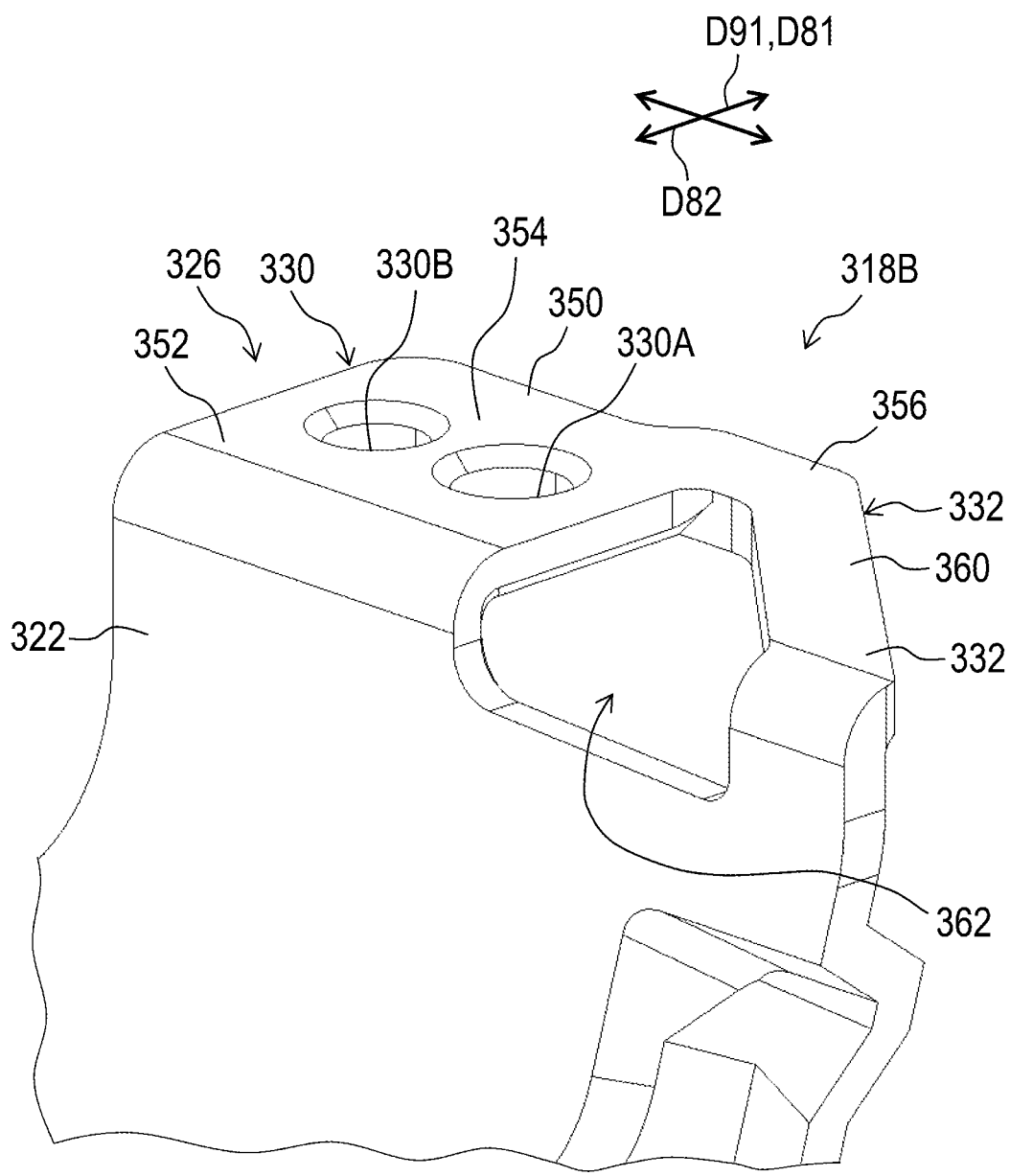
FIG. 42 is a partial perspective view of a second guide member of the chain guide of the bicycle derailleur illustrated in FIG. 38.

As seen in FIG. 42, the first extending part 330 has a first end portion 350, a second end portion 352, and a first intermediate portion 354 positioned between the first end portion 350 and the second end portion 352. The second extending part 332 has a third end portion 356, a fourth end portion 358, and a second intermediate portion 360 positioned between the third end portion 356 and the fourth end portion 358.

The first intermediate portion 354 of the first extending part 330 is spaced apart from the second intermediate portion 360 of the second extending part 332. The first intermediate portion 354 of the first extending part 330 is spaced apart from the second intermediate portion 360 of the second extending part 332 in the second direction D82. The first end portion 350 of the first extending part 330 is coupled to the second guide plate 322. The third end portion 356 of the second extending part 332 is coupled to the second guide plate 322. The first end portion 350 of the first extending part 330 is spaced apart from the third end portion 356 of the second extending part 332 in the second direction D82. The second end portion 352 of the first extending part 330 is coupled to the fourth end portion 358 of the second extending part 332.

The fastening hole 330A is disposed between the first end portion 350 and the second end portion 352 to secure the first extending part 330 to the first guide member 318A. The fastening hole 330B is disposed between the first end portion 350 and the second end portion 352 to secure the first extending part 330 to the first guide member 318A. However, the fastening holes 330A and 330B can be disposed in another position.

Figure 43:
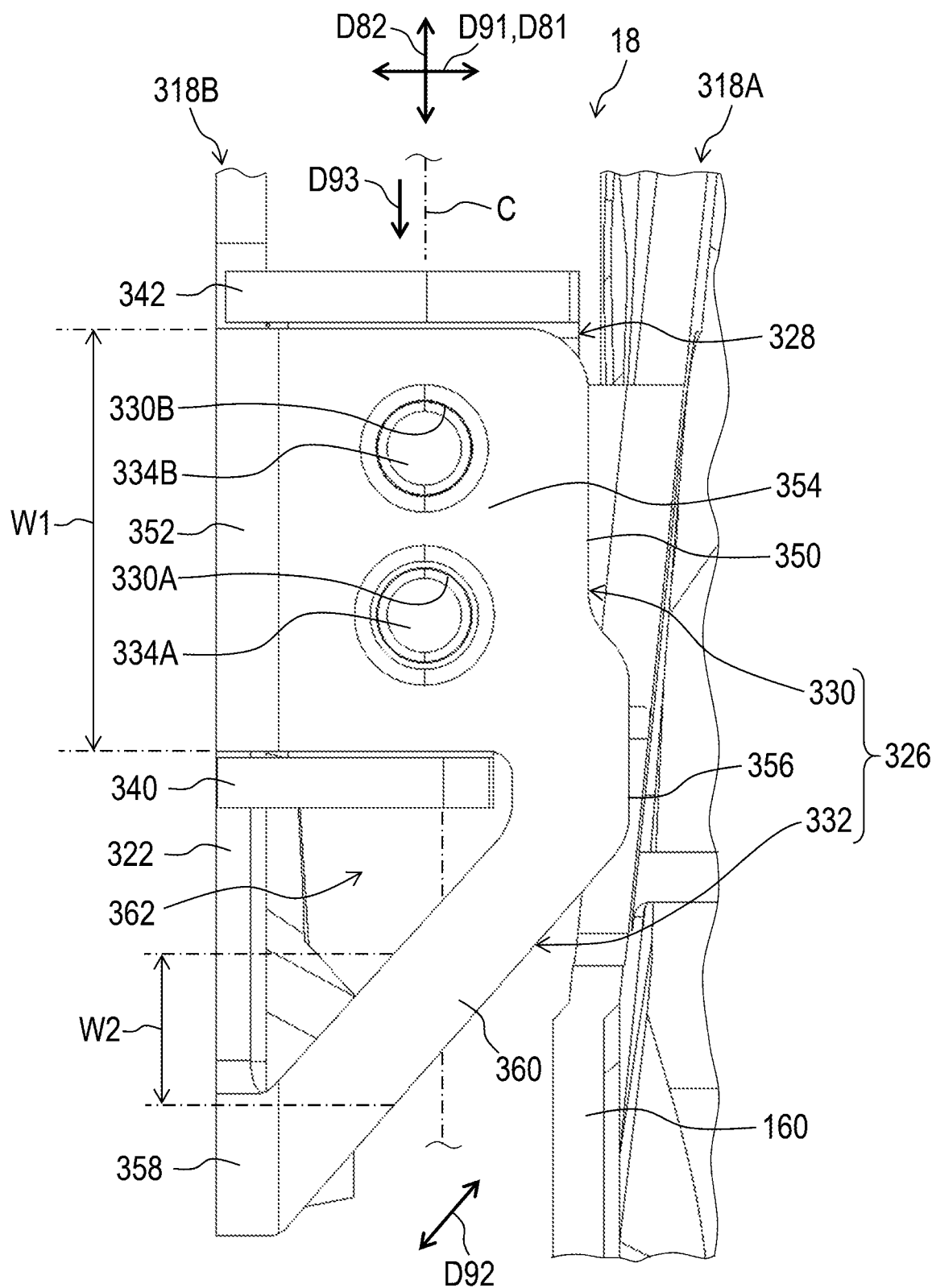
FIG. 43 is a plan view of the chain guide of the bicycle derailleur illustrated in FIG. 38.

As seen in FIG. 43, the first extending part 330 extends in a first extending direction D91. The second extending part 332 extends in a second extending direction D92. The first extending direction D91 is non-parallel to the second extending direction D92. The first intermediate portion 354 extends in the first extending direction D91 from the first end portion 350 to the second end portion 352. The second intermediate portion 360 extends in the second extending direction D92 from the third end portion 356 to the fourth end portion 358. The first extending direction D91 is parallel to the first direction D81. The second extending direction D92 is inclined relative to the first extending direction D91 and the first direction D81.

The second extending part 332 is disposed on a downstream side of the first extending part 330 with respect to a driving direction D93 of the chain C. The driving direction D93 of the chain C is a direction in which the chain C passes through the chain-guide space 324 during pedaling. The driving direction D93 is substantially parallel to the second direction D82.

The first extending part 330 has a first width W1 defined in the second direction D82. The second extending part 332 has a second width W2 defined in the second direction D82. The first width W1 is different from the second width W2. The first width W1 is larger than the second width W2. However, the first width W1 can be equal to or smaller than the second width W2.

The first additional coupling arm 342 is spaced apart from the first coupling arm 340. The first extending part 330 is provided between the first coupling arm 340 and the first additional coupling arm 342. The first additional coupling arm 342 is spaced apart from the first coupling arm 340 in the second direction D82. The first extending part 330 is provided between the first coupling arm 340 and the first additional coupling arm 342 in the second direction D82.

The second guide member 318B includes a guide-plate opening 362 defined by the second guide plate 322, the first extending part 330, and the second extending part 332. The second guide plate 322, the first extending part 330, and the second extending part 332 are arranged to surround the guide-plate opening 362. As seen in FIGS. 38 and 43, the first coupling arm 340 is provided in the guide-plate opening 362.

In the above modification depicted in FIGS. 38 to 43, the extending part 326 is integrally provided with the second guide plate 322 as a one-piece unitary member. The securing part 328 is integrally provided with the first guide plate 160 as a one-piece unitary member. However, the extending part 326 can be a separate member from the second guide plate 322. The securing part 328 can be a separate member from the first guide plate 160. The structures of the first guide member 318A and the second guide member 318B can be applied to the chain guide 18 of the bicycle derailleur 10 and 210 of the first and second embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
a base member;
a linkage structure including a first link pin rotatably mounted to the base member about a first pivot axis; and
a motor unit configured to apply rotational force to the first link pin to rotate the first link pin relative to the base member about the first pivot axis, wherein
the motor unit includes an output structure coupled to the first link pin to be rotatable relative to the base member about the first pivot axis,
the output structure includes
an engagement body including a first engagement hole, and
a geared portion provided on the engagement body,
the engagement body includes a tubular part and a sleeve which is a separate member from the tubular part,
the sleeve includes the first engagement hole and a second engagement part, the tubular part includes a second engagement hole, and
the second engagement part is provided in the second engagement hole to transmit the rotational force from the tubular part to the sleeve.

2. The bicycle derailleur according to claim 1, wherein
the linkage structure includes a first link member coupled to the first link pin to be pivotable relative to the base member about the first pivot axis.

3. The bicycle derailleur according to claim 2, further comprising
a chain guide pivotally coupled to the first link member to move relative to the base member in response to a pivotal movement of the first link member relative to the base member.

4. The bicycle derailleur according to claim 2, wherein
at least one of the first link pin and the output structure includes a first coupling part,
the first link member includes a second coupling part, and
the first coupling part is engaged with the second coupling part to transmit the rotational force from the at least one of the first link pin and the output structure to the first link member.

5. The bicycle derailleur according to claim 4, wherein
the first coupling part has a first profile other than a perfect circle as viewed along the first pivot axis, and
the second coupling part has a second profile other than a perfect circle as viewed along the first pivot axis.

6. The bicycle derailleur according to claim 5, wherein
the first profile of the first coupling part has a polygonal shape, and
the second profile of the second coupling part has a polygonal shape.

7. The bicycle derailleur according to claim 4, wherein
the first coupling part includes at least one first flat surface,
the second coupling part includes at least one second flat surface, and
the at least one first flat surface is contactable with the at least one second flat surface to transmit the rotational force from the at least one of the first link pin and the output structure to the first link member in a state where the first coupling part is engaged with the second coupling part.

8. The bicycle derailleur according to claim 4, wherein
the first link pin includes a first engagement part, and
the first engagement part is provided in the first engagement hole to transmit the rotational force from the output structure to the first link pin.

9. The bicycle derailleur according to claim 8, wherein
the first engagement part has an outer profile other than a perfect circle as viewed along the first pivot axis, and
the first engagement hole has an inner profile other than a perfect circle as viewed along the first pivot axis.

10. The bicycle derailleur according to claim 8, wherein
the first engagement part frictionally engages with the first engagement hole.

11. The bicycle derailleur according to claim 9, wherein
the outer profile of the first engagement part has a polygonal shape, and
the inner profile of the first engagement hole has a polygonal shape.

12. The bicycle derailleur according to claim 8, wherein
the first engagement part includes at least one outer flat surface,
the first engagement hole includes at least one inner flat surface, and
the at least one outer flat surface is contactable with the at least one inner flat surface to transmit the rotational force from the output gear to the first link pin in a state where the first engagement part is provided in the first engagement hole.

13. The bicycle derailleur according to claim 8, wherein the second engagement part has an additional outer profile other than a perfect circle as viewed along the first pivot axis, and
the second engagement hole has an additional inner profile other than a perfect circle as viewed along the first pivot axis.

14. The bicycle derailleur according to claim 13, wherein the additional outer profile of the second engagement part has a polygonal shape, and
the additional inner profile of the second engagement hole has a polygonal shape.

15. The bicycle derailleur according to claim 8, wherein the second engagement part includes at least one additional outer flat surface,
the second engagement hole includes at least one additional inner flat surface, and
the at least one additional outer flat surface is contactable with the at least one additional inner flat surface to transmit the rotational force from the tubular part to the sleeve.

16. The bicycle derailleur according to claim 8, wherein the second engagement part frictionally engages with the second engagement hole.

17. The bicycle derailleur according to claim 1, wherein the base member includes a first support hole and a second support hole spaced apart from the first support hole along the first pivot axis, and
the first link pin includes
a first end provided in the first support hole, and
a second end provided in the second support hole.

18. The bicycle derailleur according to claim 1, wherein the linkage structure comprises
a second link member;
a second link pin configured to pivotally couple the second link member to the base member about a second pivot axis;
a third link pin configured to pivotally couple the first link member to the chain guide about a third pivot axis; and
a fourth link pin configured to pivotally couple the second link member to the chain guide about a fourth pivot axis.

19. A bicycle gear structure comprising:
a torque diode comprising:
an outer casing;
a first shaft rotatably mounted to the outer casing about a first rotational axis; and
a second shaft rotatably mounted to the outer casing about a second rotational axis;
a first transmitting gear attached to the first shaft; and
a first additional transmitting gear meshed with the first transmitting gear and rotatably mounted to the outer casing about a third rotational axis offset from the first rotational axis and the second rotational axis.

20. The bicycle gear structure according to claim 19, further comprising
a support pin, wherein
the outer casing includes a gear support hole, and
the first additional transmitting gear is attached to the support pin, and
the support pin is rotatably provided in the gear support hole.

21. The bicycle gear structure according to claim 20, wherein
the outer casing includes an outer casing body and a gear support part extending radially outwardly from the outer casing body with respect to the first rotational axis, and
the gear support part includes the gear support hole.

22. The bicycle gear structure according to claim 21, wherein
the outer casing includes a securing part configured to be secured to another member, and
the securing part extends radially outwardly from the outer casing body with respect to the first rotational axis and includes a securing hole.

23. The bicycle gear structure according to claim 19, further comprising
a second transmitting gear attached to the second shaft.

24. The bicycle gear structure according to claim 19, wherein
an outer diameter of the first transmitting gear is larger than an outer diameter of the first additional transmitting gear.

25. The bicycle gear structure according to claim 19, wherein
the first rotational axis is coincident with the second rotational axis.

26. A bicycle motor unit comprising:
a motor configured to generate rotational force; and
the bicycle gear structure according to claim 21, the bicycle gear structure being configured to transmit the rotational force.

27. A bicycle derailleur comprising:
a base member;
a chain guide movable relative to the base member;
a linkage structure configured to movably couple the chain guide to the base member; and
the bicycle motor unit according to claim 26, the bicycle motor unit being configured to apply rotational force to at least one of the chain guide and the linkage structure to move the chain guide relative to the base member.

28. A front derailleur comprising:
a base member;
a chain guide movable relative to the base member;
a linkage structure configured to movably couple the chain guide to the base member; and
a motor unit configured to apply rotational force to at least one of the chain guide and the linkage structure to move the chain guide relative to the base member, the motor unit comprising:
a motor configured to generate the rotational force; and
a gear structure including a plurality of spur gears configured to transmit the rotational force to the at least one of the chain guide and the linkage structure, the motor unit being free of gears other than the plurality of spur gears on a rotational-force transmission path provided from the motor to the at least one of the chain guide and the linkage structure, wherein
the motor includes an output shaft,
the plurality of spur gears includes
an input gear secured to the output shaft, and
an output gear coupled to the at least one of the chain guide and the linkage structure,
the reduction ratio is defined from the input gear to the output gear, and
the output gear includes a sector gear.

29. The front derailleur according to claim 28, wherein the gear structure has a reduction ratio equal to or lower than 1400.

30. A bicycle derailleur comprising:
a base member;
a chain guide movable relative to the base member;
a linkage structure configured to movably couple the chain guide to the base member; and
a motor unit configured to apply rotational force to at least one of the chain guide and the linkage structure to move the chain guide relative to the base member, the motor unit comprising:
   a motor; and
   a gear structure including a plurality of spur gears configured to transmit the rotational force to the at least one of the chain guide and the linkage structure, the gear structure having a reduction ratio equal to or lower than 1400, wherein
the motor unit is free of gears other than the plurality of spur gears on a rotational-force transmission path provided from the motor to the at least one of the chain guide and the linkage structure.

31. The bicycle derailleur according to claim 30, further comprising
a rotation sensor configured to sense a rotational position of one of the plurality of spur gears.

32. The bicycle derailleur according to claim 31, wherein
the plurality of spur gears includes a sensor gear, and
the rotation sensor is configured to sense the rotational position of the sensor gear.

33. A front derailleur comprising:
a base member;
a chain guide movable relative to the base member;
a linkage structure configured to movably couple the chain guide to the base member; and
a motor unit configured to apply rotational force to at least one of the chain guide and the linkage structure to move the chain guide relative to the base member, the motor unit comprising:
   a motor configured to generate the rotational force;
   a gear structure including a plurality of gears configured to transmit the rotational force to the at least one of the chain guide and the linkage structure; and
   a gear support structure configured to rotatably support the plurality of gears,
the plurality of gears comprising:
   a first gear rotatable relative to the gear support structure about a first gear axis;
   a second gear rotatable relative to the gear support structure about a second gear axis;
   a third gear rotatable relative to the gear support structure about a third gear axis;
   a first pin configured to rotatably support the first gear about the first gear axis, the first pin including a first pin end and a first opposite pin end;
   a second pin configured to rotatably support the second gear about the second gear axis, the second pin including a second pin end and a second opposite pin end;
   a third pin configured to rotatably support the third gear about the third gear axis, the third pin including a third pin end and a third opposite pin end, and
the gear support structure comprising:
   a first support configured to support the first pin end and the second pin end;
   a second support configured to support the second opposite pin end and the third pin end, the second support being a separate member from the first support;
   a third support configured to support the third opposite pin end; and
   a fourth support configured to support the first opposite pin end.

34. The front derailleur according to claim 33, wherein
the plurality of gears comprises a first additional gear rotatable relative to the gear support structure about the first gear axis, and
the first pin is configured to rotatably support the first gear and the first additional gear about the first gear axis.

35. The front derailleur according to claim 33, wherein
the plurality of gears comprises a second additional gear rotatable relative to the gear support structure about the second gear axis, and
the second pin is configured to rotatably support the second gear and the second additional gear about the second gear axis.

36. The front derailleur according to claim 33, wherein
the gear structure includes a torque diode including:
   an outer casing;
   a first shaft rotatably mounted to the outer casing about a first rotational axis; and
   a second shaft rotatably mounted to the outer casing about a second rotational axis, and
the outer casing of the torque diode includes at least one of the first support, the second support, the third support, and the fourth support.

* * * * *